United States Patent
Adkins et al.

(10) Patent No.: US 8,251,512 B2
(45) Date of Patent: Aug. 28, 2012

(54) EQUIPMENT AND METHODS FOR THE DISPLAY OF HIGH RESOLUTION IMAGES USING MULTIPLE PROJECTION DISPLAYS

(75) Inventors: Sean M. Adkins, Kamuela, HI (US); Steven Charles Read, Mississauga (CA)

(73) Assignee: IMAX Corporation, Ontario (CA)

( * ) Notice: Subject to any disclaimer, the term of this patent is extended or adjusted under 35 U.S.C. 154(b) by 1171 days.

(21) Appl. No.: 11/631,585

(22) PCT Filed: Jul. 7, 2005

(86) PCT No.: PCT/US2005/024292
§ 371 (c)(1),
(2), (4) Date: Apr. 14, 2008

(87) PCT Pub. No.: WO2006/014598
PCT Pub. Date: Feb. 9, 2006

(65) Prior Publication Data
US 2008/0259223 A1 Oct. 23, 2008

Related U.S. Application Data

(60) Provisional application No. 60/586,177, filed on Jul. 8, 2004.

(51) Int. Cl.
*G03B 21/14* (2006.01)
(52) U.S. Cl. ............... 353/30; 353/94; 353/97; 348/746
(58) Field of Classification Search ............... 353/30, 353/94, 97, 46, 48, 49; 348/746, 804
See application file for complete search history.

(56) References Cited

U.S. PATENT DOCUMENTS

| | | | |
|---|---|---|---|
| 3,909,525 A | 9/1975 | Fagan | |
| 4,316,196 A | 2/1982 | Jacobs | |
| 4,638,309 A | 1/1987 | Ott | |
| 4,734,779 A | 3/1988 | Levis et al. | |
| 4,974,073 A | 11/1990 | Inova | |

(Continued)

FOREIGN PATENT DOCUMENTS

CA 2227920 7/1999

(Continued)

OTHER PUBLICATIONS

First Office Action, Chinese Application No. 200580030108.4, mailed Apr. 17, 2009, (37 pages).

(Continued)

*Primary Examiner* — William C Dowling
(74) *Attorney, Agent, or Firm* — Kilpatrick Townsend & Stockton LLP

(57) ABSTRACT

The present invention discloses systems, equipment and methods that allow the improved tiling of multiple projections displays in order to create higher resolution images. Equipment and methods are disclosed for improved blending of the seam by optical means where edge blending masks are employed to create a brightness ramp in the blending region. Equipment and methods are also disclosed for the correction of artifacts in an optically blended seam by modifying the brightness of image pixels in the overlap or blend region. Equipment, systems, and techniques are disclosed for preserving the resolution and uniformity of the image across each seam by actively controlling the position of each display using a servo controlled lens mount for the positioning of each projected image in conjunction with a real time image analysis system.

37 Claims, 38 Drawing Sheets

U.S. PATENT DOCUMENTS

| | | | |
|---|---|---|---|
| 5,011,277 A | 4/1991 | Ogino et al. | |
| 5,077,154 A | 12/1991 | Corley | |
| 5,085,495 A | 2/1992 | Iwahara et al. | |
| 5,116,117 A | 5/1992 | Miyashita | |
| 5,136,390 A * | 8/1992 | Inova et al. | 348/383 |
| 5,153,621 A | 10/1992 | Vogeley | |
| 5,300,966 A | 4/1994 | Uehira et al. | |
| 5,376,980 A | 12/1994 | Gersuk et al. | |
| 5,382,990 A | 1/1995 | Hath et al. | |
| 5,386,253 A | 1/1995 | Fielding | |
| 5,400,093 A | 3/1995 | Timmers | |
| 5,490,009 A | 2/1996 | Venkateswar et al. | |
| 5,555,035 A | 9/1996 | Mead et al. | |
| 5,589,852 A | 12/1996 | Thompson et al. | |
| 5,612,753 A | 3/1997 | Poradish et al. | |
| 5,626,411 A | 5/1997 | Takahashi et al. | |
| 5,656,403 A | 8/1997 | Shieh | |
| 5,771,072 A | 6/1998 | Tokoro et al. | |
| 5,796,442 A | 8/1998 | Gove et al. | |
| 5,809,182 A | 9/1998 | Ward et al. | |
| 5,835,264 A | 11/1998 | Tandler et al. | |
| 5,844,663 A | 12/1998 | Holley et al. | |
| 5,847,784 A | 12/1998 | Finnila et al. | |
| 5,865,520 A | 2/1999 | Kavanagh et al. | |
| 5,902,030 A | 5/1999 | Blanchard | |
| 5,956,000 A | 9/1999 | Kreitman et al. | |
| 5,988,817 A | 11/1999 | Mizushima et al. | |
| 5,990,982 A | 11/1999 | Gove et al. | |
| 6,017,123 A * | 1/2000 | Bleha et al. | 353/30 |
| 6,115,022 A | 9/2000 | Mayer, III et al. | |
| 6,128,131 A | 10/2000 | Tang | |
| 6,172,816 B1 | 1/2001 | Tadic-Galeb et al. | |
| 6,193,375 B1 | 2/2001 | Nagata et al. | |
| 6,201,516 B1 | 3/2001 | Tanide et al. | |
| 6,219,099 B1 | 4/2001 | Johnson et al. | |
| 6,222,593 B1 | 4/2001 | Higurashi et al. | |
| 6,224,217 B1 | 5/2001 | Tanaka | |
| 6,276,801 B1 | 8/2001 | Fielding | |
| 6,373,603 B1 | 4/2002 | Popovich et al. | |
| 6,377,306 B1 | 4/2002 | Johnson et al. | |
| 6,456,339 B1 | 9/2002 | Surati et al. | |
| 6,480,175 B1 | 11/2002 | Schneider | |
| 6,545,685 B1 | 4/2003 | Dorbie | |
| 6,570,623 B1 | 5/2003 | Li et al. | |
| 6,590,621 B1 * | 7/2003 | Creek et al. | 349/5 |
| 6,608,652 B1 | 8/2003 | Yamazaki et al. | |
| 6,695,451 B1 | 2/2004 | Yamasaki et al. | |
| 6,727,864 B1 * | 4/2004 | Johnson et al. | 345/1.3 |
| 6,753,923 B2 * | 6/2004 | Gyoten | 348/383 |
| 6,760,075 B2 | 7/2004 | Mayer et al. | |
| 6,795,221 B1 | 9/2004 | Urey | |
| 7,193,654 B2 | 3/2007 | Baker et al. | |
| 7,339,625 B2 * | 3/2008 | Matthys et al. | 348/383 |
| 7,703,929 B2 * | 4/2010 | Yamada et al. | 353/94 |
| 7,832,869 B2 * | 11/2010 | Maximus et al. | 353/7 |
| 2002/0024640 A1 | 2/2002 | Ioka | |
| 2002/0041364 A1 * | 4/2002 | Ioka | 353/69 |
| 2002/0054275 A1 | 5/2002 | Yamanaka et al. | |
| 2003/0016335 A1 | 1/2003 | Penn | |
| 2003/0063226 A1 | 4/2003 | Gibbon et al. | |
| 2003/0067587 A1 * | 4/2003 | Yamasaki et al. | 353/30 |
| 2003/0117714 A1 * | 6/2003 | Nakamura et al. | 359/649 |
| 2005/0083492 A1 * | 4/2005 | Taubenberger | 353/94 |
| 2006/0152680 A1 * | 7/2006 | Shibano | 353/30 |

FOREIGN PATENT DOCUMENTS

| | | |
|---|---|---|
| CN | 1511268 | 7/2004 |
| EP | 0 139 991 A2 | 5/1985 |
| EP | 0 606 162 A2 | 7/1994 |
| EP | 0 606 162 A3 | 7/1994 |
| EP | 0 751 683 A2 | 1/1997 |
| EP | 0 751 683 A3 | 1/1997 |
| EP | 0 786 687 A1 | 7/1997 |
| EP | 0 961 502 A2 | 1/1999 |
| EP | 1 058 158 A2 | 12/2000 |
| EP | 1061410 | 12/2000 |
| EP | 1 102 495 A2 | 5/2001 |
| EP | 1 137 290 A2 | 9/2001 |
| EP | 1 292 134 A2 | 3/2003 |
| FR | 2 774 481 | 8/1999 |
| GB | 2352836 A | 2/2001 |
| JP | 08 168039 A | 6/1996 |
| WO | WO 94/10675 | 5/1994 |
| WO | WO 95/25292 | 9/1995 |
| WO | WO 96/04582 | 2/1996 |
| WO | WO0007376 | 2/2000 |
| WO | WO 00/54096 | 9/2000 |
| WO | WO 00/76210 A1 | 12/2000 |
| WO | WO 01/41455 | 6/2001 |
| WO | WO 01/96907 | 12/2001 |
| WO | WO 02/05553 A2 | 1/2002 |
| WO | WO 02/05553 A3 | 1/2002 |
| WO | WO 02/19704 | 3/2002 |
| WO | WO 03/050584 | 6/2003 |

OTHER PUBLICATIONS

Second Office Action, Chinese Application No. 200580030108.4, mailed Mar. 25, 2010 (9 pages).
Third Office Action, Chinese Application No. 200580030108.4, mailed Aug. 5, 2010 (14 pages).
Fourth Office Action, Chinese Application No. 200580030108.4, mailed Dec. 1, 2010 (4 pages).
Fifth Office Action, Chinese Application No. 200580030108.4, mailed Mar. 17, 2011 (4 pages).
International Search Report for PCT/US2005/024292, mailed Mar. 2, 2006 (6 pages).
International Preliminary Report on Patentability and Written Opinion for PCT/US2005/024292, mailed Jan. 9, 2007 (11 pages).
Response to Article 94(3) EPC for EP Application No. 05770499.1, filed Aug. 6, 2009 (68 pages).
Communication from the European Patent Office for EP Application No. 05770499.1, mailed Mar. 2, 2007 (2 pages).
Response to Rule 109 EPC Communication for EP Application No. 05770499.1, mailed Apr. 5, 2007 (24 pages).
Communication from the European Patent Office dated Jan. 28, 2009 in related European Patent Application No. 05770499.
Abstract of CN1511268 published Jul. 7, 2004, Applicant Wavien, Inc. (related to International Publication No. WO2003050584 previously cited).
Patent Abstracts of Japan, vol. 1999, No. 03, Mar. 31, 1999 & JP 10 319500 A (Fujitsu General Ltd.), Dec. 4, 1998.
Patent Abstracts of Japan, vol. 017, No. 387 (P-1576), Jul. 20, 1993 & JP 05 066501 A (Toshiba Corp.), Mar. 19, 1993.
Patent Abstracts of Japan, vol. 018, No. 373 (P-1769), Jul. 13, 1994 & JP 06 102484 A (Matsushita Electric Ind.), Apr. 15, 1994.
Chen and Johnson, "Fundamentals of Scalable High Resolution Seamlessly Tiled Projection System," *Proc. SPIE*, vol. 4294:67-74 (2001).
Dewey, 'The application of GaA1As lasers to high-resolution liquid-crystal projection displays,' *IBM Journal of Research and Development*, 26(2):177-185 (1982).
Dewey, 'Laser-addressed liquid crystal displays,' *Optical Engineering*, 23(3):230-240 (1984).
Eichenlaub, et al., 'Autostereoscopic projection displays,' *PROC SPIE, The International Society for Optical Engineering*, 2409:48-55 (1995).
Phillips Mahoney, 'Getting the big picture—Large-scale projection displays bring 3D models and simulations to full-scale life for multiple users,' *Computer Graphics World*, 22(9):41-44 (1999).
Takahashi, et al., Highly realistic video display based on the interleave projection method,' *NTT Review*, 5(6):66-68 (1993).
Chinese Patent Application No. 200580030108.4, First Office Action mailed Apr. 17, 2009 (4 pages).

* cited by examiner

EQUIPMENT AND METHODS FOR THE DISPLAY OF HIGH RESOLUTION IMAGES USING MULTIPLE PROJECTION DISPLAYS

CROSS-REFERENCE TO RELATED APPLICATION

This application is the U.S. national phase of International Application No. PCT/US2005/024292 filed on Jul. 7, 2005 and published in English on Feb. 9, 2006 as International Publication No. WO 2006/014598 A2, which application claims the benefit of U.S. Provisional Application Ser. No. 60/586,177 filed on Jul. 8, 2004, the contents of which are incorporated by reference herein.

FIELD OF THE INVENTION

This invention relates to projection of images and more specifically to techniques and equipment for creating high resolution images by tiling together multiple projection displays.

BACKGROUND OF THE INVENTION

Spatial Light Modulator (SLM) based projection displays are often used in applications where the spatial resolution of a single projection display system of a given type is inadequate. Projection displays may also be required where the projection surface covers a large area or a surface of a shape that cannot be covered by a single projection display system with the desired brightness and image quality.

In such situations it is common to employ multiple projection displays in a tiled arrangement. Two or more projection displays are arranged so that their images are adjacent and form a matrix of horizontal and vertical elements so that the resulting composite image has a higher resolution and brightness than would result if a single projection display were used to cover the same projection surface area. Subdivision of the display also allows the projection surface to change in shape or distance from the projection points without requiring excessive depth of focus or special distortion correction from the projection lenses. It is frequently desired that the image formed by multiple projection displays should appear to the viewer as if a single projector produced it. This requires that the seams between each of the multiple images should be undetectable, and it also requires a high degree of uniformity for each display and the closest possible matching of characteristics such as the brightness, uniformity and resolution of the multiple projection displays.

When projection displays are tiled together the adjacent images may be butted together or overlapped and blended. Both electronic and optical methods have been employed for blending two or more images in the overlap region. The electronic methods, exemplified by U.S. Pat. No. 4,974,073 to Inova, rely on electronically processing the image video signal prior to the SLM to impose a smooth adjustable reduction in brightness of each display in the overlap region so that the resulting brightness of the blended images is uniform. This method has the defect that in the overlap region the black levels of the two displays are added together. It is inevitable when using SLM based projection displays that a finite amount of light will reach the projection screen when these displays are driven with a full black image video signal. This full black image video signal is the minimum level that can be supplied to the SLM, and so the electronic processing method of ramping image brightness in the overlap region cannot eliminate the increased black level in the overlap region. This increased black level is frequently visible when the image video signal for both projectors goes to full black as is common for example between the titles and first scene of a motion picture. This increased black level calls to the attention of the audience the location of the overlap(s) between the multiple sub-images used to create the display, making all of the residual artifacts at the overlap location(s) more noticeable.

The increased black level can be masked by increasing the black level of the image video signal on each display except in the overlap region, but this reduces the dynamic range of the display. When a digital representation of image brightness is used this reduction is typically equal to one bit, a significant loss of dynamic range in systems that rely on 8 to 10 bits for the representation of image brightness.

Optical methods for blending two or more images in the overlap region are exemplified by U.S. Pat. No. 6,017,123 to Bleha et al. Bleha places an opaque knife edge blending mask in the image light path, either before or after the SLM, or after the projection lens. This mask is placed at an edge of the image produced by each projection display where an overlap will occur in the composite projection display. The mask is out of focus and as a result produces a gradual reduction of brightness at the edge of the projection image display. Bleha further describes improvement to the quality of the brightness reduction in the overlap region by the use of neutral density filters to further control the slope of the brightness reduction in the overlap region and thereby reduce artifacts due to imperfections in the slope of the brightness reduction.

International Patent Application PCT/EP00/11910 to Maximus et al. describes a soft edge plate or blending mask consisting of an opaque area, a transparent area, and a semi-transparent area between the opaque and transparent areas that is placed in a location in the projector where its image will be out of focus when the projection lens is adjusted to properly focus the image of the projector's SLM devices on the screen. The out of focus image of the edge of this soft edge blending mask provides a smoothing of the slope of the brightness reduction produced by the mask. The effect of this soft edge blending mask is similar to that described in Bleha where neutral density filters are used in combination with a knife edge blending mask.

In an SLM based projection display it is important that the display should accurately reproduce the colors and brightness of the input image signal. One feature of a SLM based projection display that provides accurate reproduction is high uniformity of image brightness and color. As previously mentioned display uniformity and the matching of brightness and color is also important when tiling such displays.

The uniformity of illumination provided to the SLM devices is a major factor in determining the brightness uniformity of the projected image. As we will later describe, the nature of the illuminating light is also an important factor in the uniformity of color, particularly where a color separation and re-combining device based on dichroic filters is employed with multiple SLM devices in a color projection display.

A method for obtaining a uniform source of illumination for the SLM devices is to use a light homogenizer to improve the uniformity of the illuminance distribution provided by the lamp and reflector commonly employed as the light source in a SLM based projection display. There are two common forms of light homogenizers, a light pipe or integrating bar, and a micro-lens array homogenizer, commonly called a "fly's eye integrator".

UK Patent Application GB 2,352,836 to Creek et al. describes a method for reducing artifacts due to imperfections in the slope of the brightness reduction when projectors employing transmission type LCD devices as the SLM are used with an optical blending method. Creek is directed to the problem of illuminance non-uniformity due to the nature of the illumination provided to the LCD by a light homogenizer utilizing a pair of micro-lens arrays. This type of light homogenizer produces at its output many overlapped images of the input illuminance distribution equal to the number of micro-lenses in the array. In a fly's eye integrator collimated light is focused by the first micro-lens array onto a second micro-lens array. The illuminance distribution at the second micro-lens array is necessarily non-uniform to ensure efficient operation (each micro-lens in this second array is under-filled with light). The illuminance distribution at the second micro-lens array is imaged onto the pupil of the projection lens and the angular distribution of light through the projection lens is non-uniform. In the most usual case where the projection lens has a telecentric entrance pupil, the overall intensity distribution at the modulator plane is also non-uniform. If the intensity distribution for all points in some field after the fly's eye integrator is considered, the intensity distribution at each field point is non-uniform and this non-uniformity is constant for all field points.

When an edge blending mask, which acts on the angular distribution of light, is inserted into the illumination path after a fly's eye integrator, the mask will clip the contained intensity distributions differently for each field point. This causes small variations or ripples in the illuminance ramp produced by the edge blending mask. This pattern of ripples is dependent on the intensity distribution but not on the field point after the mask where the intensity distribution is evaluated.

Creek also describes a method of reducing the ripples across the blending region by inserting a diffusing or scattering element between the output of the fly's eye homogenizer and the LCD panel. The scattered light makes the intensity distribution at each field point on the LCD panel more uniform, reducing the non-uniformities due to intensity distribution dependent clipping by the edge blending mask. This system has the limitation that the diffusing or scattering action also reduces the amount of light that subsequently reaches the pupil of the projection lens, lowering the brightness of the image. It is also important to understand that the ripples described in Creek stem from a globally non-uniform intensity distribution, which is constant across all field points at the LCD panel. As later described, this effect and its cause are different from what is found in systems that use a light pipe or integrator bar.

Additionally, smoothing the brightness of the composite displayed image in the overlap region(s) of a tiled display is not sufficient to ensure that the resulting composite display has the desired image quality. Each of the smaller projection displays used to create the composite image has a non-uniformity that results from light fall off over the area of the display, as well as other sources of non-uniformity such as variations in the alignment of the optical components in the projector.

U.S. Pat. No. 5,386,253 to Fielding describes a method for improving the uniformity of the displayed image. In Fielding, a sensor observing the far field is used to measure the brightness of the projected image and this information used to correct the brightness distribution on the screen by modifying the pixel brightness values supplied to the SLM. This modification in pixel brightness may be used to compensate the brightness of the projected image to achieve any desired brightness distribution. The method in Fielding cannot increase the brightness of a given area of the screen above that available for that given area in the uncorrected system. As a result, modifying the pixel brightness of areas of the projected image to achieve, for example, a flat field of uniform brightness will typically limit the brightness of the display to that of the least bright area of the projected image.

U.S. Pat. No. 6,115,022 to Mayer III et al. describes a method like that in Fielding where adjustment of the pixel values may be used to correct for brightness non-uniformity in the displayed image. This method is subject to the same limitations as Fielding in that the method cannot increase the brightness of a given area of the screen above that available for that given area in the uncorrected system. As a result, modifying the pixel brightness of areas of the composite projected image to achieve, for example, a flat field of uniform brightness will typically limit the brightness of the display to that of the least bright projector being used to create the composite image.

The optimum blending of the images from multiple projectors requires that the alignment of adjacent projection display images on the projection screen should be exact. This is required to prevent discontinuities of image features such as, for example, diagonal lines as they move across the composite display. In addition, the resolution of the composite display should be maintained across the overlap region, also requiring very precise alignment of the multiple images. Where multiple projection displays are used the resolution in the overlap region is typically lower than the resolution at the center of the image of each of the individual displays, that is, in the non-overlapped regions. This is because of the misalignment between the displays in the overlap region and because the overlap region is at the edge of the projected image where the residual aberrations of the projection lens reduce the sharpness of the projected image.

In U.S. Pat. No. 5,153,621 to Vogeley a method is described wherein two optically butted displays are illuminated by a single light source and their images are then projected through a single lens by means of a system of mirrors. This places adjacent edges of each display along the optical axis of the projection lens. Vogeley teaches that this configuration provides a tiled image of two or more displays with minimal illuminance discontinuities at their juncture. Vogeley is primarily concerned with making the seam between the optically butted displays invisible by ensuring uniformity of illumination at the seam. However, Vogeley does not go on to further teach the necessity of precise alignment of the adjacent displays in order to achieve a uniform projection display. Furthermore, Vogeley does not recognize the resolution improvements provided by placing the adjacent edges of the two display images on the optical axis of the projection lens. In addition, Vogeley describes a system that does not overlap the adjacent images, and also does not provide a means to mitigate the seam or gap between adjacent images. It is inevitable in such a system that a finite separation will be perceivable between the adjacent images.

When the uniformity of a tiled display is considered purely in terms of brightness uniformity and the comparative invisibility of the seams, methods using overlapped displays produce results superior to optically butted displays. In this regard the critical factors are the adjustment of the positioning and slope of the brightness ramps in the display if electronic means are used, or the alignment and positioning of the masks if optical means are used to blend the overlapped displays. Both of these methods are forgiving of minor alignment errors at the level of individual display pixels, which in any case are not well resolved at the periphery of the individual display due to the limitations of the projection lens as mentioned above. But, if it is desired to achieve consistent resolution across a tiled display, methods must be introduced to precisely align the pixels of the adjacent displays and to avoid the loss of resolution of the individual displays at the edges where the overlap occurs.

The alignment of multiple projection displays in the prior art is accomplished by adjusting the physical relationship of each of the projectors so that their images fall on the screen in the desired location. Precise adjustment of larger SLM based projectors is more difficult due to their size and weight. U.S. Pat. No. 5,847,784 to Finnila et al. discloses a method for aligning multiple optically butted displays by moving the SLM devices. This method requires additional components in the mounting of the SLM devices and potentially diminishes the image quality and stability in the projector. In a color projector using three SLMs for additive color, the precise alignment of these devices with respect to each other is generally required for image quality. That is, within each individual color projector in a color multiple projector display the alignment of each projector's three SLMs with respect to each other is critical for image quality. In addition modern SLM projectors subject the SLM devices to substantial luminous flux, resulting in significant heating of the devices and the associated colored image combining optics. The requirements of thermal stability conflict with the requirements of a mechanism to permit position adjustment of the individual SLM devices.

Finnila places the quality of alignment of the tiled image ahead of the quality of alignment of the color planes; this is exemplified by FIG. 5 of the Finnila patent where separate projection lenses are used for each of the three colors. As a result color alignment must be accomplished at the screen and will likely not achieve the same tolerances or uniformity as that provided by the alignment of the tiled pairs of SLMs in each color channel.

An alternative to moving the SLM devices themselves in the prior art is to move the displayed image on the SLM pixel matrix. However, this has two important disadvantages. First, position adjustments are limited to one pixel increments; making it unlikely that pixel for pixel alignment will be achieved between two adjacent displays. Second, a border of unused display pixels must be established on all sides of each SLM so that the image may be moved on the SLM pixel matrix without being cropped.

If the projectors used in the multiple projection display were of a scan type display such as a CRT or laser based projector the scanning system might permit the sub-pixel adjustment of the image position within the scan area of the device. A system of this type is described in U.S. Pat. No. 6,193,375 to Nagata et al. This patent discloses a method for aligning optically butted scanned laser displays by adjusting the position of the scan patch of each display. However, the techniques disclosed in Nagata are not suitable for use with SLM devices, and the patent does not teach an embodiment suitable for use in an additive color display.

The prior art has not provided a solution that completely solves the problems of uniformity and other artifacts in the overlap region of tiled projection displays. Problems with the resolution of the image in the overlap region between adjacent displays have not been addressed due to limited resolution at the edges of typical projection displays.

As a result the performance of tiled multiple projection displays is less than satisfactory due to artifacts in the seam region, non-uniformity of the individual displays and poor alignment between the various projection displays.

SUMMARY OF THE INVENTION

The present invention seeks to resolve these issues of artifacts, uniformity and resolution by introducing equipment and methods that allow the improved tiling of multiple projection displays to create a higher resolution composite image. Equipment and methods are disclosed for improved blending of the seam by smoothing the intensity distribution of the illumination system and by special placement of edge blending masks for producing the brightness ramp in the overlap region. Equipment and methods are also disclosed for the correction of artifacts in an optically blended seam by modifying the brightness of image pixels in the overlap or blend region. Equipment, systems, and methods are disclosed for preserving the resolution and uniformity of the image across each seam by actively controlling the position of each display using a servo controlled lens mount for the positioning of each projected image in conjunction with a real time image analysis system.

BRIEF DESCRIPTION OF THE DRAWINGS

These and other features, aspects, and advantages of the present invention are better understood when the following Detailed Description is read with reference to the accompanying drawings.

DETAILED DESCRIPTION OF THE DRAWINGS

In order to improve the clarity of the description the present invention will be described using the example of two projectors tiled together to form a composite display where the two projected images are arranged horizontally. This is a subset of a more complex system that may involve more than two projectors arranged in configurations where the composite image is produced from a matrix of images arranged horizontally, vertically or both. It should be understood that the inventions disclosed herein may be applied to the more complex configurations or other suitable configurations.

Figure 1:
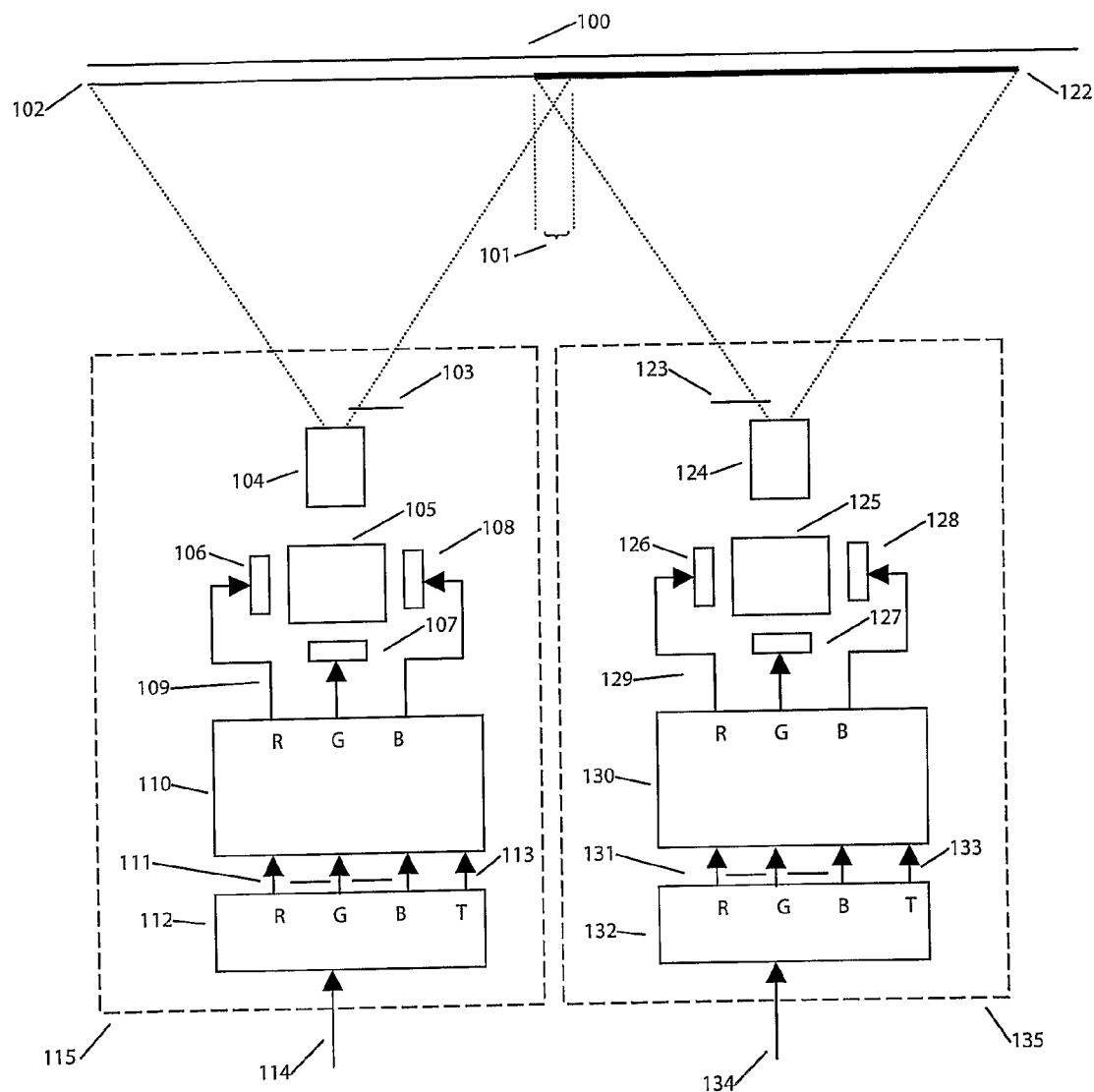
FIG. 1 illustrates a projection system for tiling two projection displays to form a composite image according to the prior art.

FIG. 1 illustrates in schematic form the plan view of a projection system for tiling two projection displays to form a seamless composite image according to the prior art. In this example the image to be displayed is divided into two halves, a left half and a right half, each being of the same height, but each being nearly one half of the total width of the final image. The composite image is formed on display screen 100, which receives the left, and right projected image halves from two projection systems, a left hand projector, 115 and a right hand projector 135. The left hand projector receives an image input signal corresponding to the left half of the desired image plus a small overlap region at the center of the desired image, and the right hand projector receives an image input signal corresponding to the right half of the desired image plus a small overlap region at the center of the desired image. Each projection system is identical except for the location of edge blending masks 103 and 123 and may be described in detail with reference to the left hand projector, 115, as follows. The numbers in parenthesis refer to the corresponding elements of the right hand projector, 135, in FIG. 1.

An input video or image data signal 114 (134) representing one half of the image to be displayed is supplied to input circuit 112 (132) which provides various facilities known to those skilled in the art for separation of composite inputs into discrete red, green and blue or "RGB" signal components as required by the input format, facilities to extract image frame timing information and facilities such as contrast control, color balance adjustment, image scaling and other features known to those skilled in the art. The output of circuit 112 (132) is three discrete signals 111 (131) corresponding to the three color components RGB of the image and a frame timing signal 113 (133). These signals are supplied to display control and formatting circuit 110 (130) which in turn supplies the control signals 109 (129) required by the SLM devices 106, 107 and 108 (126, 127 and 128). Each SLM device consists of a two dimensional array of modulating elements or pixels, and by means of various control signals each pixel modulates the flux of a corresponding part of the light to be projected so as to form the desired pattern of pixel brightnesses that correspond to the image to be projected. Various types of SLM devices may be employed including deformable mirror devices (DMDs), or reflective or transmissive liquid crystal devices.

Each SLM device corresponds to one of the three color components of the image to be displayed, and color separating and re-combining device 105 (125) provides the optical components necessary to filter input white light into three spectral color bands that correspond to the red, green and blue portions of the visible spectrum, this color separated light then illuminates SLM devices 106, 107 and 108 (126, 127 and 128) with red, green and blue light respectively. The control signals 109 (129) cause the individual picture elements to be controlled so as to modulate the flux of the red, green or blue light falling on the SLM, which in turn is re-combined by color separating and re-combining device 105 (125) into a single image of overlaid red, green and blue components which is in turn projected by lens 104 (124) onto the screen 100. It will be clear to those skilled in the art that FIG. 1 omits for the sake of clarity a number of details of the construction of a projector, including the illuminating light source and the details of color separating and re-combining device 105 (125)

which varies in its detailed configuration and components according to the type of SLM used.

The left hand projector 115 in FIG. 1 produces a projected image 102 on the screen 100, which proceeds from the lens 104 as more or less a cone of light as shown in FIG. 1 by the dashed lines connecting 104 to 102. Similarly, right hand projector 135 in FIG. 1 produces a projected image 122 on the screen 100, which also proceeds from lens 124 as more or less a cone of light as shown by the dashed lines connecting 124 to 122. In order to form a composite image, 102 is overlapped with 122 by some amount, indicated as 101 in FIG. 1. In order to prevent this overlap from being visible as a bright band at the center of the composite image, some means is required to gradually diminish the brightness of the right hand side of image 102 as it enters the overlap region 101, and likewise to gradually increase the brightness of the left hand side of image 122 as it leaves the overlap region 101. This function is performed in the system of FIG. 1 by adjustable masks 103 and 123. Mask 103 is located so as to cause the brightness of the right hand half of the left image 102 to gradually diminish to black in the overlap region 101. Similarly, mask 123 is located so as to cause the brightness of the left hand half of the right image 122 to gradually increase from black. The form of masks 103 and 123 are knife edge solid masks or solid masks combined with filters such as those described in U.S. Pat. No. 6,017,123 to Bleha et al. The masks may be made of metal, or of a transparent material such as glass, preferably anti-reflection coated, that has an opaque or reflecting metal or dielectric coating applied to a portion of the transparent material to form the mask.

It will be apparent to those skilled in the art that the masks 103 and 123 may also be located at other points in the projector such as in the illuminating system prior to the SLM devices, or between the SLM devices and the projection lens, both being described in Bleha et al.

Of course it will be apparent to those skilled in the art that the system of Inova (U.S. Pat. No. 4,974,073) could also be employed to modify the brightness of the right hand edge of input image signal 114 and the left hand edge of input image signal 134, and similarly the input image signals could be pre-processed to incorporate a brightness ramp on the appropriate edge, but both of these methods would have the previously described disadvantage of an increased black level in the overlap region 101.

Figure 2:
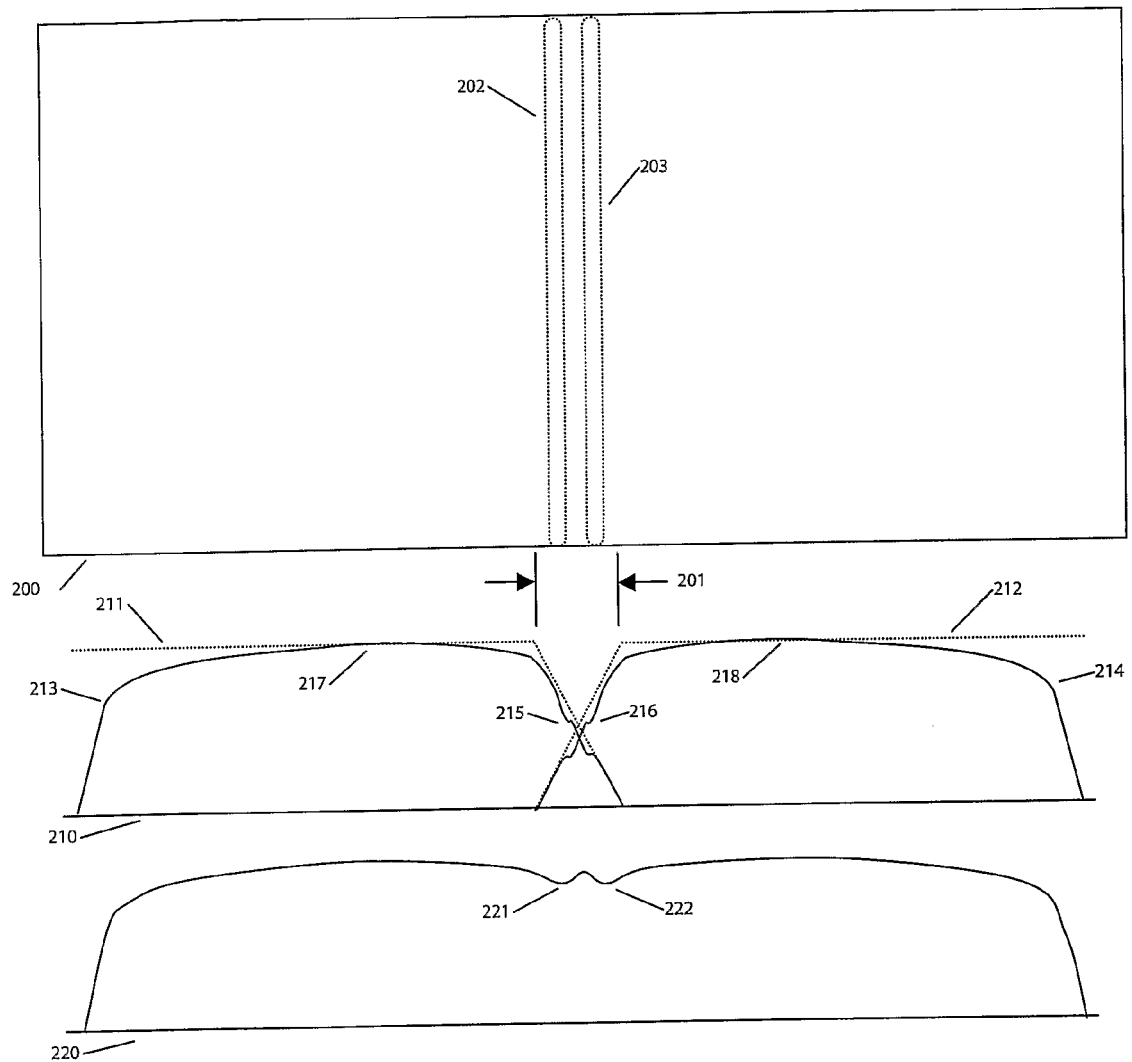
FIG. 2 illustrates the brightness profiles of the overlap region in the system of FIG. 1.

FIG. 2 is a representation of a flat field image projected by the system of FIG. 1. The overall screen image is shown at 200 and the overlap region at 201. When the system of FIG. 1 is used it is common for residual artifacts to appear at the seam in the form of illuminance variations or bands of changing brightness across the blending region and extending over the entire height of the screen from top to bottom. The dashed outlines 202 and 203 in the overlap region 201 exemplify these artifacts. Similarly graph 210 in FIG. 2 shows the ideal brightness profile across the horizontal axis of the screen for each of the two projected images at 211 and 212, and the actual brightness profile for each image at 213 and 214. The ideal profiles 211 and 212 are shown with a linear fall off in the overlap region, but any profile may be used so long as the profiles for each image are the same and complimentary in brightness across the overlap region.

The composite brightness profile for the image at 200 is shown in the graph at 220. In each case the horizontal axis of the graph corresponds to the horizontal dimension of the representation of the projected image 200, and the vertical axis of the graph shows the relative brightness of the projected image on the screen. The irregularities in the brightness profiles 213 and 214, exemplified by 215 and 216 on the graph at 200 and by 221 and 222 on the composite brightness profile 220 in FIG. 2 correspond to the banding artifacts 202 and 203 in the overlap region 201.

When the prior art of optically blending images produced by SLM based projectors is practiced, it is also common for a color shift to appear in the blending region. This color shift is not as noticeable as the illuminance variations. The color shift may also be less visible because the illuminance variations that are also produced by the optical blending method are more noticeable, obscuring the color shift.

In practice the system of FIG. 1 suffers from inadequate blending quality in the overlap region. Even with the use of neutral density filters and multiple masks as described in U.S. Pat. No. 6,017,123 to Bleha et al. to reduce the banding in the overlap region the overlap region remains detectable in certain kinds of images. It is apparent from the prior art that others have failed to fully understand the nature of the problem of brightness irregularities in the overlap region of optically blended SLM based projectors incorporating an integrator bar and a high brightness illumination system based on lamp and reflector combinations. The present invention has therefore been developed from a greater understanding of the nature of the illuminating light in such systems. Since the irregularities of brightness and the color shifts that appear in the overlap region of a tiled projection system where the system of FIG. 1 is used arise from the nature of the light that is used to illuminate the SLM device, the prior art commonly used for such illumination will now be described.

Figure 3:
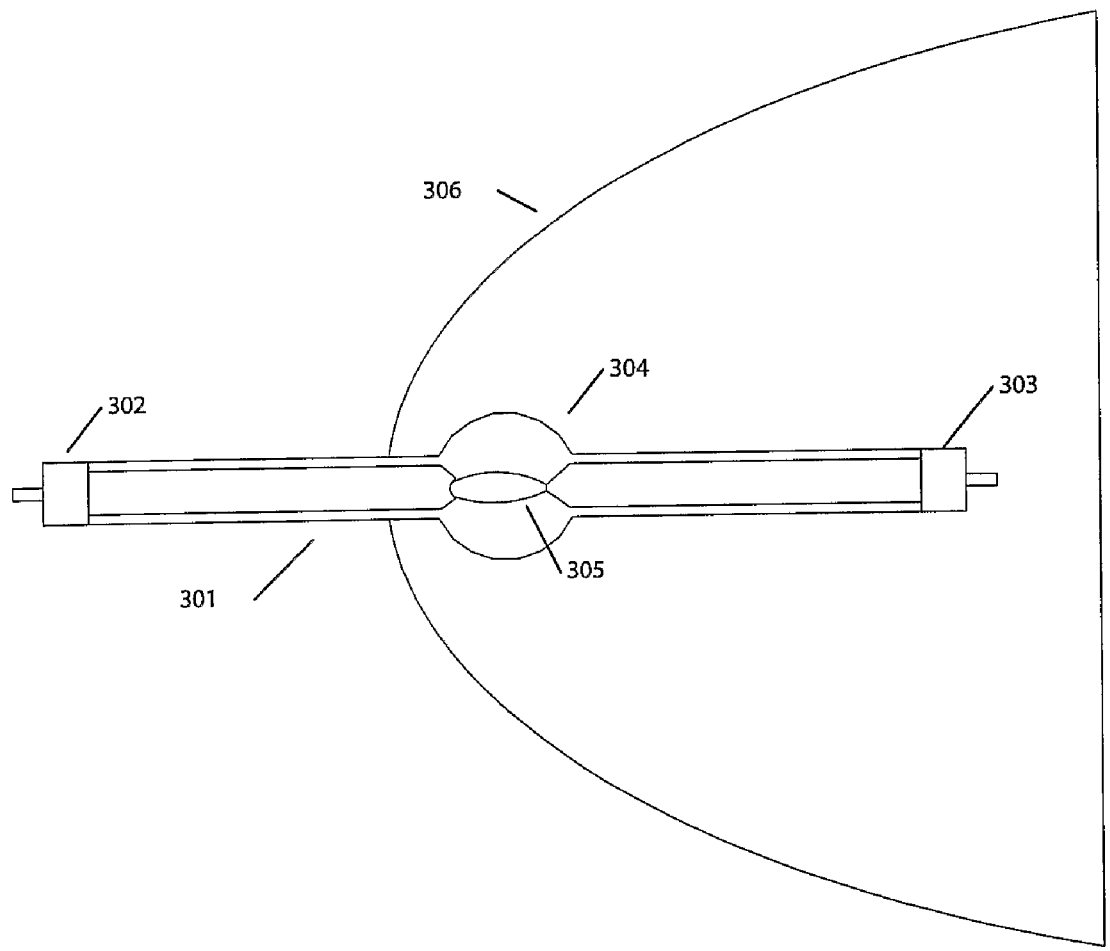
FIG. 3 illustrates a source of illumination for a projector in the system of FIG. 1 according to the prior art.

The light in a high brightness projection system is commonly produced using a Xenon arc lamp and a reflector. FIG. 3 shows the arrangement of the components of the lamp and reflector combination. At 301 the lamp is shown with electrodes 302 and 303, and arc chamber 304. The light is produced by lamp 301 from an arc 305 between the arc chamber ends of electrodes 302 and 303. The arc has a long axis between the electrodes, and a short axis perpendicular to the axis between the electrodes. The arc is more or less rotationally symmetrical about its long axis.

As a consequence, the effectiveness of reflector 306 is maximized by positioning the electrode axis of lamp 301 along the optical axis of reflector 306. Reflector 306 is commonly a surface of revolution corresponding to some portion of an ellipse, and the arc 305 is positioned at the first focus of this ellipse, resulting in the collected light being brought to focus at a point corresponding to the second focus of the ellipse.

Figure 4:
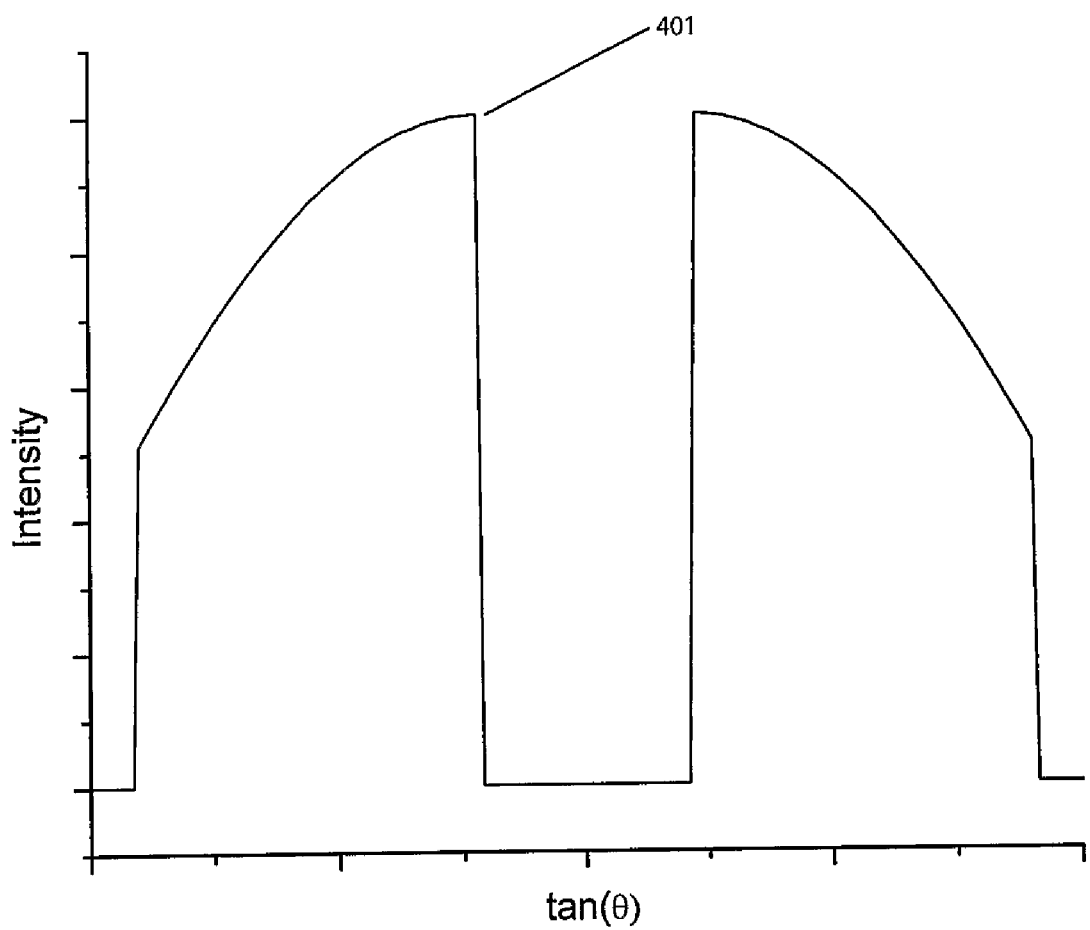
FIG. 4 illustrates the intensity distribution of the illumination source of FIG. 3.

However, the axial positioning of the lamp 301 results in the electrodes 302 and 303 obstructing some of the light that emerges from arc 305 and reflector 306. This produces an intensity distribution similar to the graph of FIG. 4, which shows on the vertical axis the distribution of intensity from the lamp and reflector combination of FIG. 3 as a function of the tangent of the angle from the optical axis. As shown at 401 in FIG. 4 the intensity drops to near zero along the optical axis as a result of the obstruction produced by the electrodes 302 and 303 of the lamp 301 in FIG. 3. Since the system is rotationally symmetrical about the optical axis the distribution in both x and y across the field is the same. Accordingly the intensity distribution of the lamp and reflector in a high power projection system is not uniform.

Figure 5:
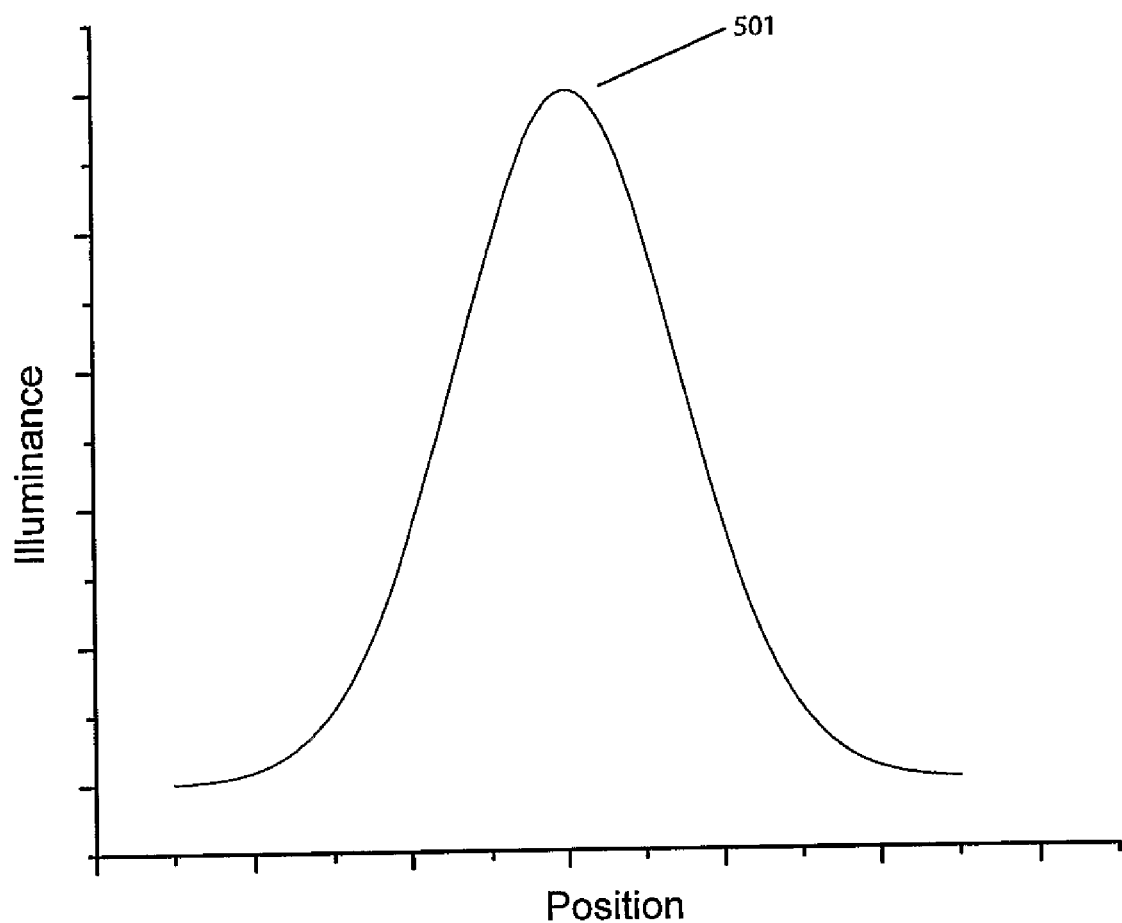
FIG. 5 illustrates the illuminance distribution of the illumination source of FIG. 3.

FIG. 5 shows the corresponding distribution of illuminance that results from the lamp and reflector combination of FIG. 3. This figure shows a graph of illuminance on the vertical axis versus field position across the second focus of the reflector 306 in FIG. 3. As the graph shows at 501 the illuminance reaches a peak at the center and falls off gradually towards the edge of the field. Since the system is rotationally symmetrical about the optical axis the distribution in both x and y across the field is the same.

Figure 7:
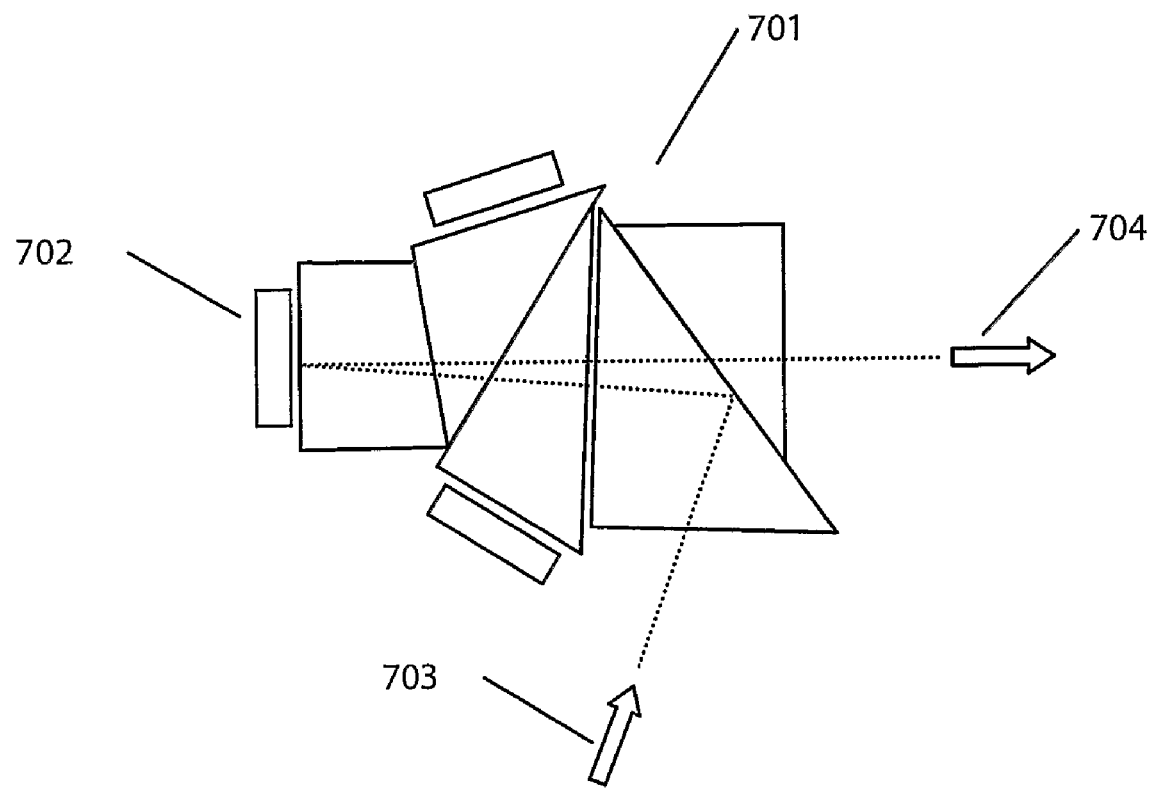
FIG. 7 illustrates a color separating and re-combining device for a projector in the system of FIG. 1 according to the prior art.

The illuminance distribution of FIG. 5 resulting from the lamp and reflector combination of FIG. 3 is generally not uniform enough to be used directly for the illumination source in an SLM based projector. In general a projected image with greater constancy of illuminance is desired. Accordingly it is desirable to employ a means of improving the uniformity of illuminance. This is commonly done using a lightpipe or integrator bar which by means of internal reflections folds multiple images of the input light upon itself resulting in an output illuminance distribution that is substantially more uniform than the input illuminance distribution. This bar is usually rectangular in shape to match the aspect ratio of the SLM devices. The length of the integrator bar is chosen to ensure that the off axis rays entering the bar are reflected between the side walls enough times that the output is sufficiently homogenized. This homogenized light is then directed to the SLM devices. In an SLM based color projector a color separating and re-combining device is commonly employed such as that shown in FIG. 7 at 701. This device occupies significant space, and requires the use of an illumination relay system to focus the light output of the integrator bar onto the three SLM devices 702, which are commonly mounted on or immediately adjacent to the color separating and re-combining device. The light 703 input to 701 traces a long path through 701 to SLM device 702 before emerging as colored, modulated light 704. This relay system is commonly of a telecentric design. A telecentric design results in all field points on the dichroic filters in the color separating and re-combining device seeing substantially identical ray angles. In a relay with a telecentric image the chief ray angles for all field points are parallel to the optical axis, and for a surface that is not perpendicular to the optical axis the angles of the chief rays are the same for all of the field points on the surface. This improves the uniformity of color across the projected image resulting from the dichroic filters in the color separating and re-combining device.

Figure 8:
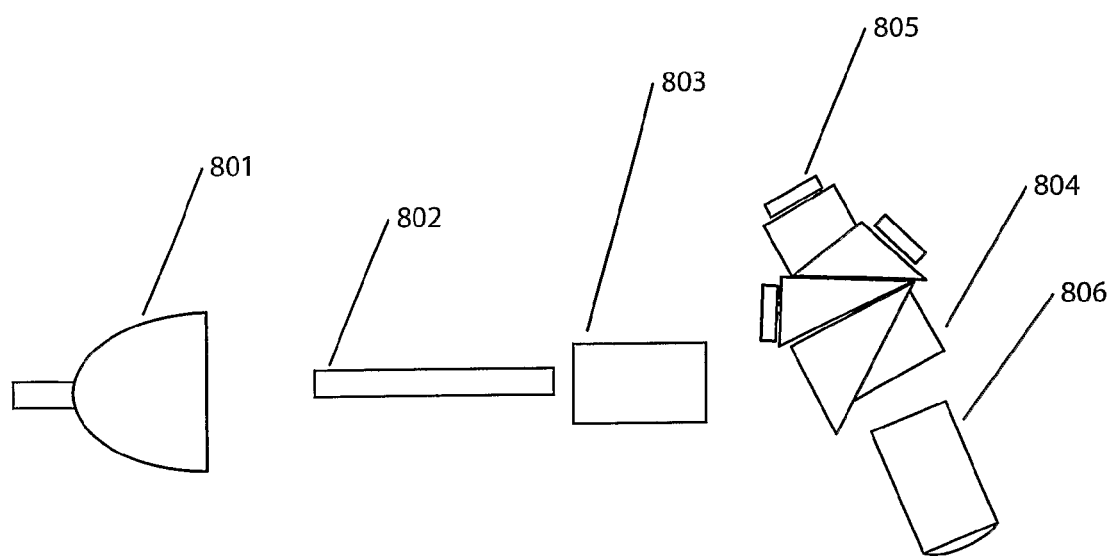
FIG. 8 illustrates the optical configuration of a projector in the system of FIG. 1 according to the prior art.

FIG. 8 shows a plan view of the optical system for a SLM based projector incorporating the components described above. The lamp and reflector are shown at 801, with the integrator bar shown at 802. The illumination relay is shown at 803 and the color separating and re-combining device is shown at 804 along with the three SLM devices 805. The projection lens is shown at 806.

Figure 6:
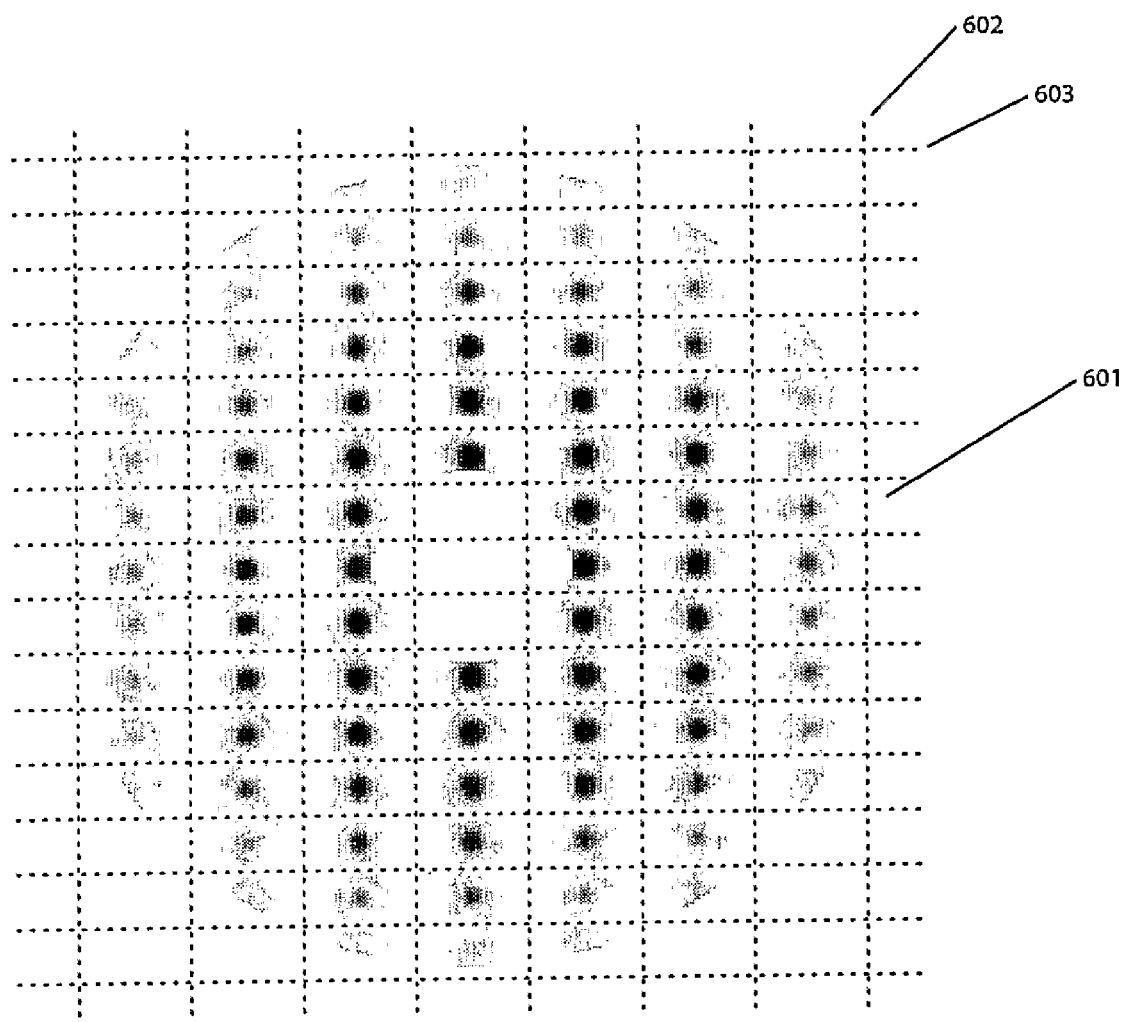
FIG. 6 illustrates the effect of an integrator bar at a central field point on the intensity distribution of the illumination source of FIG. 3.

An important fact about an integrator bar such as 802 is that if the input light distribution contains a range of angles, the output distribution will also contain the same range of angles. In other words, while the output illuminance distribution (flux per unit area) of the integrator bar is substantially uniform, the input intensity distribution (flux per solid angle) is still present at the output. By extension, in the case where the input intensity distribution is symmetric about the optical axis, the output intensity distribution is identical to the input distribution. However, there is a marked difference in the intensity distribution at the output of the integrator bar when only a single field point is considered. The intensity distribution from any field point on the output of the integrator bar may be shown to the first order to consist of multiple images of the illuminance distribution at the input of the integrating bar, created by the reflections in the integrator bar, weighted by the intensity distribution of the source. There are higher order effects when one considers the slight variation in the input intensity distribution as a function of field point on the input of the integrating bar due to the finite size of the light source. However these higher order effects only yield a slight modification to the intensity distribution within each of the multiple images and can be safely neglected. The intensity distribution is shown in FIG. 6, which is a view from a single field point on the optical axis looking back up the integrating bar towards the source. Multiple images of the input illuminance distribution from FIG. 5 are seen as at 601 where the darkest shading represents the brightest portion of the illuminance distribution. The multiple images form a grid as indicated by the lines 602 and 603. Each cell of the grid contains an image of the input illuminance distribution weighted by the input intensity distribution as previously illustrated in FIG. 4. Each cell of the grid corresponds to the solid angle subtended by the input of the integrator as viewed at its output from the chosen field point. The number of source images is a function of the number of reflections that occur within the integrator bar. Lengthening the integrator bar will produce a greater number of reflections and will therefore produce a greater number of images of the input illuminance distribution.

Figure 9:
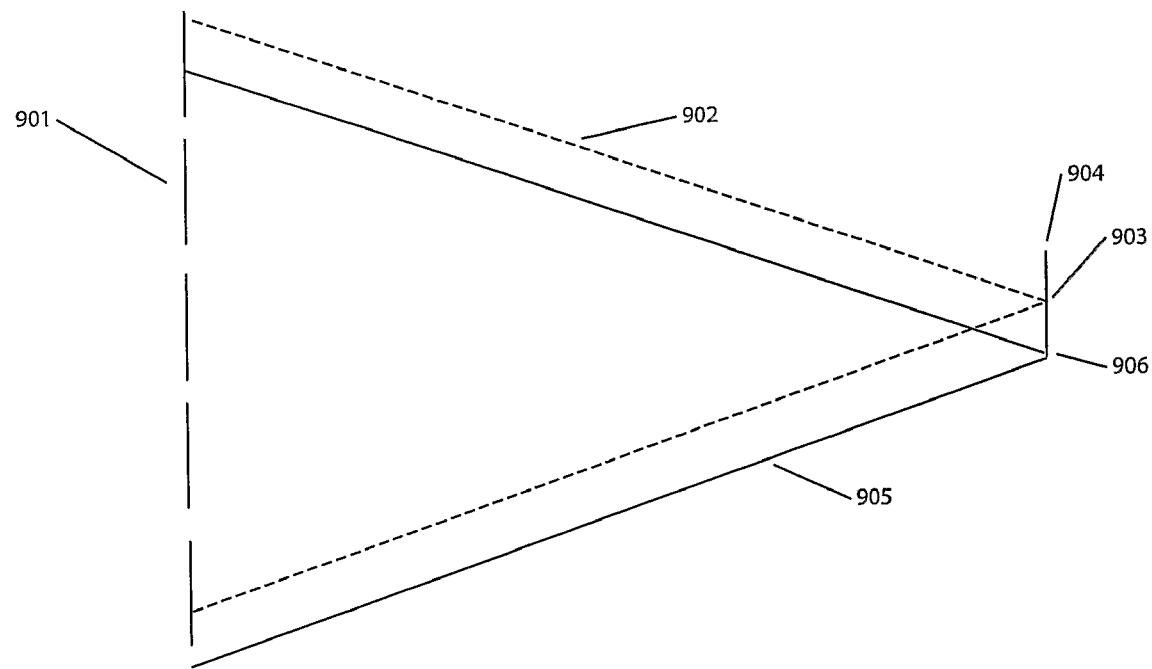
FIG. 9 illustrates the relationship between the illuminance distribution from the integrator bar and the intensity distribution of the source for the system in FIG. 8 at two field points.

As shown in FIG. 6, the intensity distribution at the output of the integrator bar at each field point is the product of the intensity distribution of the light input to the integrator bar and the multiple images of the input illuminance distribution. FIG. 9 is a representation of this situation in a sectional view with the optical axis left to right on the diagram. The lines at 901 represent the multiple images of the input illuminance distribution produced by the reflections in the integrator bar. The angle 902 formed by the aperture of the illumination system is traced to a field point 903 at the center of the resulting illuminance distribution at the output of the integrator bar 904. This same angle is traced at 905 to a field point away from the center of the output illuminance distribution, 906. This figure illustrates that at each field point the multiple images of the input illuminance distribution shift with respect to the input intensity distribution. In essence one can think of the multiple images of the source illuminance distribution as being continuously phase shifted as a given point of reference moves across the output of the integrator bar. In FIG. 6 this phase shift would be seen as being confined within each cell represented by the grid lines shown in FIG. 6. In other words there is a field position dependent shift in the position of the image of the input illuminance distribution within each of the multiple images found at the output of the integrator bar and this shift results in a change in the intensity distribution at the output of the integrator bar as a function of field point.

Figure 10:
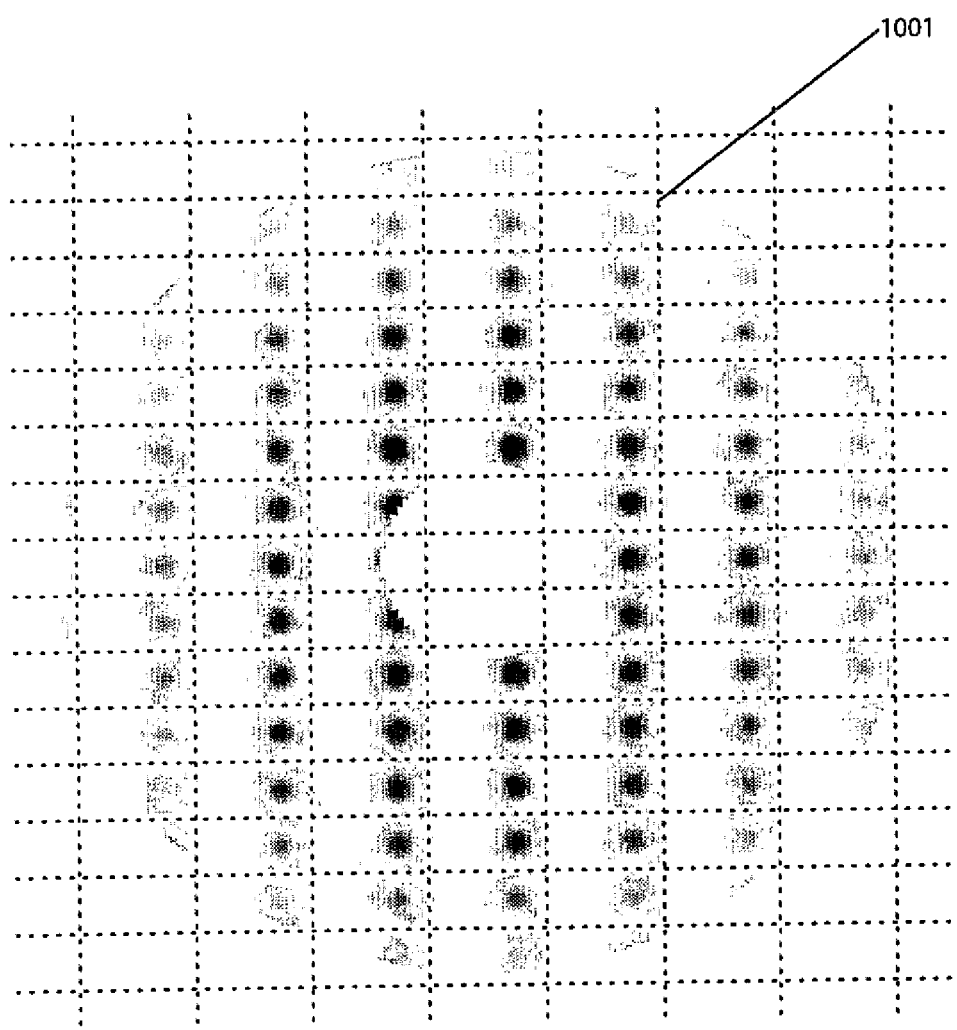
FIG. 10 illustrates the intensity distribution at the output of the integrator bar for the optical configuration of FIG. 8 at a field point to the right of the center of the optical axis.
Figure 11:
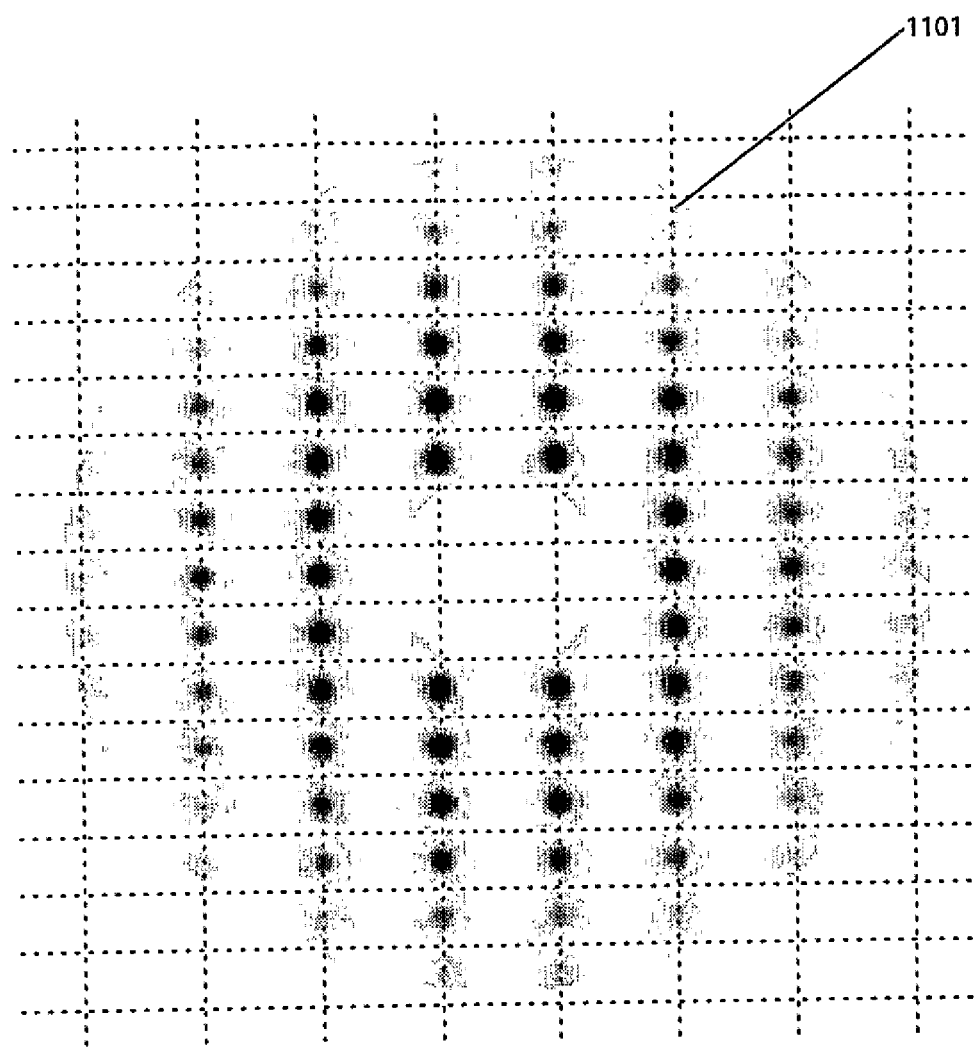
FIG. 11 illustrates the intensity distribution at the output of the integrator bar for the optical configuration of FIG. 8 at the right hand edge of the field.

The phase shift of the images within the intensity distribution is further illustrated in FIGS. 10 and 11. FIG. 10 is a view from a field point on the optical axis in the vertical direction and displaced to the right of the optical axis by one fourth of the width of the field in the horizontal direction. The multiple images of the input illuminance distribution are again seen as at 1001, but these images are shifted to the right in each cell compared to those shown in FIG. 6. FIG. 11 is a view from a field point on the optical axis in the vertical direction and displaced to extreme right edge of the field in the horizontal direction. By comparing the image of the input illuminance distribution shown at 1001 in FIG. 10 to the image of the input illuminance distribution shown at 1101 in FIG. 11, it can be seen that the images are shifted even further to the right.

As discussed earlier, in order to blend two overlapped images we need to produce a gradual fall off in the brightness of one image and a complimentary gradual increase in the brightness of the other image across the region where the two images overlap. This produces an invisible seam when the two brightness profiles are exactly matched. This is accomplished by inserting an edge blending mask such as an opaque knife edge blending mask in the imaging system, either before or after the SLM devices. If we now consider carefully the effect of the phase shift on the intensity distribution when a mask is introduced we can understand the cause of the illuminance variations or bands that appear in prior art systems of blending using edge blending masks.

Figure 12:
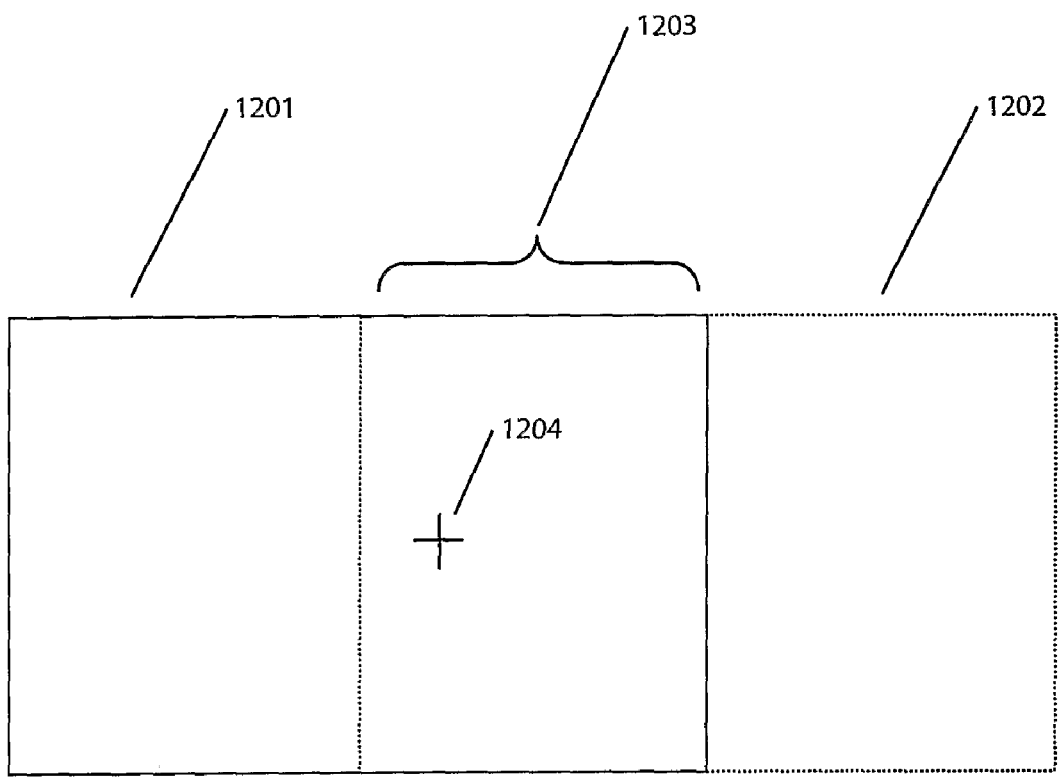
FIG. 12 illustrates the relationship of two overlapped projected images where the overlap corresponds to 50% of the total width of each projected image.

FIG. 12 illustrates the relationship of two overlapped projected images of identical width where the overlap corresponds to 50% of the total width of each projected image. The left hand projected image 1201 corresponds to 102 in FIG. 1, and the right hand projected image 1202 corresponds to 122 in FIG. 1. The overlap region 1203 corresponds to 101 in FIG. 1. The point 1204 is 25% of the distance across the overlap region from the left hand edge of the overlap region. For the purposes of illustration and referring back to FIG. 8 an opaque knife edge blending mask is now introduced into the illumination system of the projector at the output of the integrator bar 802. The knife edge is positioned so that it clips the intensity distribution of the illuminating system in order to produce a fall off in brightness across the image from the start of the overlap region to the edge of the image at the other side of the overlap region. For each of the two projectors the mask is introduced on opposite sides of the optical axis to produce two complimentary brightness ramps across the overlap region. The masks may be made of metal, or of a transparent material such as glass, preferably anti-reflection coated, that has an opaque or reflecting metal or dielectric coating applied to a portion of the transparent material to form the mask. Other methods of constructing a suitable mask will be readily apparent to those skilled in the art.

Figure 13:
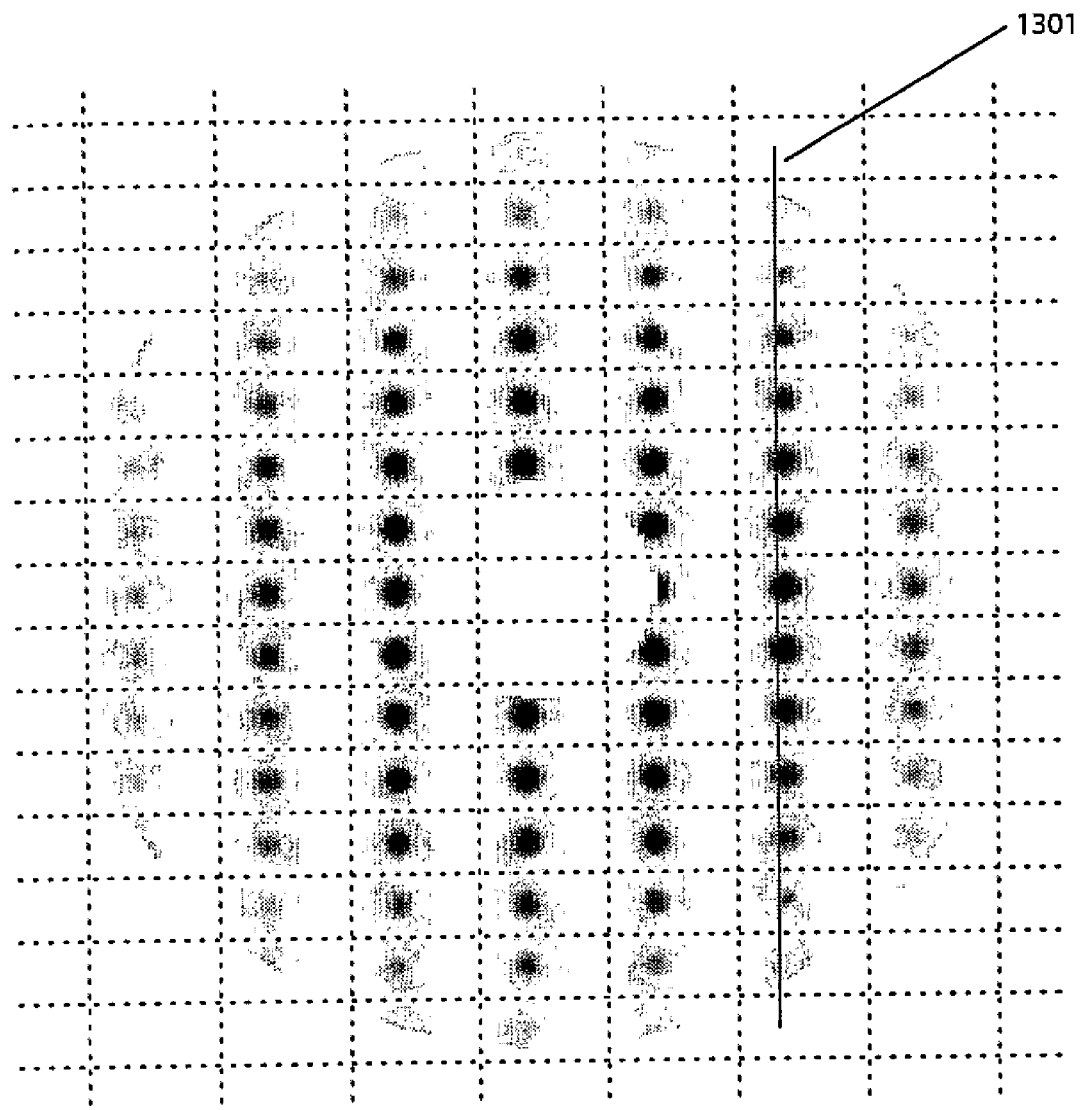
FIG. 13 illustrates the intensity distribution at the integrator bar output for the optical configuration of FIG. 8 with a knife edge blending mask at the output of the integrator bar located so as to produce a brightness ramp at the right hand edge of the projected image.
Figure 14:
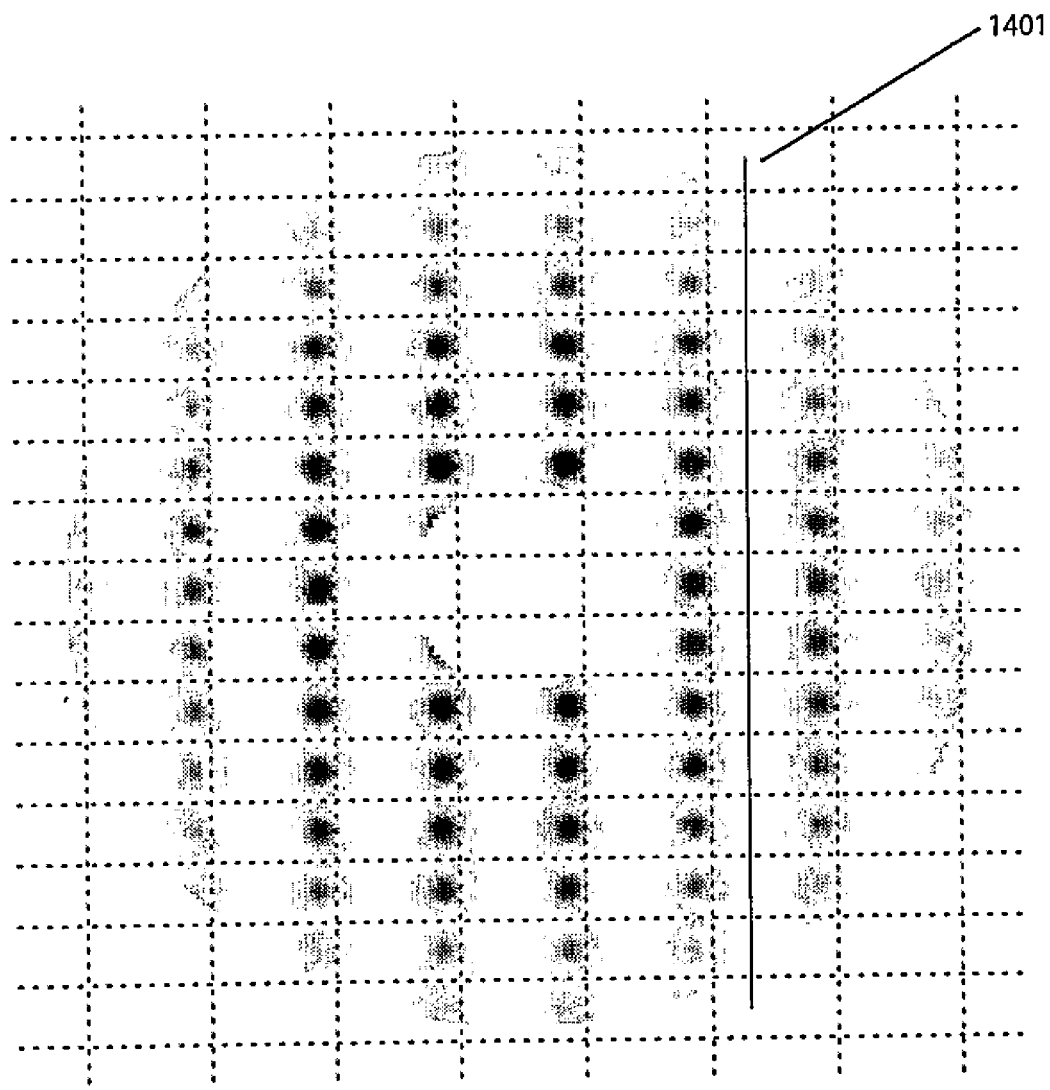
FIG. 14 illustrates the intensity distribution at the integrator bar output for the optical configuration of FIG. 8 with a knife edge blending mask at the output of the integrator bar located so as to produce a brightness ramp at the left hand edge of the projected image.

FIG. 13 shows the corresponding plot of the intensity distribution for the left hand projected image 1201 in FIG. 12 as seen from the field point 1204. The solid line 1301 shows the position of the left hand projector edge blending mask for the field point 1204. Similarly FIG. 14 shows the corresponding plot of the intensity distribution for the right hand projected image 1202 in FIG. 12 as seen from the field point 1204. The solid line 1401 shows the position of the edge blending mask for the field point 1204. The total illuminance at this point in the blending region is then found by integrating the intensity over all of the angles to the left of the blending mask position as shown in FIG. 13 for the left hand projector and then adding this to the integration of intensities for all of the angles to the right of the blending mask position as shown in FIG. 14 for the right hand projector. Due to the phase shift the total flux that will result is not the same as what would result from integrating over the entire intensity distribution of either figure.

Figure 15:
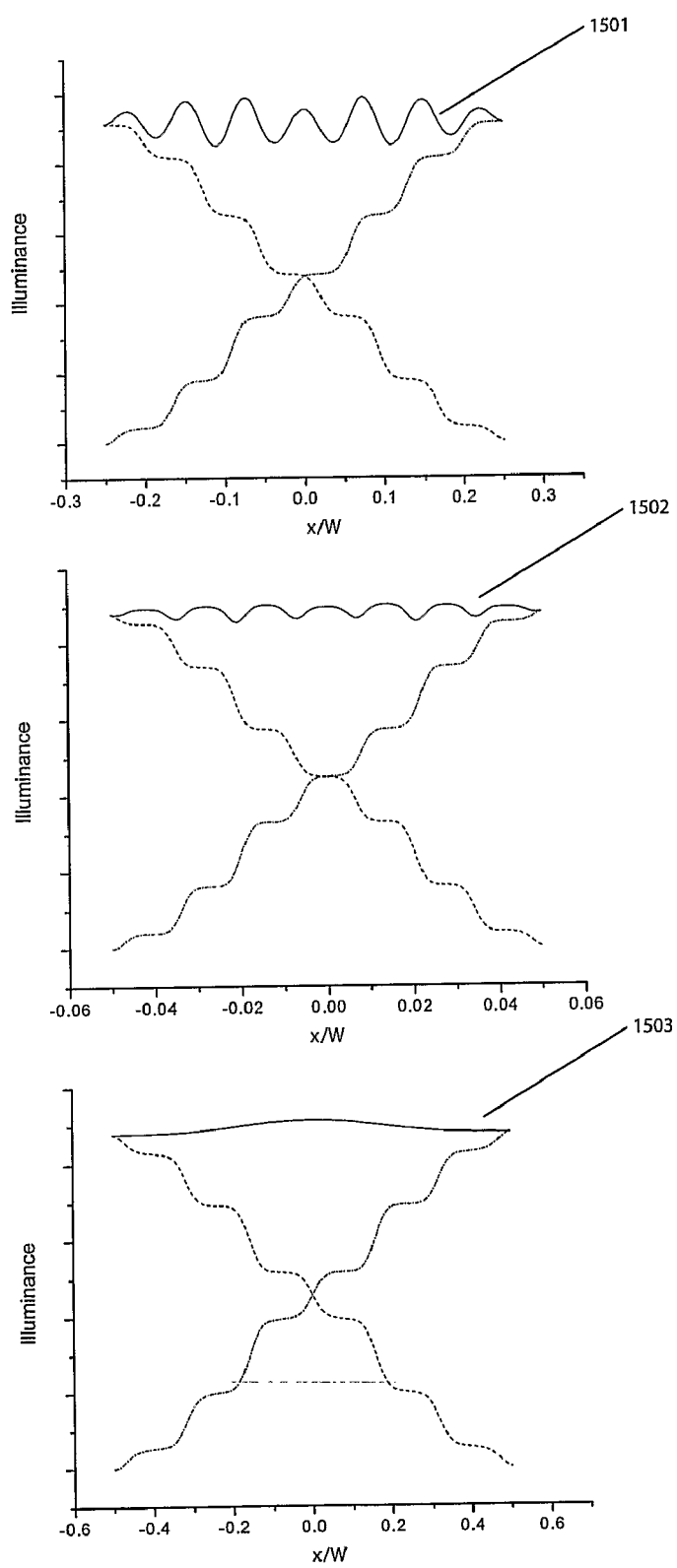
FIG. 15 illustrates the illuminance profiles across the overlap region for various amounts of overlap between two projected images.

A similar procedure can be carried out to evaluate the illuminance at every field point across the blending region, and the results of this evaluation are shown in the graph at 1501 in FIG. 15. This graph shows the illuminance profile for a flat field image as a function of position x across the overlap region W of two projected images of identical width where the overlap region W corresponds to 50% of the total width of each projected image.

FIG. 15 also shows at 1502 the illuminance profile for a flat field image as a function of position x across the overlap region W of two projected images of identical width where the overlap region W corresponds to 10% of the total width of each projected image, and at 1503 where the two images are 100% overlapped. Detailed analysis shows that the only case where the variations in illuminance as a function of position across the blending region are exactly in phase is when the blending region is 100% of the image width and the two images are fully overlapped. In all other cases the variations in illuminance are out of phase with the worst case variation corresponding to an overlap region that is 50% of the total width of each projected image. This is the worst case of illuminance variation across the blending region because in this case the variations in illuminance as a function of position across the blending region for each projector are exactly 180 degrees out of phase.

Figure 16:
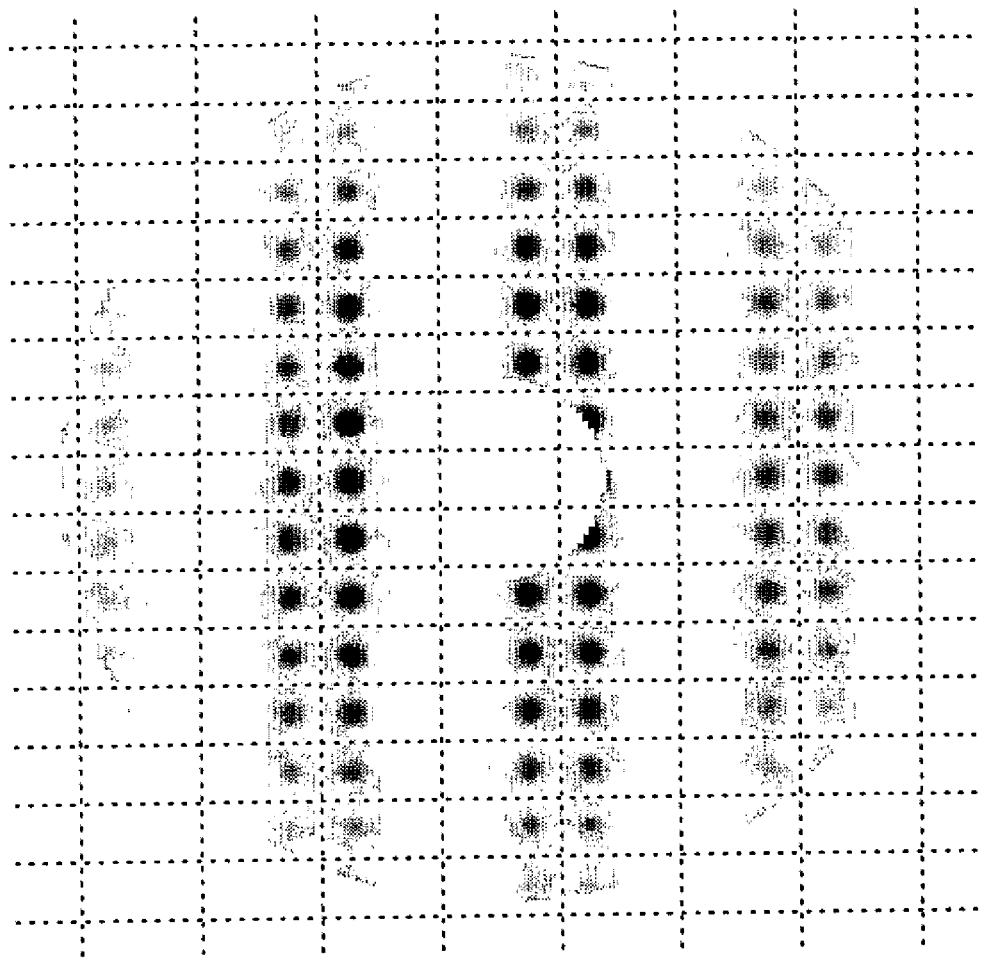
FIG. 16 illustrates the intensity distribution at the integrator bar output for the optical configuration of FIG. 8 with misalignment of the lamp.
Figure 17:
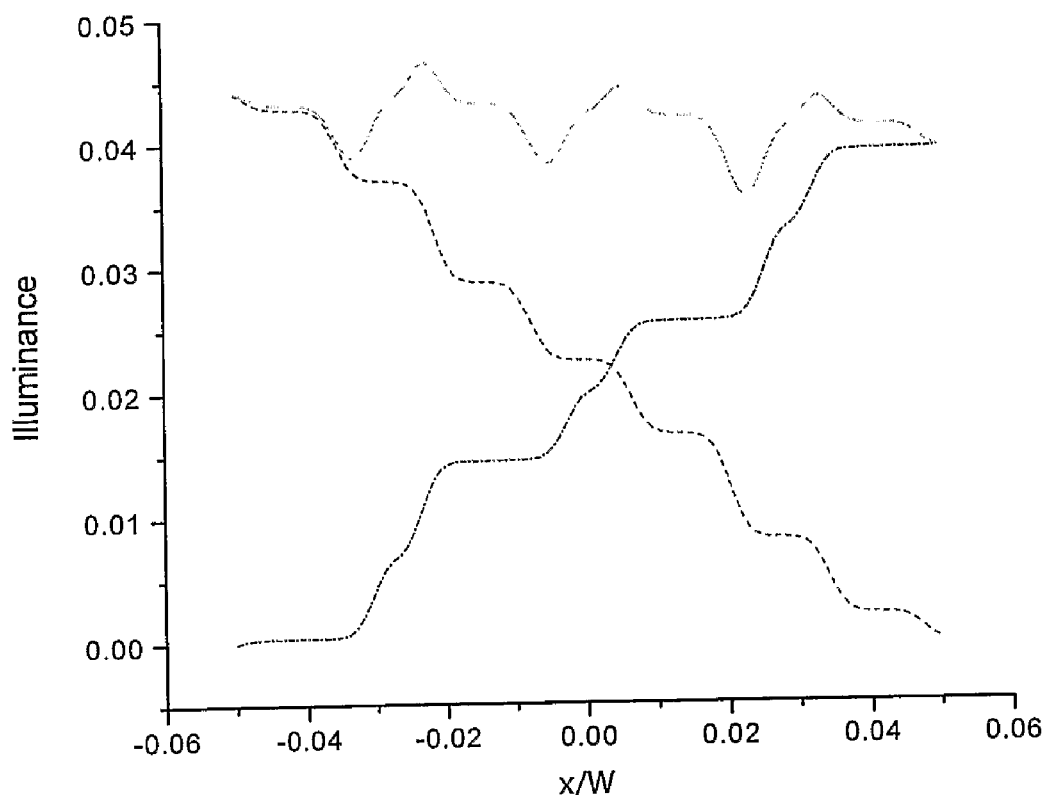
FIG. 17 illustrates the illuminance profile across the overlap region for an overlap between two projected images of 50% with one projector having a misaligned lamp.

The description above relates to the limitations of brightness uniformity for a perfectly aligned system. FIG. 16 shows the intensity distribution that results when the lamp is misaligned with respect to the integrator bar. FIG. 17 shows the resulting screen brightness non-uniformity when the image from a projector with a misalignment like that of FIG. 16 is combined with one that is correctly aligned using a 50% overlap between the two images. This illustrates how the uniformity generally worsens with misalignments in the optical system.

Inspection of FIG. 8 suggests other points in the system where the knife edge blending mask might be located, such as at the input or output of the illumination relay 803, or near the SLM devices 805, or after the projection lens 806. These locations represent planes that are offset from any image plane that is conjugate to the screen. However, it remains true that there is still a clipping of the intensity distribution that varies as a function of field point in all of these cases. Further more, because of the construction of the projector's illumination system it is very unlikely that the intensity distributions of any two systems will be well matched and so the magnitude of the illuminance variations will likely be greater than those shown for example at 1502 in FIG. 15.

The problem of irregularities in the overlap region can be solved by in essence reducing or eliminating the effect of the edge blending mask on the non-uniform intensity distribution of the light in the projection system. This can be done by either making the intensity distribution more uniform or by randomizing the distribution of images within the intensity profile.

The frequency of the illuminance variations or bands in the overlap region can be understood to be a function of the number of images of the input illuminance distribution produced by the integrator bar. These images are a direct function of the number of internal reflections that occur as each ray of input light travels through the integrator bar. A longer bar allows each ray to undergo more internal reflections or bounces, and therefore a longer integrator bar produces a greater number of images of the input illuminance distribution. A greater number of images produces a greater number illuminance variations or bands in the overlap region when a knife edge blending mask is used, but each of these illuminance variations is correspondingly smaller. When each of the illuminance variations is smaller, the magnitude of the variation in brightness in the projected image is also reduced. Therefore, increasing the number of internal reflections by lengthening the integrator bar will mitigate to some degree the visibility of the banding.

Likewise, as the horizontal and vertical dimensions or cross section of the integrator bar are changed with respect to the length, a bar with a smaller cross section compared to its length will produce a greater number of images of the input illuminance distribution. The number of multiple images of the input illuminance distribution found in each direction, horizontally and vertically, as a seen from any field point at the output of the integrator bar, will therefore be a function of the aspect ratio of the integrator bar. The smaller dimension of the integrator bar will have a correspondingly greater number of multiple source images per unit area compared to the greater dimension of the integrator bar. Another way of saying this is simply to state that the aspect ratio of the integrator bar is preserved in each of the multiple source images, and when the integrator bar has a rectangular shape the multiple source images will have a rectangular shape.

Figure 18:
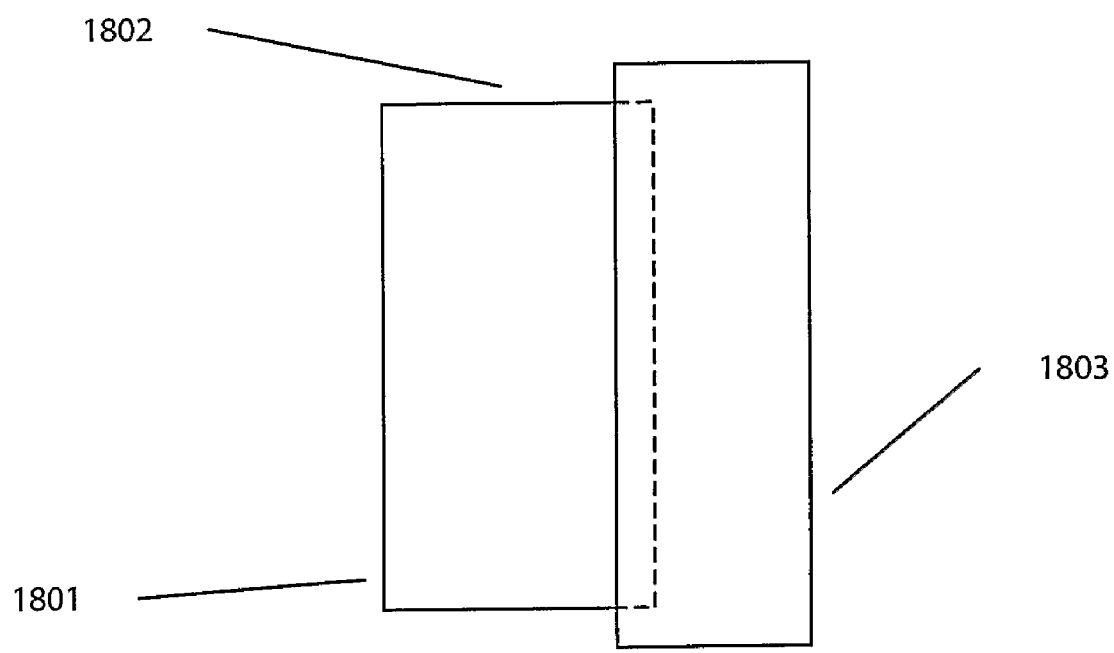
FIG. 18 illustrates an improved arrangement for an edge blending mask according to the present invention.

As previously described, the shape of the integrator bar is commonly rectangular, and the aspect ratio of this rectangle is usually matched to the aspect ratio of the SLM devices employed in the projector. Since the number of multiple source images is a function of the number of internal reflections that occur in the integrating bar, and the number of internal reflections will be greater for the narrow dimension of the bar, the amplitude of the illuminance variations produced when a knife edge blending mask is introduced will be less when the knife edge crosses the narrow dimension as shown in FIG. 18. At 1801 in FIG. 18 is a representation of the projected image area with a narrow horizontal dimension 1802 with respect to the vertical dimension. The integrator bar is oriented in a corresponding orientation with the narrow dimension as at 1802 in FIG. 18. Edge blending mask 1803 is positioned to cross the narrow dimension 1802 of the projected image and therefore the narrow dimension of the integrator bar in the projector.

In motion picture applications it is common for the horizontal dimension of the image to be between 1.66 and 2.39 times that of the vertical dimension. In SLM based projection displays using a single projector this aspect ratio may be achieved either by providing an SLM with the corresponding aspect ratio, or using a subset of the area of the SLM, or by using an anamorphic lens to transform the aspect ratio of the SLM to the desired aspect ratio when projected onto the screen.

When multiple projection displays are tiled together, the aspect ratio of the resulting composite image is a function of the aspect ratio of the individual displays, the number of displays used, and the amount of overlap between each of the displays. For example, in the arrangement of FIG. 1, where two projectors are tiled together, if the aspect ratio of each projector is 1.33:1, and the major dimension of each projector's image is horizontal, then the composite image, assuming a 10% overlap between the two displays, will have an aspect ratio of 2.394:1. Alternatively, if the major dimension of each projector's image is vertical, then with a 10% overlap between the two displays, the resulting composite image will have an aspect ratio of approximately 1.35:1. As can now be appreciated, depending on the desired aspect ratio of the composite image, it may be an advantage to arrange the major dimensions of the SLM devices horizontally or vertically.

Returning to the integrator bar, it is also the case that when the major axis of the SLM device is arranged horizontally or vertically, then the integrator bar in the illuminating system will also have its major dimension arranged horizontally or vertically to correspond to the position of the SLM device. As shown in FIG. 18, by selecting the orientation of the individual projection displays so that the knife edge 1803 traverses the smaller axis 1802 of each projected image 1801, the visibility of the banding produced by a knife edge blending mask may be correspondingly reduced compared to an arrangement where the knife edge transverses the larger axis of each display.

In the case where the aspect ratio of the SLM devices used in the projector is 2 or more, and the corresponding integrator bar is matched to the aspect ratio of the SLM, it is likely that the integrator bar will be overfilled on the narrow axis. This is because the illumination source (lamp and reflector) typically possesses radial symmetry, while the integrating bar is now quite asymmetrical between the horizontal and vertical dimensions. In the direction of overfilling, a more uniform portion of the intensity distribution at the input of the integrating bar is selected. This means that along the corresponding axis of each cell of the multiple input illuminance distributions as seen at the output of the integrator the illuminance distribution seen is more uniform and this reduces the effect of the shift of these multiple images within each cell as a field point traverses the integrator bar in a direction parallel to the overfilled axis. This will produce a corresponding reduction in the amplitude of the illuminance variations that arise when as shown in FIG. 18 a knife edge blending mask 1803 is introduced such that it crosses the narrow axis 1802 of the projected image 1801.

This can be applied to any shape of integrator bar at the expense of efficiency by arranging the illuminating system to overfill the input of the integrator bar in both directions.

Figure 19:
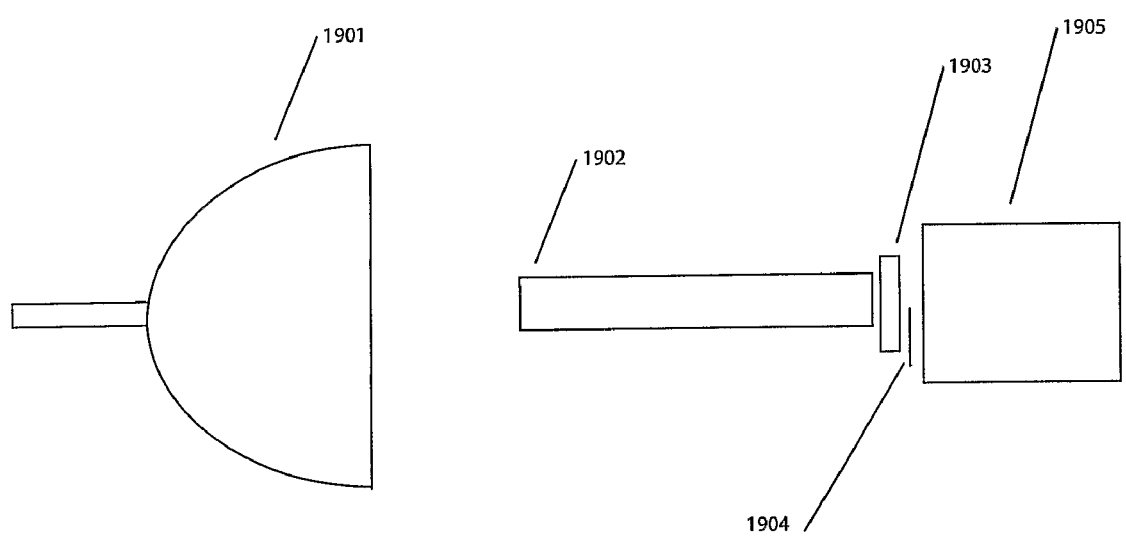
FIG. 19 illustrates the optical configuration of a projector incorporating a diffuser element according to the present invention.

Another method of making the intensity distribution more uniform is to incorporate a diffusing or scattering element in the illumination system. This is shown in an exemplary embodiment in FIG. 19. The lamp and reflector is shown at 1901, and the integrator bar at 1902. The diffuser, 1903 is inserted at the output of the integrator bar 1902, prior to the edge blending mask 1904, and the diffused light then proceeds to illumination relay 1905. The diffuser alters the intensity distribution at the output of the integrator bar by scattering the light rays. The angle of scattering is selected to provide the required reduction in brightness irregularities across the blending region without causing a significant loss of light due to the increase in the overall angular distribution of the light that results from the action of the diffuser. Note that the amount of scattering needed decreases with integrator bar length as it is a washing out of the images shown in FIG. 6 that is necessary and the angular extent of each image decreases linearly with integrator bar length. Thus, with an integrator bar of sufficient length, the loss due to the scattering can typically be kept below 3-5%. FIG. 19 omits the remainder of the projector's optical system, which would be similar to that shown in FIG. 8. It should be understood that the edge blending mask 1904 can be located in a number of locations after the integrating bar and diffuser. The location shown in FIG. 19 is an example, and upon consideration of the projector's optical system other suitable locations for the edge blending mask will be apparent to one skilled in the art.

With a conventional integrator bar of uniform rectangular cross section matched to the aspect ratio of the SLM device, the multiple images of the input illuminance distribution at the integrator bar output shift in a regular manner as a function of field point. For all useful partial overlaps of two images projected by such a system the introduction of an edge blending mask produces illuminance variations or bands in the image due to the fact that for every location in the blending region (except for the center of the blending region) the corresponding field points for the two images are different, resulting in a phase difference between the shifted images of the input illuminance distribution. This phase difference is constant across the blending region resulting in a distinct pattern that is often quite visible. Another method of reducing the illuminance variations across the blending region is to change the way in which the input images shift as a function of field point at the output of the integrator.

Figure 20:
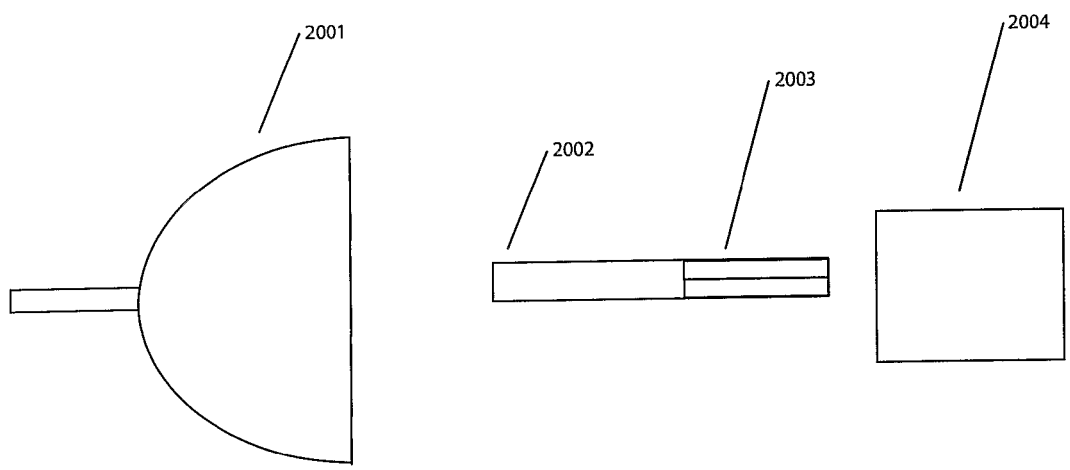
FIG. 20 illustrates an improved configuration for the integrator bar of the optical configuration of FIG. 8 according to the present invention.

A first method for accomplishing this is shown in FIG. 20. The lamp and reflector is shown at 2001, and the illumination relay at 2004. A first section of solid integrator bar 2002 of rectangular cross section is followed by a second section consisting of a plurality of integrators as at 2003, all separated by a minute air gap or reflectively coated, with the two sections forming a composite integrator. The smaller bars in the second section may each be of any shape, such as a square or triangle, but in any case the total cross sectional area of the smaller bars will normally be equal to the cross sectional area of the first section integrator bar. The smaller bars serve two purposes. The first is to produce more images within the intensity distribution without the expense of increasing the integrating bar length. The second is that the smaller bars may be designed to result in much more complex overlapping patterns of source images. Although a shift of these images will still occur as a function of field point the complex pattern eliminates distinct phase relationships between overlapped images so that the variations in illuminance that occur when these are clipped and integrated are both reduced in magnitude and made more random in nature. The smaller bars may also be tapered in various ways in order to further modify the source image patterns at the output of the integrator bar, but it is desirable that when the tapers of the various smaller bars are added together a numerical aperture (NA) results that is matched to the etendue of the SLM devices. It is understood that such a scheme is not etendue efficient and in a system that is etendue limited, there will be a sacrifice in efficiency that increases as the distinct tapers of the smaller bars become more pronounced. It may also be desirable to introduce an overall taper between the input and the output ends of the composite integrator in order to adjust the NA of the composite integrator to suit the SLM devices being illuminated. It would often be desirable to follow the section of smaller bars with another section of solid rectangular bar (of either uniform or tapered cross section) to further smooth the illuminance distribution prior to the SLM devices.

Figure 21:
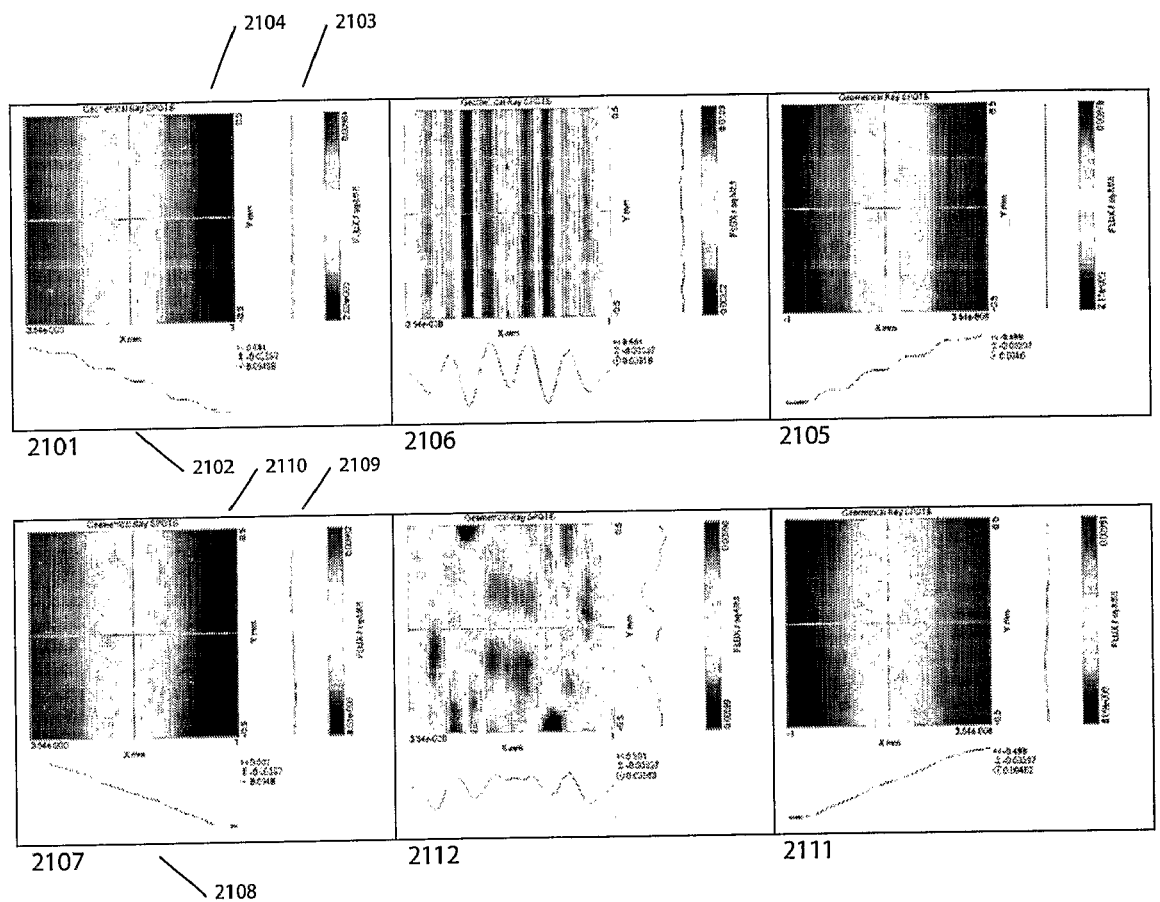
FIG. 21 illustrates the illuminance profiles across the overlap region resulting from the improved configuration of FIG. 20.

FIG. 21 is a graph that shows the illuminance profile across the overlap region between two images blended by a knife edge blending mask when a split integrator bar similar to that shown in FIG. 20 is used. In the case of FIG. 21 a length of solid integrator bar with a rectangular cross section was followed by a length of integrator bar with the same cross section but divided into two parts on the diagonal across the rectangular cross section, and an additional solid integrator bar of the same cross section followed this divided section. The first and last portions are ¼ of the total length of the integrator bar, and the middle section is ½ of the total length of the integrator bar or twice as long as the first and last portions.

At 2101 in FIG. 21 the illuminance profile is shown for the blending region of the left image, corresponding to 1201 in FIG. 12, blended with a knife edge and where the overlap between the two images is 50% of the width of each image. This result corresponds to what would be produced by a typical prior art illumination system incorporating an integrating bar such as that shown in FIG. 8. At 2102 the graph shows the illuminance as a function of position horizontally across the blending region. At 2103 the graph shows the illuminance as a function of position vertically through the center of the blending region. At 2104 the appearance of the blending region is illustrated with the grayscale representing an exaggerated version of the illuminance variations in the blending region. Similarly at 2105 the illuminance profile is shown for the right image, corresponding to 1202 in FIG. 12. The resulting illuminance profile when the two images are overlapped is shown at 2106. This corresponds to the illuminance profile shown at 1501 in FIG. 15. Note that in the illustration of the grayscale image of the blending region when the two images are overlapped the variations in the illuminance profile extend over the entire image in the vertical direction, making vertical bands or stripes as previously explained in FIG. 2.

At 2107 in FIG. 21 the illuminance profile is shown for the blending region of the left image, corresponding to 1201 in FIG. 12, blended with a knife edge and where the overlap between the two images is 50% of the width of each image. This result corresponds to what would be produced by the invention of FIG. 20 incorporating an integrating bar composed of three sections with the center section divided into two parts along the diagonal of the cross section as described above. At 2108 the graph shows the illuminance as a function of position horizontally across the blending region. At 2109 the graph shows the illuminance as a function of position vertically through the center of the blending region. At 2110 the appearance of the blending region is illustrated with the grayscale representing an exaggerated version of the illuminance in the blending region. Similarly at 2111 the illuminance profile is shown for the right image, corresponding to 1202 in FIG. 12. The resulting illuminance profile when the two images are overlapped is shown at 2112. Note that in this illustration of the grayscale image of the blending region the variations in the illuminance are smaller and composed of more or less random areas, making them much more difficult to see.

A second method for changing the way in which the input images shift as a function of field point at the output of the integrator is to alter the pattern of shift in the image. For example, changing the shape of the input section of the integrator bar in FIG. 20 to a round or oval shape and the output section to a single rectangular bar with a cross sections matched to the input section would result in a pattern of rings rather than rectangular cells. The input image shift in this pattern of cells will not be related in a regular way to field position across the overlap region, and so the resulting pattern of illuminance variations for two blended images will not contain a pattern that will be particularly visible.

Another solution to the presence of illuminance variations in the overlap region of two optically blended images produced by two SLM based projectors, each incorporating an integrator bar, is to change the shape of the edge blending mask so that the differences in flux between the two images at each field point in the overlap region are reduced. As previously shown in FIG. 15, these differences result from a difference in phase of the field position dependent shift of the multiple images of the input illuminance distribution that is found at the output of each integrating bar. As also shown in FIG. 15 this phase difference is a function of the amount of overlap between the two images.

This can be understood by considering a pair of projectors arranged as shown in FIG. 1 to produce a left hand projected image 102, and a right hand projected image 122, with an overlap region 101. By adjusting the position of one of the projected images with respect to the other the amount of overlap, 101, can be varied from 100%, with the two images exactly on top of each other, to 0%, with the two images exactly juxtaposed or side by side. As previously shown in FIG. 15, the phase difference ranges from 0 degrees when the two images are 100% overlapped, to 180 degrees when the overlap between the two images is reduced to 50%. As the overlap is further reduced the phase shift continues to increase reaching 360 degrees when the images are exactly juxtaposed. Since the system is axially symmetric the effect of phase shifts from 180 to 360 degrees corresponds to the effect of phase shifts from 180 to 0 degrees.

As FIG. 15 also shows, ripples appear in the light fall-off profile produced by each knife edge blending mask. Further consideration of this phenomenon, as discussed in FIGS. 13 and 14, shows that these ripples arise because the multiple images of the input illuminance distribution shift with respect to the mask as a function of field point. In effect this shift results in varying amounts of the area occupied by each of the multiple images being cut off by the mask. This shift occurs in a systematic way, with the number of multiple images and the amount of shift as a function of field point being determined by the configuration of the illumination system, including the integrator bar geometry.

Figure 22:
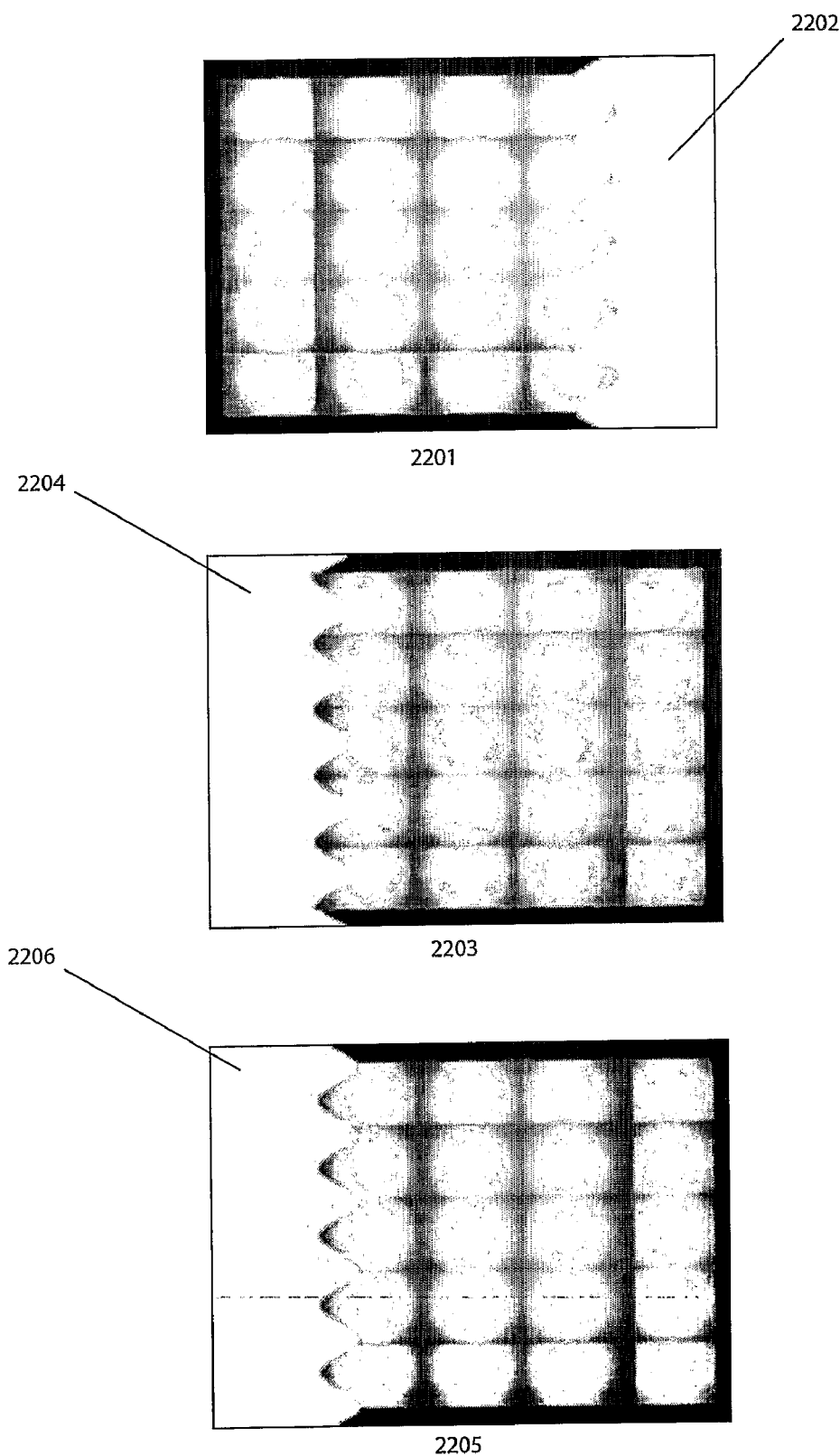
FIG. 22 illustrates an alternative configuration for an edge blending mask according to the present invention.

A method of reducing the ripples in the light fall-off profile produced by an edge blending mask is therefore to design the shape of the mask to take into account the way in which the multiple images of the input illuminance distribution shift as a function of field point. This will make the effect of the mask less dependent on the shift of the multiple images of the input illuminance distribution while preserving its overall effect on the total illuminance, resulting in an illuminance profile across the blending region that will have a gradual fall-off with a reduction in the ripples found in the light fall-off profile. This is shown in an exemplary embodiment in FIG. 22. This figure shows at 2201 a portion of the multiple images of the input illuminance distribution similar to those shown in FIG. 6, previously described. In FIG. 22 the lightest shading represents the brightest portion of the illuminance distribution. The multiple images form a grid and each cell of the grid corresponds to the solid angle subtended by the input of the integrator as viewed at its output from the chosen field point. An edge blending mask is shown at 2202, this mask corresponds in function to the mask shown at 103 in FIG. 1 for the left hand projector 115 in FIG. 1. The mask is located at the output of the integrator bar of the illuminating system for the projector 115, similar to 1904 in FIG. 19, and omitting diffuser 1903. The mask 2202 is shaped so that as the overlap region is traversed horizontally towards the right hand side of the figure, the corresponding effect of the mask is to gradually increase the obscuration of each of the multiple images in a constant manner even though each of the multiple images shifts in position with respect to the mask as a function of field point. This results in an illuminance profile across the blending region that will have a gradual fall-off with a reduction in the ripples found in the light fall-off profile such as those that result from a conventional knife edge blending mask.

At 2203 in FIG. 22 a portion of the multiple images of the input illuminance distribution is again shown, along with a second mask, 2204. This mask corresponds in function to the mask shown at 123 in FIG. 1 for the right hand projector 135 in FIG. 1. Mask 2204 is also located at the output of the integrator bar of the illuminating system for the projector 135, similar to 1904 in FIG. 19, and omitting diffuser 1903. The mask 2204 is complimentary in shape to the mask shown at 2202, and is shaped so that as the overlap region is traversed horizontally towards the left hand side of the figure, the corresponding effect of the mask is to gradually increase the obscuration of each of the multiple images in a constant manner even though each of the multiple images shifts in position with respect to the mask as a function of field point. Because both of the masks 2202 and 2204 produce a gradual fall-off in the illuminance profile of the corresponding projected images across the overlap region with a reduction in the ripples found in the light fall-off profile, the appearance of banding in the overlap region is also reduced, improving the quality of the blend between the two images and resulting in a composite image with reduced banding artifacts and reduced variations in illuminance in the overlap region.

As can be appreciated by consideration of FIG. 22, in order for the overlap region to have a uniform and constant level of illumination it is necessary for the two edge blending masks to have an exactly complimentary relationship so that the combined effect of the two masks is to cover the entire overlap region. As can also be understood by consideration of a mask as shown for example at 2202 in FIG. 22, the relationship of the pattern to the multiple images of the input illuminance distribution may be varied by increasing the depth of the pattern in the horizontal direction. In the example shown at 2202 in FIG. 22 the depth of the pattern has been selected to correspond to one occurrence of an image of the input illuminance distribution, but this could also be two or more in order to modify the effect of the mask on the reduction of ripples in the light fall-off profile produced by the mask.

Because the quality of the blending achieved in the overlap region depends on the illumination profiles across the blending region for each image being as complimentary in slope and as identical in contour as possible, and alternative way of producing a complimentary mask for the right hand projector is exemplified in FIG. 22 at 2205. Here the edge blending mask 2206 has exactly the same relationship to the images of the input illuminance distribution shown at 2205 as the mask 2202 does to the images of the illuminance distribution shown at 2201.

Comparison of 2201 and 2215 in FIG. 22 will reveal that complete registration of the patterns of the two masks 2202 and 2206 requires that one projected image must be shifted vertically by a distance that corresponds to one half cycle of the mask pattern. The two projected images can be kept in registration by moving the position of the image on the SLM devices in one of the projectors by the same amount in the opposite direction. There will be a corresponding loss of picture height, since each projected image will have to be masked (at the top in one case, and the bottom in the other) to make a continuous total image, but in a practical system there will be many more source images and the pitch of the mask will be finer, making the required vertical phase shift small, and therefore making the loss of picture height small as well.

In other words, if the two masks are to align in a complimentary fashion the design of mask 2206 requires that the image from the right hand projector (corresponding to 122 in FIG. 1) be displaced vertically by an amount that allows the mask profile of mask 2206 to compliment (or interdigitate with) the profile of the mask 2202.

It should also be noted that as a field point traverses the overlap region in the vertical direction there would be a phase shift effect similar to that seen in the horizontal direction. In the case of a knife edge blending mask this does not result in any field point dependent changes in flux contribution because the vertical phase shift is parallel to the mask edge. However, in the case of the mask suggested above the vertical phase shift must be considered, and ripples or variations in the illuminance of the screen may appear. As previously described, the number of multiple images of the input illuminance distribution found in the vertical direction will be related to the aspect ratio of the integrator bar in the illuminating system. If the aspect ratio is such that the vertical dimension of the integrator bar is significantly smaller than the horizontal dimension, the vertical dimension of the integrator bar will have a correspondingly greater number of multiple source images per unit area. In this case any illuminance variation that may occur due to the phase shift will be correspondingly smaller, and ripples are less likely to appear.

If there is no vertical offset between the two images, as described for the masks 2202 and 2204 in FIG. 22, then no ripples will appear because the multiple source images all shift in the same way at each vertical field point for both projected images, and so the problem of differing phase that is seen in the horizontal case does not arise.

The masks of FIG. 22 may be made of metal, or of a transparent material such as glass, preferably anti-reflection coated, that has an opaque or reflecting metal or dielectric coating applied to a portion of the transparent material to form the mask. Other methods of constructing a suitable mask will be readily apparent to those skilled in the art.

This invention is distinct from that of Maximus et al. described earlier because here the pattern and location of the mask is chosen with regard to the configuration of the illumination system, including the integrator bar geometry, whereas in Maximus et al. the pattern is chosen based on its location in the optical system so that its image will be projected out of focus onto the projection screen and without any diffraction effects.

Figure 23:
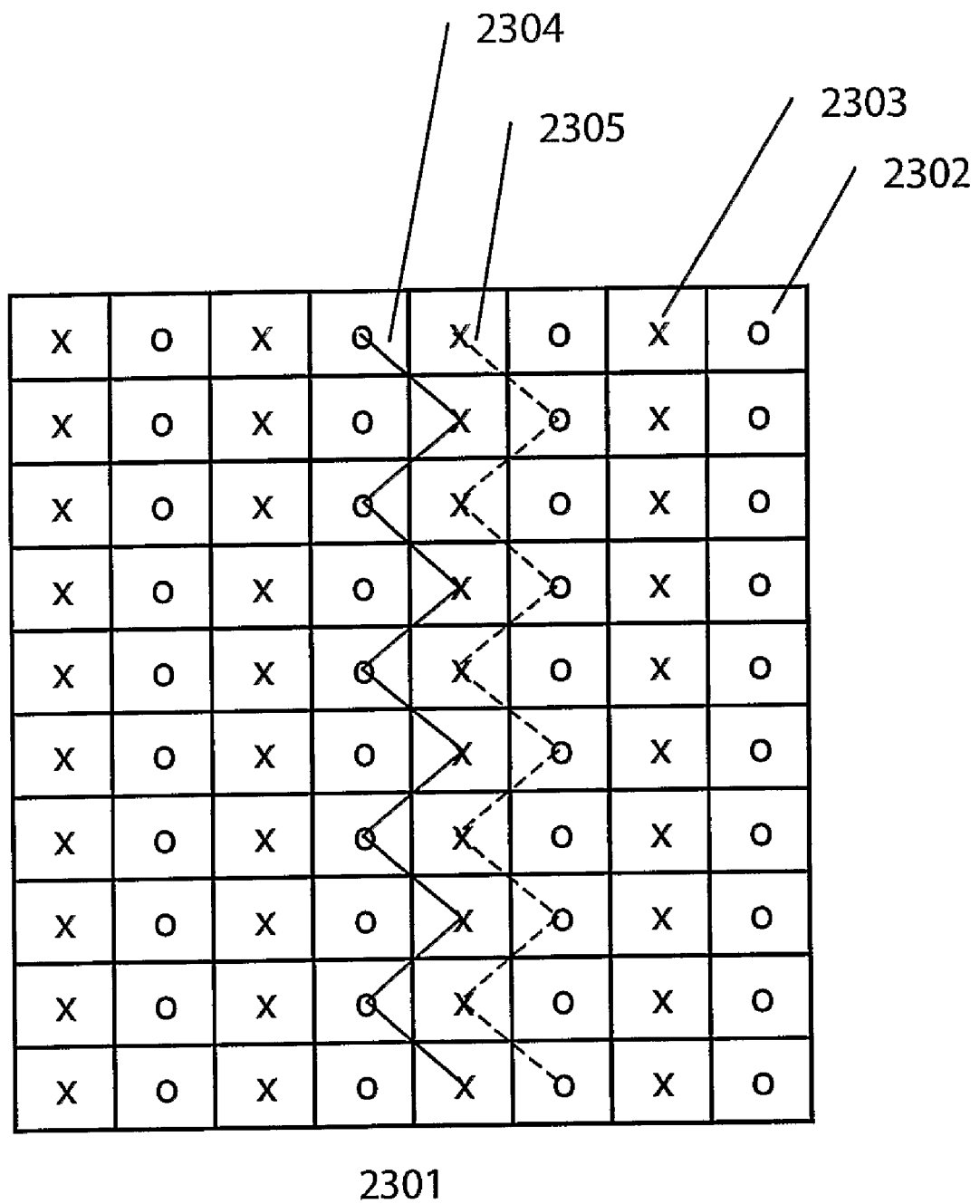
FIG. 23 illustrates a second alternative configuration for an edge blending mask according to the present invention.

An alternative to shaping each edge blending mask to produce a more uniform illumination profile in the blending region can be understood with reference to the exemplary embodiment in FIG. 23. This figure shows at 2301 a representation of a portion of the multiple images of the input illuminance distribution similar to those shown in FIG. 6, previously described, from two projectors, corresponding to the two projectors 115 and 135 in FIG. 1. The two representations of the multiple images of the input illuminance distribution are shown overlapped by 50%. The peak of the illuminance distribution in each of the multiple images of the input illuminance distribution found at the output of the integrator bar for one projector is represented by the small circles as at 2302, and the peak of the illuminance distribution in each of the multiple images of the input illuminance distribution found at the output of the integrator bar for the other projector is represented by the small x symbols as at 2303. An edge blending mask for one of the projectors, corresponding for example to the mask 103 for the left hand projector 115 in FIG. 1, is represented by the solid line at 2304, and this mask would be located at the output of the integrator bar of the illuminating system in the projector 115, similar to 1904 in FIG. 19, and omitting diffuser 1903.

It can be seen that the peaks of the two illuminance distributions in the overlap region represented by 2301 in FIG. 23, appear in alternate cells of the multiple images of the input illuminance distribution, this corresponds to the case of 50% overlap of the two projected images, as shown at 1203 in FIG. 12. Note that if the mask is shifted with respect to this illuminance distribution as represented by the dashed outline at 2305, the effect of the mask remains the same. Shifting the mask also corresponds to moving the field point from which the two illuminance distributions are seen.

The shape of the mask shown in FIG. 23 at 2304 is chosen taking into account the configuration of the illumination system, including the integrator bar geometry, and the phase shift between the multiple images of the input illuminance distribution that is found at the output of the integrating bars in the two projectors. Other shapes of mask that will accomplish this purpose will be apparent to those skilled in the art and these alternative shapes may be employed without departing from the spirit of the invention.

The masks of FIG. 23 may be made of metal, or of a transparent material such as glass, preferably anti-reflection coated, that has an opaque or reflecting metal or dielectric coating applied to a portion of the transparent material to form the mask. Other methods of constructing a suitable mask will be readily apparent to those skilled in the art.

This invention is distinct from that of Maximus et al. described earlier because here the pattern and location of the mask is chosen with regard to the overlap dependent phase shift and the configuration of the illumination system, including the integrator bar geometry, whereas in Maximus et al. the pattern is chosen based on its location in the optical system so that its image will be projected out of focus onto the projection screen and without any diffraction effects.

The illuminance irregularities in an optical blending configuration may therefore be reduced or eliminated by any of these techniques used singly or in combination. Other embodiments of these inventions will be apparent to those skilled in the art and are encompassed by the spirit of the present invention which is based on a greater understanding of the nature of the light in the illumination system for a SLM based projector. It should also be understood that these techniques could be applied to the overlapping and blending of more than two projected images in any pattern.

The effects of a knife edge on the illuminating light in a SLM based projector also extend to additional effects on the color of the image in the blending region. SLM based color projectors commonly employ a color separating and re-combining device using dichroic bandpass filters to separate white light into three spectral bands (corresponding to red, green and blue colors) prior to illuminating the SLMs and then recombine the modulated light from each of the three SLMs prior to the projection lens. These filters have a spectral reflectance and transmittance that is a function of the incident angle of the light passing through the filter. In typical color separating and re-combining devices the angle of incidence used is other than 0 degrees. The wavelength shift for a dichroic filter is approximated by the following equation:

$$\lambda_s = \frac{\lambda}{n} * \sqrt{n^2 - \sin^2\theta} \qquad (1)$$

where:
$\lambda_s$ wavelength resulting from tilt angle $\theta$
$\lambda$=the wavelength at zero angle of incidence
n=the effective refractive index of the dichroic coating stack As equation (1) shows a filter used at non-zero angles of incidence when tilted to greater angles of incidence will shift its transmission spectrum towards the shorter wavelengths and when tilted to lesser angles of incidence will shift its transmission spectrum towards the longer wavelengths. The arrangement of the dichroic filters in a color separating and re-combining device for a SLM based projector commonly uses a combination of each filter's selective reflection and transmission properties. Color uniformity across the projected image therefore requires uniformity in the angles at which light reaches each of the dichroic filters in the color separating and re-combining device.

Referring back to the discussion of the relationship between the intensity and illuminance distributions at the output of the integrator bar, we can see that each field point on the dichroic filter still sees a range of angles, even though with telecentric imaging of this source that range of angles is substantially the same at every field point. This means that on a fine scale each field point on the filter is in fact not a uniform color, since rays intersect that point at a range of angles. The uniform color actually results from averaging of the color at each field point with surrounding field points.

Figure 24:
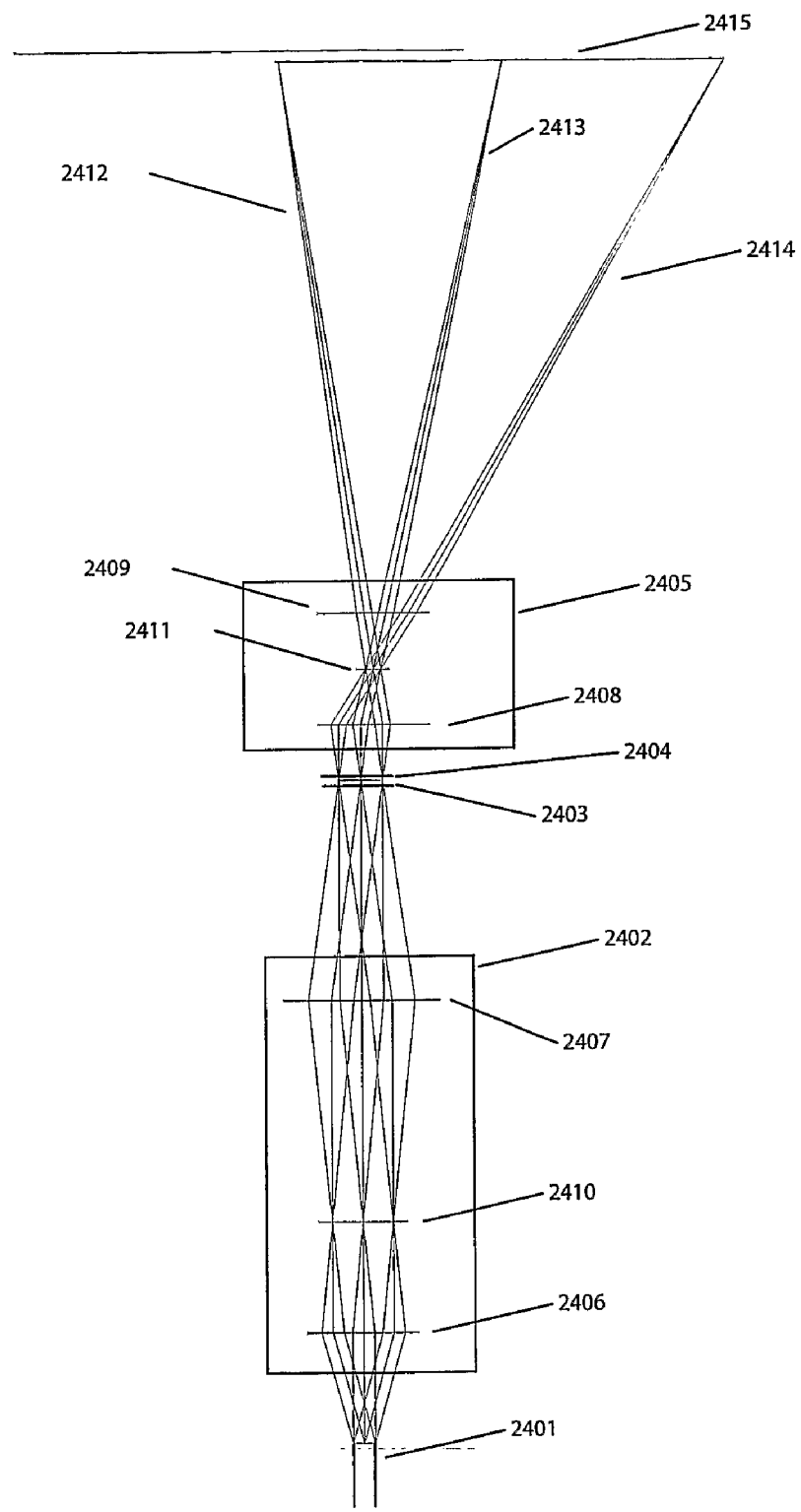
FIG. 24 illustrates the path of three ray bundles through the optical configuration of FIG. 8.

FIG. 24 shows a ray diagram for a projection system like that in FIG. 8, and incorporating an integrator bar 2401, an illumination relay 2402, a color filter 2403, a single SLM device 2404 and a projection lens 2405. In this diagram the relay and projection lens elements are taken to be ideal elements, shown as vertical lines at 2406 through 2409. The telecentric stop of the illumination relay is shown at 2410, and the stop of the projection lens is shown at 2411. The details of the color separating and re-combining device components have been omitted for the sake of clarity, and the diagram is shown with only one SLM also for the sake of clarity. The ray diagram is also drawn in an unfolded configuration with respect to the SLM, which is commonly a reflective device.

Three ray bundles are traced through the system. Ray bundle 2412 represents light from the left most edge of the right hand projector image 2415 (similar to the image 122 in FIG. 1) at the edge of the overlap region. Ray bundle 2413 represents light from a point on the right hand image more central to the overlap region, and ray bundle 2414 represents a ray on the right hand side of the overlap region.

Figure 25:
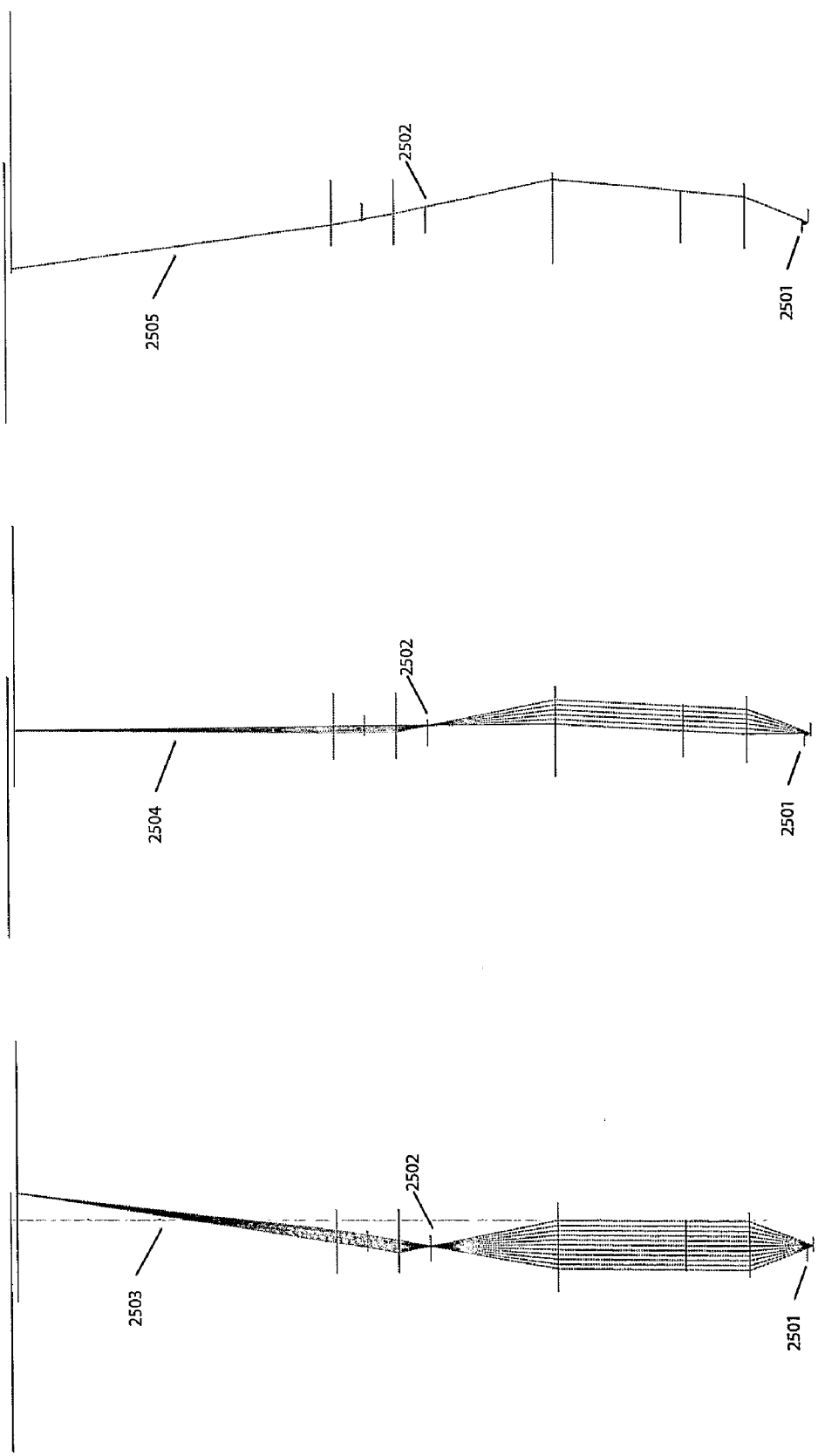
FIG. 25 illustrates the effect of a knife edge blending mask on three ray bundles traced through the optical configuration of FIG. 8.

If a knife edge, corresponding to the edge blending mask 123 in FIG. 1 is now inserted into the path of the three ray bundles, varying amounts of the rays from each bundle are vignetted or clipped by the mask as required to produce a gradual fall-off of brightness towards the left hand edge of the seam. FIG. 25 shows the resulting ray angles for each of the three bundles after clipping by the mask 2501. The ray bundle at 2503 corresponds to ray bundle 2412 in FIG. 24, 2504 corresponds to ray bundle 2413 in FIG. 24, and 2505 corresponds to ray bundle 2414 in FIG. 24. The color filter is indicated by 2502, and as can be seen from FIG. 25, the range of angles at filter 2502 for each ray bundle is substantially different due to the clipping effect of mask 2501.

It is now apparent that the effect of the changing ray angles due to the clipping of the rays as shown in FIG. 25 is to cause a color shift across the blending region. As predicted by the equation shown earlier, this shift will be towards the blue end of the spectrum when the rays with a lesser angle of incidence are clipped, and the shift will be towards the red end of the spectrum when the rays with a greater angle of incidence are clipped. This will be a gradual and more or less smooth color shift across the blending region since the changing effect of the mask in clipping the rays is likewise continuous across the blending region.

Figure 26:
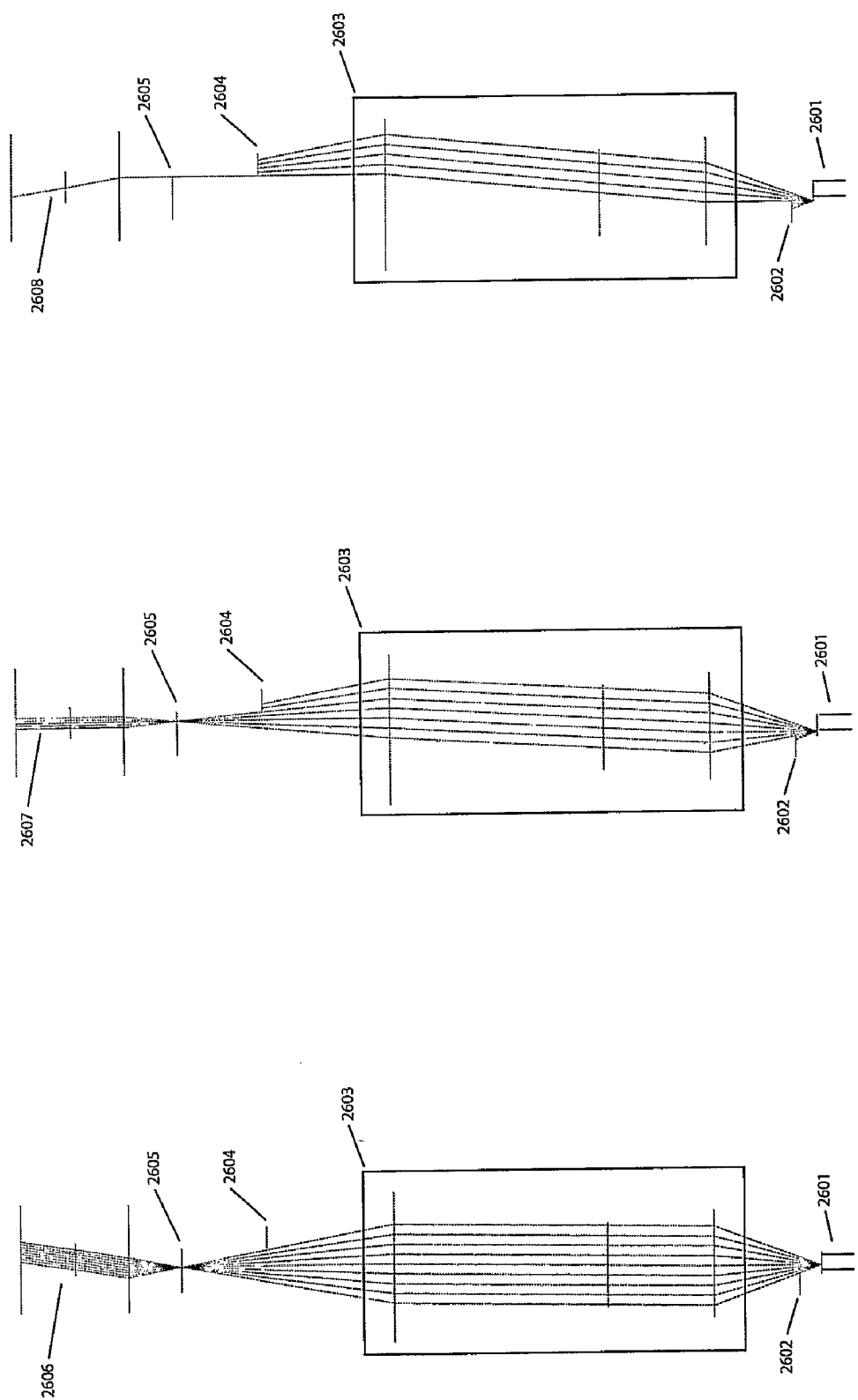
FIG. 26 illustrates the effect of an improved configuration of knife edge blending masks on three ray bundles traced through the optical configuration of FIG. 8 according to the present invention.

We now present a method for improving uniformity by clipping the light symmetrically about the optical axis to reduce color artifacts that occur across the overlap region. FIG. 26 shows how an alternative configuration of knife edge blending masks may be introduced into the system of FIG. 24. This requires two masks, 2602 and 2604. Mask 2602 is introduced between the integrator bar 2601 and the illumination relay, 2603. The second mask 2604 is introduced at the output of illumination relay 2603. The two masks are arranged so that the effect of mask 2602 is balanced by mask 2604 to symmetrically clip the intensity distribution of the telecentric illuminating light imaged by the illumination relay 2603 onto color filter 2605. FIG. 26 also shows the resulting ray angles at color filter 2605 for each of the three bundles after clipping by the masks 2602 and 2604. The ray bundle at 2606 corresponds to ray bundle 2412 in FIG. 24, 2607 corresponds to ray bundle 2413 in FIG. 24, and 2608 corresponds to ray bundle 2414 in FIG. 24. As can be seen from FIG. 26, the range of angles at color filter 2605 for each ray bundle is now substantially similar due to the clipping effects of mask 2602 and 2604.

Figure 27:
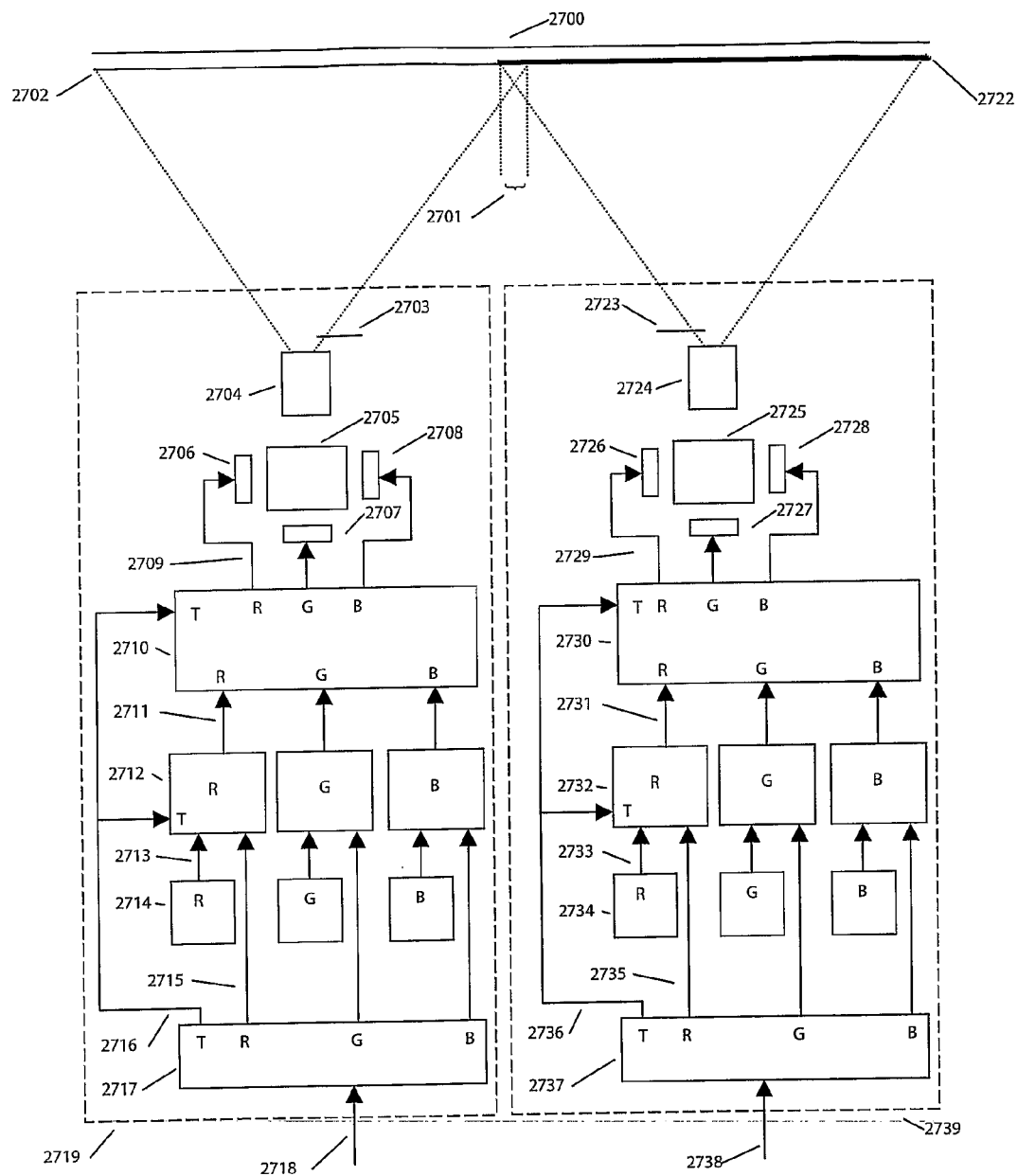
FIG. 27 illustrates an exemplary projection system for tiling two projection displays to form a composite image according to the present invention.

While the preceding embodiments of the present invention reduce the artifacts in the blending region of a display using optical blending means, it is possible to further improve the results using another embodiment of the present invention, which may additionally improve the uniformity of the composite display such as where the brightness is higher at the center of the image from each of the multiple projection displays as indicated at 217 and 218 in FIG. 2. FIG. 27 illustrates in schematic form a plan view of an exemplary projection system for tiling two projection displays to form a composite image according to an embodiment of the present invention. In this example, the image to be displayed is divided into two halves, a left half and a right half, each being of the same height, but each being one half of the total width of the final image. The composite image is formed on display screen 2700, which receives the left, and right projected image halves from two projection systems, a left hand projector, 2719 and a right hand projector 2739. The left hand projector receives an image input signal 2718 corresponding to the left half of the desired image plus a small overlap region at the center of the desired image, and the right hand projector receives an image input signal 2738 corresponding to the right half of the desired image plus a small overlap region at the center of the desired image. Each projection system is identical except for the location of edge blending masks 2703 and 2723 and may be described in detail with reference to the left hand projector, 2719, as follows. The numbers in parenthesis refer to the corresponding elements of the right hand projector, 2739, in FIG. 27.

An input video or image data signal 2718 (2738) representing one half of the image to be displayed is supplied to input circuit 2717 (2737) which provides various facilities known to those skilled in the art for separation of composite inputs into discrete red, green and blue or "RGB" signal components as required by the input format, facilities to extract image frame timing information and facilities to provide features such as contrast control, color balance adjustment, image scaling and other features known to those skilled in the art. The output of circuit 2717 (2737) is three discrete signals 2715 (2735) corresponding to the three color components RGB of the input image and an input image frame timing signal 2716 (2736).

The input image color component signals are then processed on a pixel by pixel basis to adjust the brightness of a predetermined number of pixels so as to obtain a more uniform image on either side of the overlap region and to further reduce the visibility of artifacts across the overlap region. This processing is performed by pixel brightness modification processors 2712 (2732) in conjunction with pixel brightness modification data 2713 (2733) from pixel brightness modification data memories 2714 (2734). These memories contain a number of locations corresponding to each of the pixel locations of the corresponding SLM that require brightness modification. For example, the system may be configured to modify the brightness of the image in only the overlap region, in which case memories 2714 (2734) contain sufficient pixel brightness modification locations to correspond to each pixel in the overlap region of the image. Alternatively, the pixel brightness modification memories may contain as many locations as there are pixels on each SLM.

The pixel brightness modification processors 2712 (2732) adjust the brightness value of the input image component signals 2715 (2735) using the modification values stored 2713 (2733) in the pixel brightness modification memories 2714 (2734). Timing information 2716 (2736) is used as required to select the pixels to be modified that correspond to the portion of the displayed image that is to be modified, and also to determine the address of the appropriate pixel brightness modification location in the memories 2714 (2734). Many types of processing may be implemented in the pixel brightness modification processors 2712 (2732) known to those skilled in the art. For example, the pixel brightness modification memories may contain fractional values between 0 and 1 that represent the desired modification of brightness for the pixels, and these values may be multiplied by the brightness value for each pixel as determined by the input image signal to produce a modified brightness value for each pixel.

The pixel brightness processors 2712 (2732) each produce an output 2711 (2731) which is supplied to display control and formatting circuit 2710 (2730) which in turn supplies the control signals 2709 (2729) required by the SLM devices 2706, 2707 and 2708 (2726, 2727 and 2728). Each SLM device consists of a two dimensional array of modulating elements or pixels, and by means of various control signals each pixel modulates the flux of a corresponding part of the light to be projected so as to form the desired pattern of pixel intensities that correspond to the image to be projected. Various types of SLM devices may be employed including deformable mirror devices (DMDs), or reflective or transmissive liquid crystal devices.

Each SLM device corresponds to one of the three color components of the image to be displayed, and color separating and re-combining device 2705 (2725) provides the optical components necessary to filter input white light into three spectral color bands that correspond to the red, green and blue portions of the visible spectrum, this color separated light then illuminates SLM devices 2706, 2707 and 2708 (2726, 2727 and 2728) with red, green and blue light respectively. The control signals 2709 (2729) cause the individual picture elements to be controlled so as to modulate the flux of the red, green or blue light falling on the SLM, which in turn is re-combined by color separating and re-combining device 2705 (2725) into a single image of overlaid red, green and blue components which is in turn projected by lens 2704 (2724) onto the screen 2700. It will be obvious to those skilled in the art that FIG. 27 omits for the sake of clarity a number of details of the construction of a projector, including the illuminating light source and the details of color separating and re-combining device 2705 (2725) which varies in its detailed configuration and components according to the type of SLM used.

Figure 28:
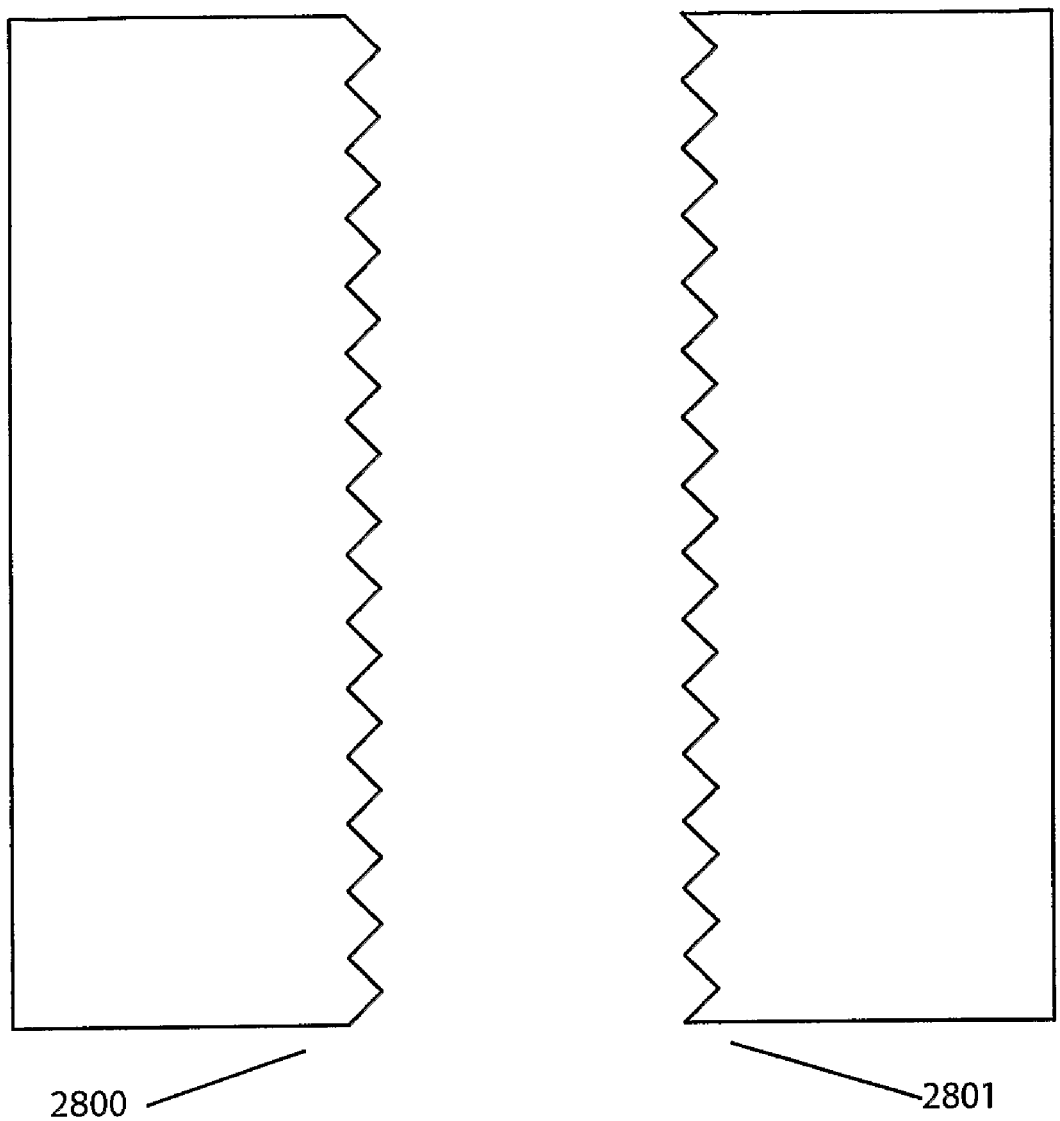
FIG. 28 illustrates edge blending masks for use with the invention of FIG. 27.

The left hand projector 2719 in FIG. 27 produces a projected image 2702 on the screen 2700, which proceeds from the lens 2704 as more or less a cone of light as shown in FIG. 27 by the dashed lines connecting 2704 to 2702. Similarly, right hand projector 27259 in FIG. 27 produces a projected image 2722 on the screen 2700, which also proceeds from lens 2724 as more or less a cone of light as shown by the dashed lines connecting 2724 to 2722. In order to form a composite image, 2702 is overlapped with 2722 by some amount, indicated as 2701 in FIG. 27. In order to prevent this overlap from being visible as a bright band at the center of the composite image, adjustable masks 2703, 2723 are used to gradually diminish the brightness of the right hand side of image 2702 as it enters the overlap region 2701, and likewise to gradually increase the brightness of the left hand side of image 2722 as it leaves the overlap region 2701. Mask 2703 is located so as to cause the brightness of the right hand half of the left image 2702 to gradually diminish to black in the overlap region 2701. Similarly, mask 2723 is located so as to cause the brightness of the left hand half of the right image 2722 to gradually increase from black. The form of masks 2703 and 2723 may be knife edges as in FIG. 1 or they may be serrated edge blending masks as shown in FIG. 28 and described in co-pending application U.S. application Ser. No. 10/312,069, which is hereby incorporated in its entirety by this reference. Two masks with complimentary patterns exemplified by 2800 and 2801 in FIG. 28 may be used with projectors 2719 and 2739 respectively. This configuration of mask has the benefit of further reducing the visibility of the overlap region by breaking the overlap region into a series of diagonal elements. This makes the brightness irregularities described in FIG. 2 less visible.

Figure 29:
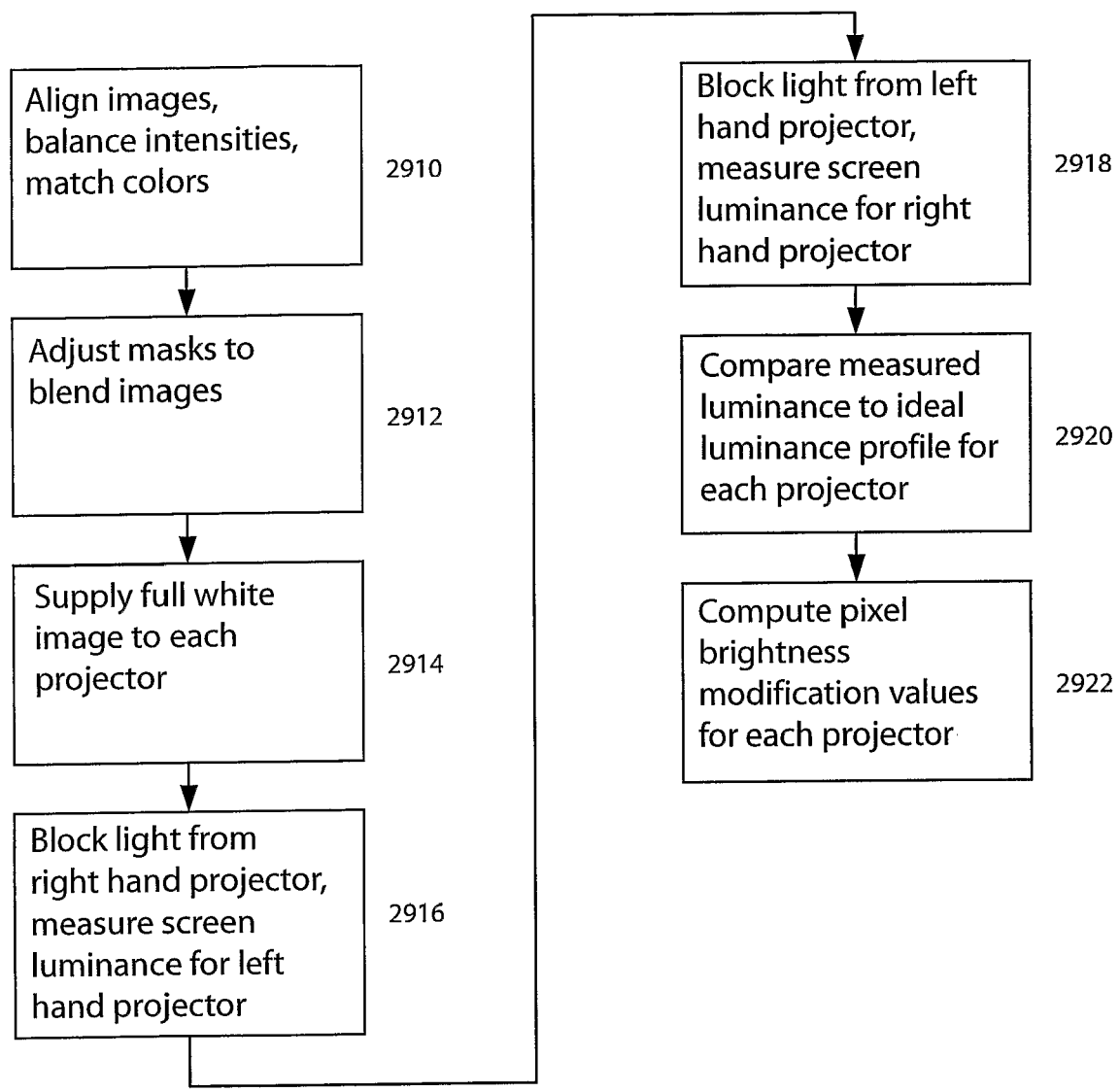
FIG. 29 is a block diagram of the process of adjustment for the system shown in FIG. 27.

The brightness irregularities described in FIG. 2 are reduced using the procedure shown in FIG. 29. First, the projected images from projectors 2719 and 2739 as shown in FIG. 27 are aligned onto the screen 2700 in step 2910 using suitable test patterns. Each of the pixel modification memory locations in each projector is initially set to leave the corresponding pixel locations unchanged. The brightness of each projected image is balanced with respect to the other using the center of each projected image as a reference. Color balance is also adjusted so that the two projected images are matched in color. The masks 2703 and 2723 are then adjusted in step 2912 to produce the desired blend 2701 between the two images. Next at step 2914, a full white input signal is supplied to projectors 2719 and 2739 so that all pixels of each SLM in each projector are driven to full brightness. Next at step 2916 the output of the right hand projector 2739 is blocked and the luminance of the image from projector 2719 is measured at a number of locations on the screen corresponding to the area of the screen where the pixel brightness may be modified by the pixel brightness modification memory locations in the projector. Similarly at step 2918 the output of left hand projector 2719 is blocked and the luminance of the image from projector 2739 is measured at a number of locations on the screen corresponding to the area of the screen where the pixel brightness may be modified by the pixel brightness modification memory locations in the projector. It should be understood that while it is possible to measure the luminance of the image for every pixel on the screen in the area where the pixel brightness may be modified by the pixel brightness modification memory locations in the projector, this is not a requirement. The screen luminance may instead be measured at representative points in the area of the screen where the pixel brightness may be modified by the pixel brightness modification memory locations in the projector and then values for all of the pixel brightness modification memory locations may be computed using interpolation methods such as linear interpolation or curve fitting methods such as a cubic spline.

The screen luminance measurements result in a brightness map for the image produced by each projector in the pixel brightness modification region of the image. This is then compared with the desired brightness profile in step 2920. The desired brightness profile is determined according to the required uniformity of the composite display, and may be different for different display applications. Viewing distance and display brightness will also play a role in determining the required uniformity. Large displays in close proximity to the viewer require uniformity over a smaller area than large displays viewed from a greater distance. When viewing distances are greater the center to edge uniformity can be more important than smaller areas such as the overlap region. Similarly, very bright displays can tolerate greater absolute brightness non-uniformities since the viewer will be less sensitive to brightness differences when overall display brightness is high.

In general the uniformity should be high in the overlap area at the center of the screen, while a gradual fall off to the outer edges is acceptable since this is a normal characteristic of projection displays. Accepting this gradual fall off is also a consideration for overall brightness since smoothing out these overall variations will generally result in a reduction in overall brightness.

The difference between the measured profile and the desired profile is then used in step 2922 to compute a set of brightness modification data values for the pixel brightness modification memory locations.

In the case where pixel brightness modification is provided in each projector only for the overlap region, other facilities in the projector can be used to ensure an overall brightness match between the two images prior to measuring the brightness in the overlap region. If this is not done, then the initial transition into the overlap region of one projector or the other can exhibit a "step" in brightness to bring the overall brightness of the brighter projector into range at the start of the overlap region. Alternatively, a sloped overall brightness profile could be convolved with the ideal brightness profile.

Figure 30:
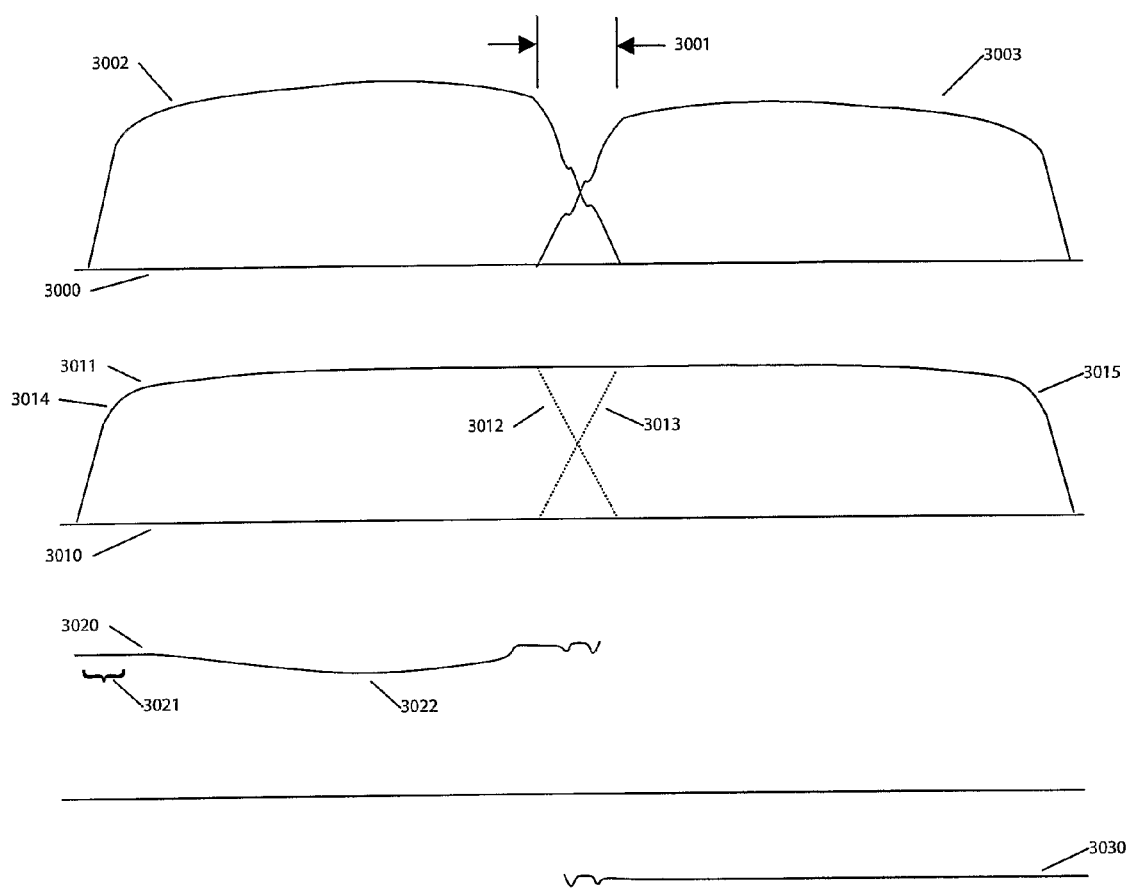
FIG. 30 illustrates in graphical form the brightness profiles at the various steps of the process shown in FIG. 29.

In the case where pixel brightness modification is provided for the entire area of each projected image, an improvement in the blending of the images may be obtained by using pixel brightness modification to make the brightness profile of each projector more uniform. Preferably each projector is adjusted for maximum brightness in step 2910. The brightness profile comparison of step 2920 will then result in pixel modification values that include reduction of the brightness of the brighter image so that the brightness profile across the entire screen is uniform. FIG. 30 shows a graphic representation of the brightness profile at various steps in the process of FIG. 29 using the system of FIG. 27. The graph at 3000 in FIG. 30 shows a measured brightness profile such as is found across the projection screen 2700 in FIG. 27, for each of the two projected images, 3002 for the left hand projector, and 3003 for the right hand projector. The horizontal axis of the graph corresponds to the horizontal dimension of the projected image and the vertical axis of the graph shows the relative brightness of the projected image on the screen. The overlap region is indicated at 3001 on the graph 3000. Note that in graph 3000 the peak of brightness profile 3002 is higher than the peak of brightness profile 3003 corresponding to a greater light output from the left hand projector. As discussed above both projectors are set for maximum light output.

A desired brightness profile is shown in the graph 3010. The profile, 3011 is for use with a system of FIG. 3 that provides for correction of pixel intensities over the full image area of each SLM. An ideal fall off profile for each projector in the overlap region is also shown at 3012 for the left hand projector and at 3013 for the right hand projector. The ideal profiles 3012 and 3013 are shown with a linear fall off in the overlap region, but any profile may be used so long as the profiles for each image are the same and complimentary in brightness across the overlap region.

The desired brightness profile 3011 also takes into account the fall off at the edge of the screen, 3014 and 3015 in the graph 3000, which is preserved by this version of the brightness profile. The curve at 3020 in FIG. 30 shows the profile of the pixel brightness modification values that are stored in the pixel brightness modification memory of the left hand projector in order to correct the profile 3002 to match the desired profile 3011. The values represented by this curve range from 0 to 1.0. Area 3021 on curve 3020 is a flat region with a value of 1.0, which is typical of areas not requiring correction such as the fall off at the outside left edge of the screen. The downward curved region at 3022 corrects for the extra light output of the left hand projector. Similarly, the curve 3030 shows the profile of the brightness modification values that must be stored in the pixel brightness modification memory of the right hand projector in order to correct the profile 3003 to match the desired profile 3011.

It should be understood that the illustrations of FIG. 30 apply to one set of measurements made horizontally across the screen corresponding to 2700 in FIG. 27. It may suffice in some cases to make a single measurement across the screen using the methods of FIG. 29 and compute pixel modification values for all rows of the pixel brightness modification memory that correspond to the rows of the image in the vertical direction in the area where the pixel brightness may be modified by the pixel brightness modification memory locations in the projector. In other cases it may be desirable to perform the process of FIG. 29 for many or all rows of the image in the vertical direction in the area where the pixel brightness may be modified by the pixel brightness modification memory locations in the projector.

Figure 31:
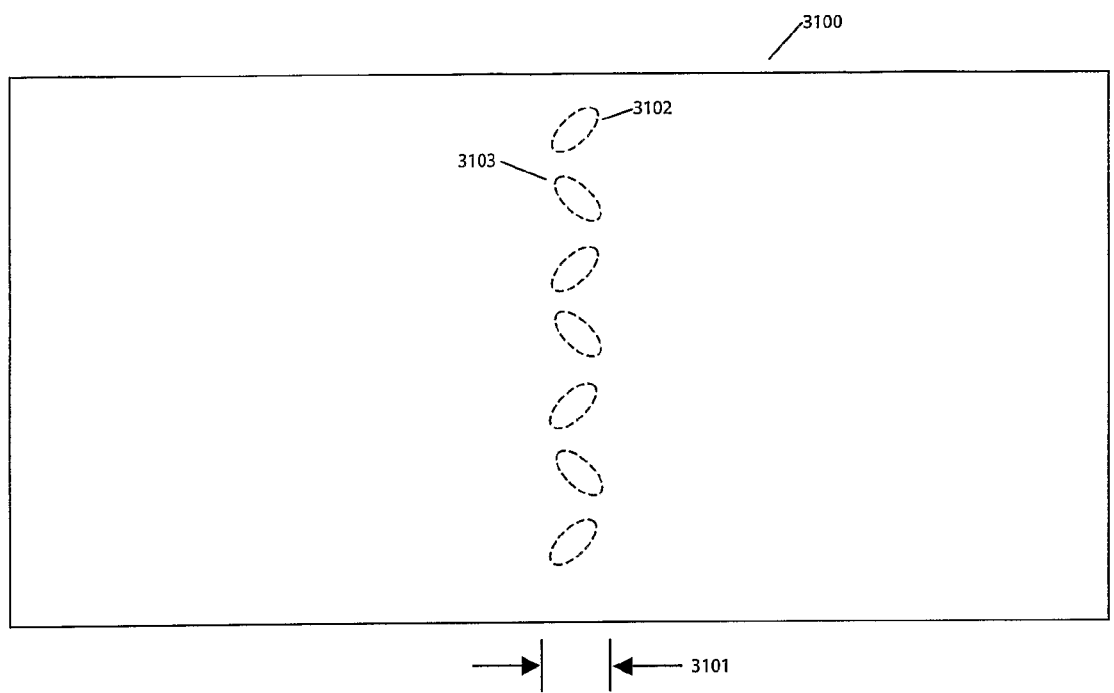
FIG. 31 illustrates the color artifacts at the mask of the system in FIG. 27.

Although the system of FIG. 27 and the process of FIG. 29 produce a significant improvement in the uniformity of the brightness profile across the seam, the color shift produced by the effect of the edge blending mask on the intensity distribution as previously shown in FIG. 25 remains. These are shown in FIG. 31 and take the form of small areas of color shift that appear to be related to the teeth of the serrated edge blending mask such as that shown in FIG. 28. FIG. 31 is a representation of a flat field neutral gray image projected by the system of FIG. 27. The overall screen image is shown at 3100 and the overlap region at 3101. The overlap region contains a series of approximately elliptical areas at 3101, which are alternately red colored at 3102 and blue colored at 3103. As described earlier, these colored areas result from the effect of the mask on the intensity distribution of the projector. When the mask is introduced the different areas of the overlap region are composed of different angular distributions of light which results in variations of color due to angle variations at each of the dichroic filters in the projector's color separating and re-combining device. In a system with a straight edge blending mask the brightness discontinuities in the overlap region, also due to the effect of the mask, dominate, making the color variations less visible. When the serrated edge blending mask like that of FIG. 28 is used the brightness discontinuities become less noticeable due to the psycho-physical effect of the diagonal features of the mask, allowing the color variations to be more readily perceived.

It may also be that these areas arise in part from the different paths of rays traced by the red, green and blue components of the projected image, which due to dispersion in the optical system travel different paths in the near field of the lens, that is at the location of the mask, in order to converge at the same points on the screen.

Figure 32:
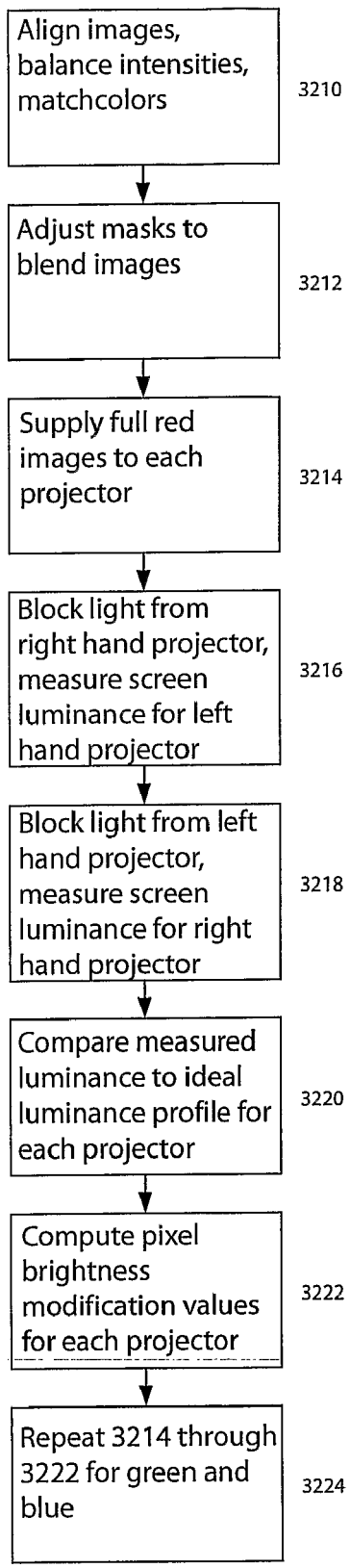
FIG. 32 is a block diagram of the process of adjustment for the system shown in FIG. 27 so as to eliminate the color artifacts of FIG. 31.

The modified correction procedure of FIG. 32 reduces these artifacts. First, the projected images from projectors 2719 and 2739 in FIG. 27 are aligned onto the screen 2700 in step 3210 using suitable test patterns. Each of the pixel brightness modification memory locations in each projector is initially set to leave the corresponding pixel locations unchanged. The brightness of each projected image is balanced with respect to the other using the center of each projected image as a reference. Color balance is also adjusted so that the two projected images are matched in color. The serrated edge blending masks 2703 and 2723 are then adjusted in step 3212 to produce the desired blend 2701 between the two images. Next at step 3214, a full red input signal is supplied to projectors 2719 and 2739 so that all pixels of the red image SLM in each projector are driven to full brightness. Next at step 3216, the output of the right hand projector 2739 is blocked and the luminance of the image from projector 2719 is measured at a number of locations on the screen corresponding to the area of the screen where the pixel brightness may be modified by the pixel brightness modification memory locations in the projector. Similarly at step 3218 the output of left hand projector 2719 is blocked and the luminance of the image from projector 2739 is measured at a number of locations on the screen corresponding to the area of the screen where the pixel brightness may be modified by the pixel brightness modification memory locations in the projector.

This produces a brightness map for the red color image produced by each projector in the brightness correction region of the image. This is then compared with the desired brightness profile in step 3220. The difference between the measured profile and the desired profile is then used in step 3222 to compute a set of brightness modification values for the red pixel brightness modification memory locations. This process is then repeated as indicated at 3224, using a full green input signal supplied to projectors 2719 and 2739 so that all pixels of the green image SLM in each projector are driven to full brightness and a full blue input signal supplied to projectors 2719 and 2739 so that all pixels of the blue image SLM in each projector are driven to full brightness. It should be understood that while it is possible to measure the luminance of the image for each color for every pixel on the screen in the area where the pixel brightness may be modified by the pixel brightness modification memory locations in the projector, this is not a requirement. The screen luminance may instead be measured for each color at representative points in the area of the screen where the pixel brightness may be modified by the pixel brightness modification memory locations in the projector and then values for all of the pixel brightness modification memory locations may be computed for each color using interpolation methods such as linear interpolation or curve fitting methods such as a cubic spline.

As in the procedure of FIG. 29, in the case where pixel brightness modification is provided in each projector only for the overlap region other facilities in the projector can be used to ensure an overall brightness match between the two images prior to measuring the brightness in the overlap region. If this is not done, then the initial transition into the overlap region of one projector or the other can exhibit a "step" in brightness to bring the overall brightness of the brighter projector into range at the start of the overlap region. In the case where pixel brightness modification is provided for the entire area of each projected image, an improvement in the blending of the images may be obtained by using pixel brightness modification to make the illumination profile of each projector more uniform. Preferably each projector is adjusted for maximum brightness in step 3210. The brightness profile comparison of step 3220 will then result in pixel modification values that include reduction of the brightness of the brighter image so that the brightness profile across the entire screen is uniform. Similarly, provided that the relative amplitudes of the desired brightness profiles for each of the three colors in step 3220 represent the desired color balance, the matching of colors between the projectors is accomplished by the brightness modification processing in the projector, eliminating the need to use other projector facilities to adjust color balance.

The pixel brightness modification process then acts to reduce the visibility of the color artifacts described in FIG. 31, resulting in a more invisible overlap region and enhancing the image quality of the tiled projection display of FIG. 27.

A variety of methods may be used to measure the light reflected from the screen. These include various types of electronic sensors such as photodiodes or video cameras. For this embodiment it is preferable that the measuring device be able to accurately measure the selected area of the screen without interference from adjacent illuminated areas. In some embodiments it is appropriate to employ interpolation techniques between a smaller number of measured points, or use measurements of larger areas than pixel resolution and process the measurement data further in order to obtain values for comparison to the desired illumination profiles.

Figure 33:
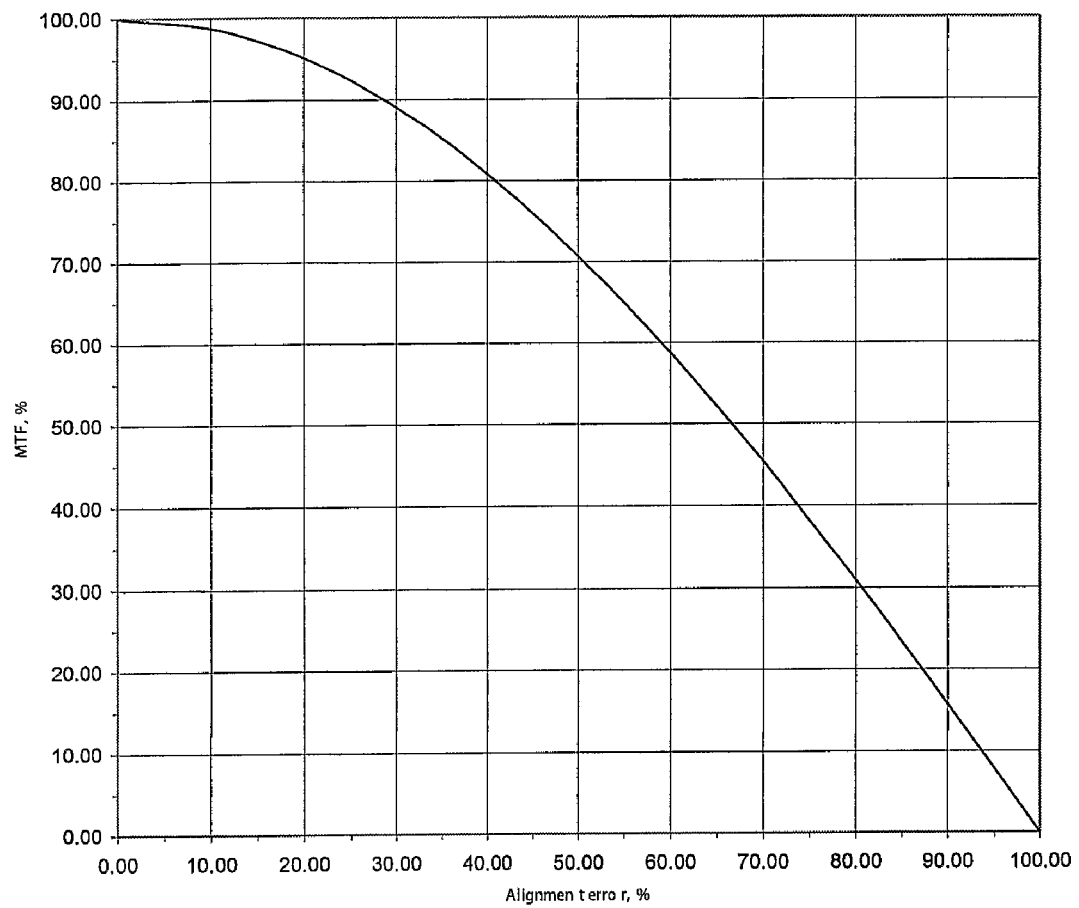
FIG. 33 is a graph showing the effect on resolution caused by image misalignment between the two projectors of the system in FIG. 27.

In the invention described in FIG. 27 and the procedures of FIGS. 29 and 32, in the first step of each procedure, 2910 and 3210 respectively, reference is made to the alignment of the images from the two projectors, and in the second steps 2912 and 3212 reference is made to the adjustment of the masks to blend the images. In one embodiment a human observer physically manipulates the position of the projected image and the location of the masks with respect to the projected beam. Proper alignment is critical in order to obtain the best image quality. Images to be projected by for example a two projector tiled configuration are supplied to the projectors with a certain number of pixels on each horizontal line allowed for the overlap region which is expected to be a particular size. In addition, the image in the overlap region is composed of varying proportions of pixel intensities from each of the two projectors. Misalignment will reduce the resolution of the projected image as shown in FIG. 33. In this figure, the MTF of a pattern of alternating black and white lines at the raster pitch of the individual projectors is shown with various amounts of misalignment between the two rasters. A misalignment of ±2 pixel reduces the MTF to 70% of its value for a single projector. Greater than ½ pixel alignment errors can produce noticeable degradation of finely detailed images in the overlap region, and when moving images are projected the passage of fine detail through the overlap region will cause noticeable blurring of details. Misalignments of greater than one pixel will also produce discontinuities in lines and other edges as they cross the overlap region. The precise alignment of the two images depends on the image planes of the two projectors being located in the same plane with respect to the projection screen. This means that all six degrees of freedom for the orientation of each projector's image plane must be aligned with a common reference plane. If the projectors are equipped with adjustable magnification lenses then the alignment requirement is relaxed by one degree of freedom, that is, along the lens to screen axis (z axis) of each projector.

Figure 34:
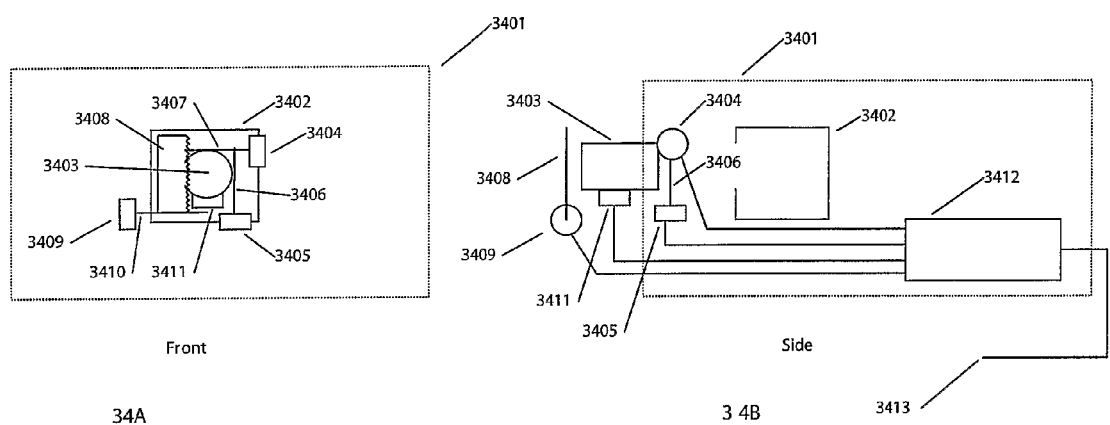
FIG. 34 illustrates equipment for aligning the two images of the systems in FIG. 27 according to the present invention.

One embodiment of the present invention utilizes an improved and automatic alignment system for the multiple projected images used to form a composite image. FIG. 34 illustrates in schematic form an exemplary projector providing features for automatic alignment for use in the system of FIG. 27. The system in the exemplary embodiment is simplified for the purposes of illustration and provides adjustments for only three of the six degrees of freedom required for perfect alignment of the projected images. FIG. 34A shows a front view looking into the projection lens, and FIG. 34B shows a side view. 3401 is the outline of the enclosure for the projector components. 3402 represents the color separating and re-combining device with SLM devices, corresponding to 2705, 2706, 2707 and 2708 in FIG. 27. The image from 3402 is focused onto the projection screen (not shown) via projection lens 3403. This lens is provided with a lens magnification adjustment mechanism 3411 that could be operated, for example, by a motor. The mount of lens 3403 may be translated in the horizontal and vertical direction by a lens position adjustment mechanism. For example, the mount of lens 3403 may be translated in the horizontal direction by motor 3404 and drive system 3407 and mount of lens 3403 may be translated in the vertical direction by motor 3405 and drive system 3406.

Automation of the image alignment process also requires appropriate adjustment of the location of the serrated edge blending mask 3408 so that the gradual fall off in brightness of the image begins at the correct location in each projector's image area. It is also important that the blending masks of each projector in the system of FIG. 27 are parallel to each other, and this requires rotation of the mask with respect to the optical axis. In order to simplify the description the mask rotation adjustment has not been shown in FIG. 34. As previously described there are a number of suitable locations in the projector's optical system for the edge blending masks, such locations generally being chosen so that the edge blending mask will not be in sharp focus when the SLM image is focused on the projection screen. It can therefore be appreciated that the position of the mask along the projection axis is also important, and that some embodiments of the present invention may include additional provisions for adjusting the position of the mask along the optical axis.

Serrated edge blending mask 3408 may be translated in the horizontal direction by an edge mask position adjustment mechanism, such as, for example, motor 3409 and drive system 3410.

Controller 3412, which receives position control commands via input 3413 controls motors 3404, 3405, 3409 and the motor driving the magnification adjustment mechanism 3411. Additional position adjustment mechanisms would be provided to adjust the pitch and yaw of the projection lens with respect to the screen and to rotate the projected image about the optical axis. All of the required adjustments could be accomplished by a suitable 5 degree of freedom kinematic adjustable mount for the projector's optical system incorporating, for example, a precision motor drive for each of the mount adjustors.

Figure 35:
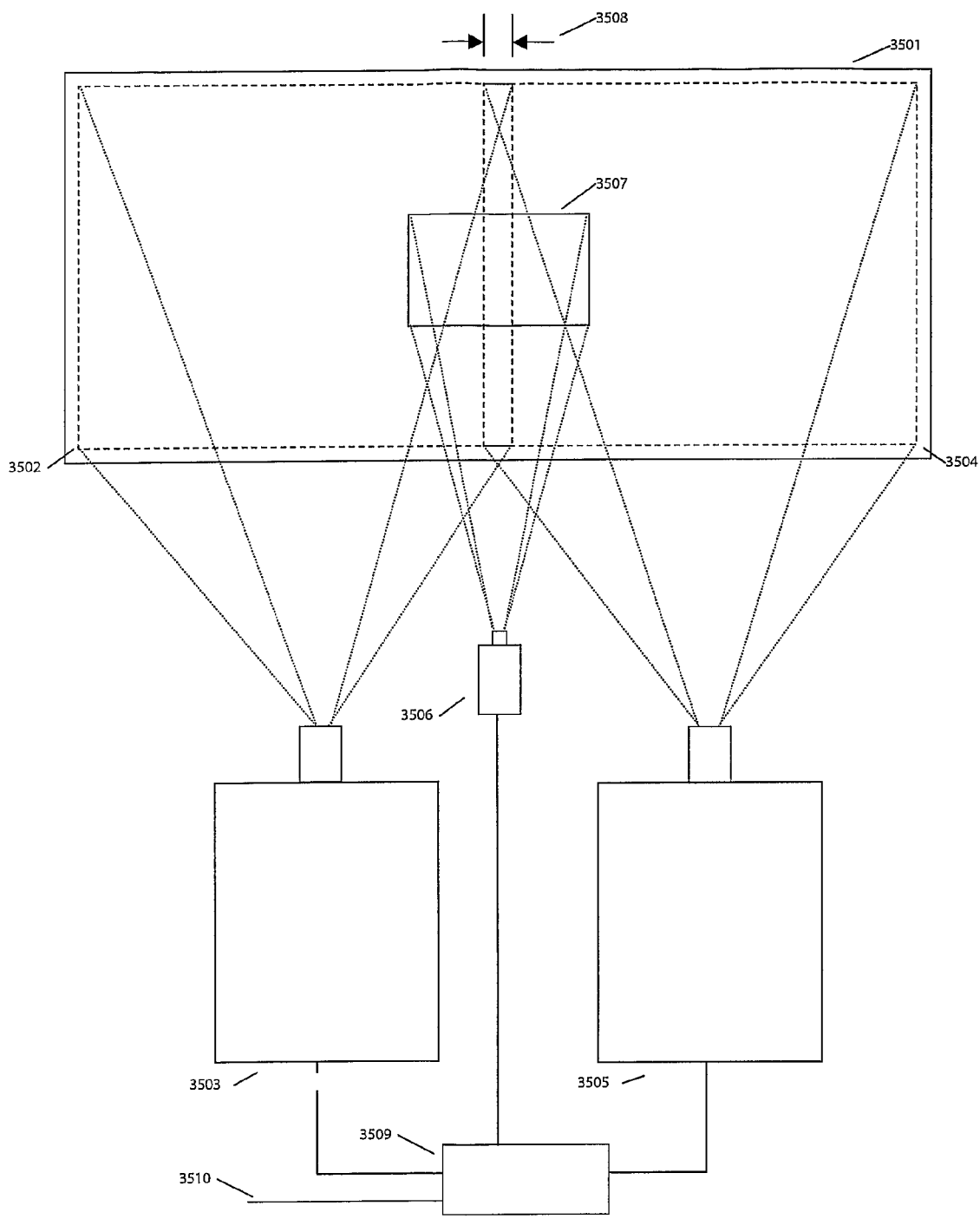
FIG. 35 illustrates an exemplary projection system for tiling two projection displays to form a composite image according to the present invention incorporating the equipment of FIG. 34.

FIG. 35 shows in partial perspective view an exemplary arrangement of two projectors according to the system of FIG. 27 and containing the adjustment mechanisms of FIG. 34. The projection screen is shown at 3501. The screen receives a left hand image 3502 from left hand projector 3503, and a right hand image 3504 from right hand projector 3505. The two images are overlapped to form the overlap region 3508. The central portion of the overlap region 3507 is viewed by camera 3506. The image from camera 3506 is received by alignment computer 3509, which analyzes the image and sends control signals to the two projectors 3503 and 3505. Alignment computer 3509 is also provided with an output 3510 that may be used to control the selection of alignment images for the two projectors 3503 and 3505 in conjunction with the image sources for the two projectors.

Figure 36:
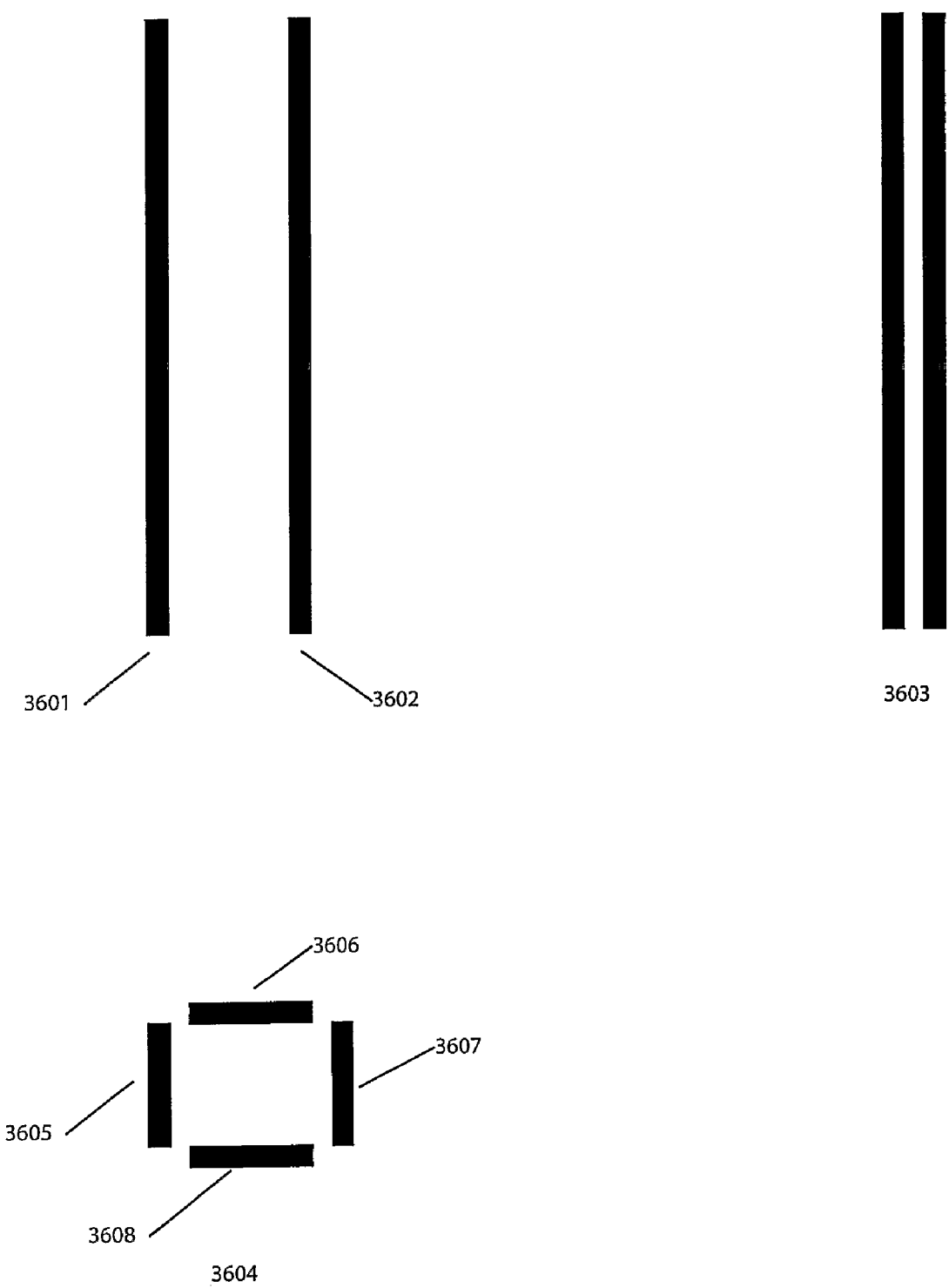
FIG. 36 illustrates test patterns for use in the alignment of the images of the system of FIG. 34.
Figure 37:
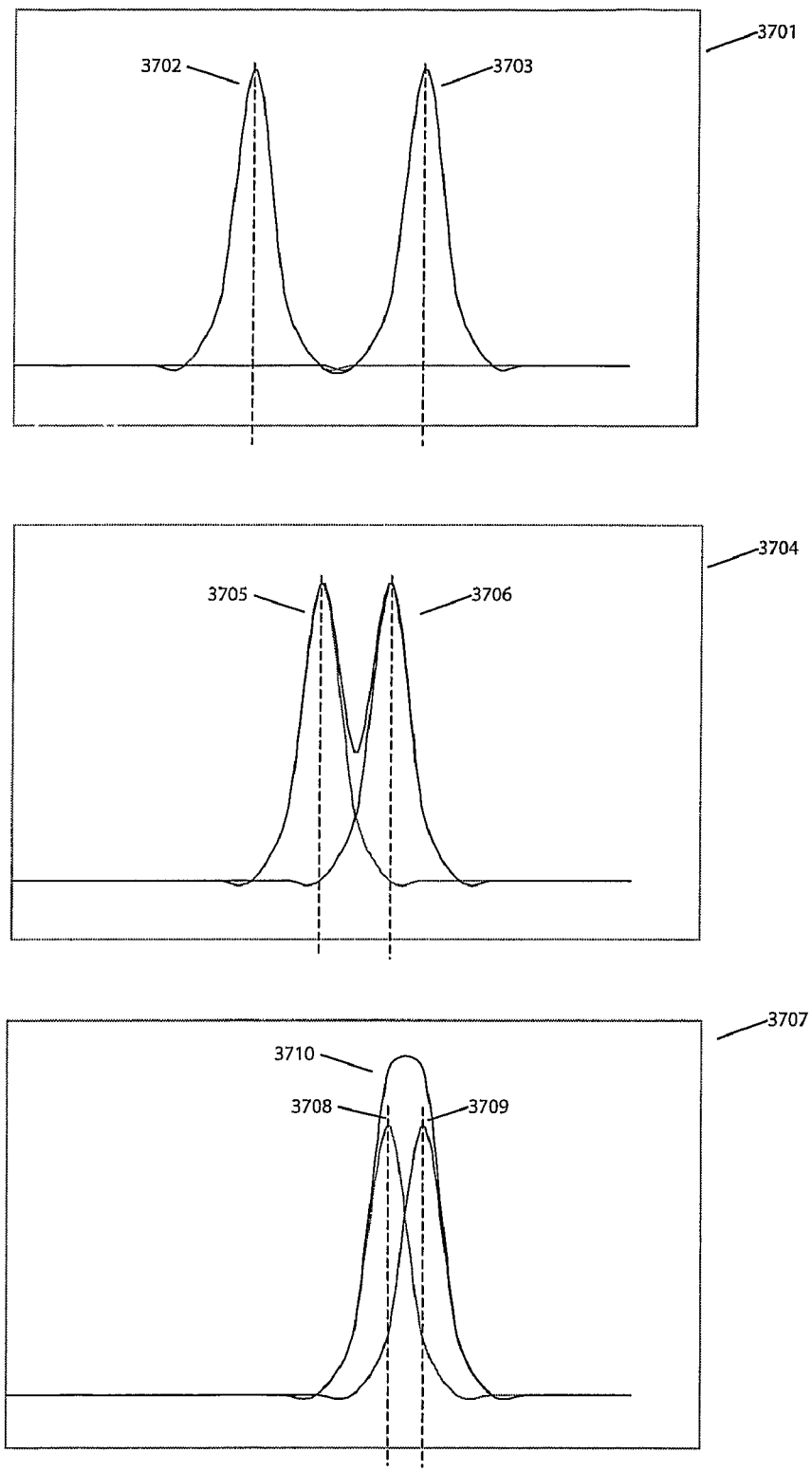
FIG. 37 describes the image signals used in the alignment of images using the system of FIG. 34.

The alignment process may be understood by reference to FIGS. 35, 36 and 37. In these FIGS. 3601 and 3602 correspond to a pair of one pixel wide lines projected in the overlap region 3508 of the screen 3501. The line 3601 would be projected by the left hand projector 3503 and located in the image sent to projector 3503 so that the line is in the overlap region 3508 in a defined relationship to the image projected by the right hand projector 3505 which projects line 3602 also located in a defined location in the overlap region 3508. In FIG. 36 lines are shown as dark lines on a white background, but the responses shown in FIG. 37 correspond to white lines on a dark background. When the portion of the lines in the field of view 3507 are imaged by the camera 3506 each scan line from the camera 3506 will produce a signal similar to that shown at 3701 where line 3601 corresponds to the peak 3702, and line 3602 corresponds to the peak 3703. In this case the two lines are more than two pixels apart and the signals 3701 and 3702 are distinct. If the edge blending masks incorporated in the projectors are withdrawn so that the overlap region is fully illuminated, then the lines 3601 and 3601 can be located so that if the projectors are properly aligned they would be one pixel apart within the overlap region. The signal from the camera 3506 is analyzed by the alignment computer 3509, which finds the centroid of each peak and estimates the separation of the two peaks. The alignment computer then sends a lens positioning command to one of the projectors, for example projector 3505 which moves the lens in the horizontal direction so that the line 3602 moves closer to the line 3601. This produces a signal similar to that shown at 3704 in FIG. 37. Again, 3705 shows the response produced by the image of line 3601 and 3706 shows the response produced by the image of line 3602. When the lines are one pixel apart the image on the screen will appear as shown at 3603 in FIG. 36.

This corresponds to the signal shown at 3707 in FIG. 37. Here the response is a single peak 3710, which is composed of the signals 3708 and 3709. This indicates that the horizontal alignment of the two images is correct.

The vertical alignment of the two images may be accomplished in an analogous manner, using horizontal lines projected by the two projectors, and analysis of a signal taken from the successive horizontal scan lines of the image received from camera 3506. The required analysis is accomplished using image processing techniques in the alignment computer 3509. It should be understood that the horizontal and vertical lines of FIG. 36 are for the purposes of illustration only. Any two dimensional pattern of suitable size could be analyzed to determine the centroid of that pattern and compute the required adjustment of one projected image with respect to the other. It should also be understood that in some cases the required alignment of the two projector's image planes to a common reference plane may be accomplished by adjusting only one projector, while in other cases the range of motions required may be optimized by adjustment of both projectors to determine a new common reference plane that makes better use of the adjustment range of the projector alignment mechanisms.

A further refinement in the alignment is provided by the adjustable magnification of the lens 3403 driven by motor 3411 shown in FIG. 34. In order for the alignment of the image to be correct over the entire overlap region it is preferred that the magnification of the two projected images be matched. This can be accomplished using the system of FIG. 35 with a test image such as the one shown at 3604 in FIG. 36. This image consists of two vertical lines and two horizontal lines. These are arranged in the two images supplied to the two projectors with exactly equal horizontal and vertical spacing. The left projector 3503 in FIG. 35 projects the two vertical lines 3605 and 3607. The right hand projector 3505 in FIG. 35 projects the two horizontal lines 3606 and 3608. Image computer 3509 receives the image from camera 3506. The centroids for each of the lines in the test pattern are computed and the vertical and horizontal separations are compared. If the distance between the centroids of the vertical lines does not match the distance between the centroids of the horizontal lines then the magnification of one projector is adjusted by the image alignment computer 3509 commanding the appropriate projector's controller to adjust the magnification of the corresponding lens until the distance between the centroids are matched.

It should be understood that the horizontal and vertical lines of FIG. 36 are for the purposes of illustration only. Any two dimensional pattern of suitable size could be analyzed to determine the area of that pattern and compute the required magnification adjustment of one projected image with respect to the other.

The objective of this alignment process is to achieve at least a ½ pixel alignment between the images in a multiple projector configuration. This precision requires that the image planes of each projector be aligned to a common reference plane. It is possible to process the images displayed by the projectors to correct for projector to projector alignment errors. This is difficult to do to less than one pixel accuracy making such a method typically unsuitable for high resolution applications.

Figure 38:
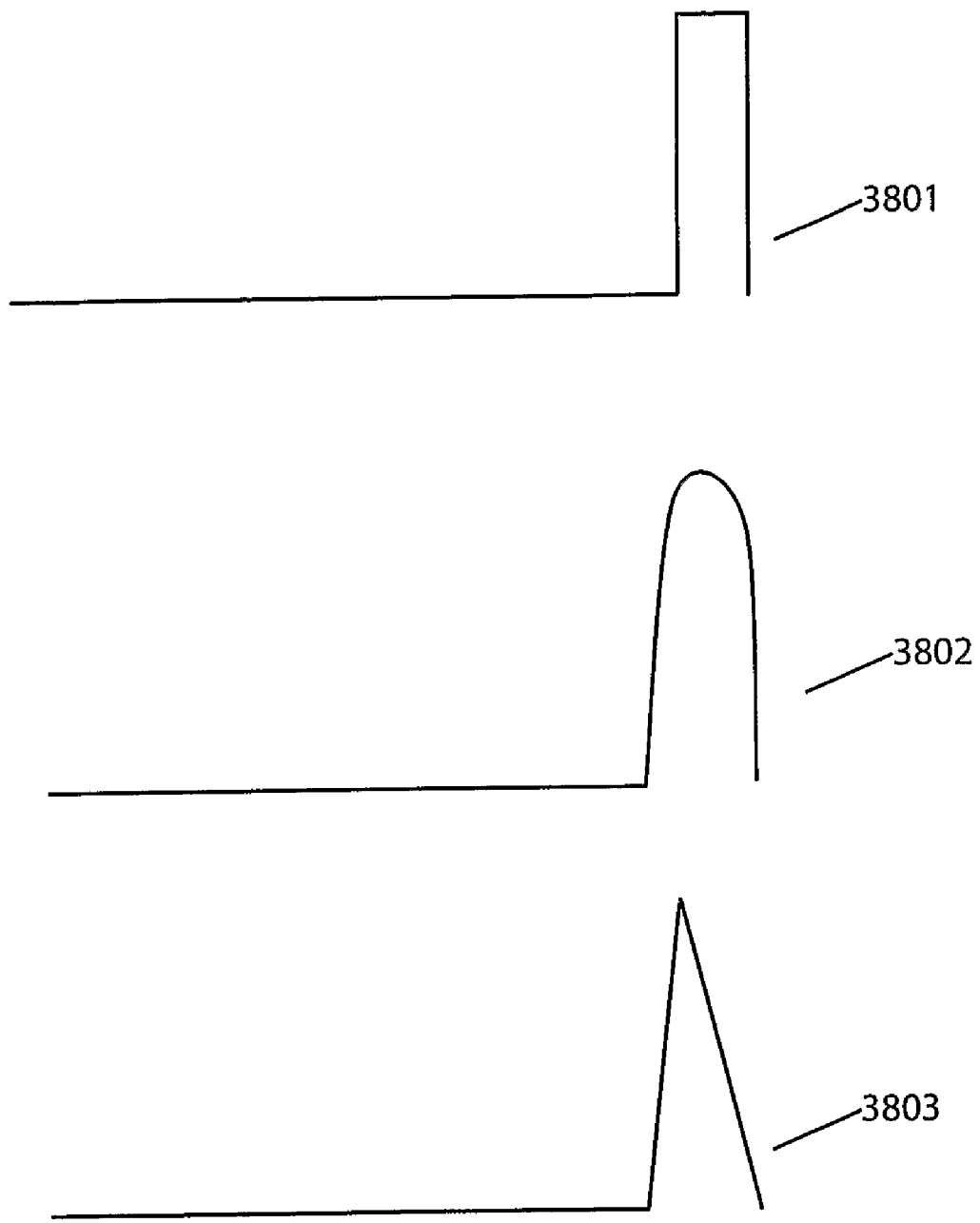
FIG. 38 describes the alignment of edge blending masks using the system of FIG. 34.

The final step in the automated alignment of the projection system in FIG. 35 is the proper positioning of the edge blending mask, shown at 3408 in FIG. 34. This can be accomplished as shown in FIG. 38. An image is displayed on each of the projectors that is black except for the overlap region. A horizontal line from such an image is shown in graphical form at 3801 in FIG. 38. The horizontal dimension of each graph corresponds to the horizontal position on the screen while the vertical dimension corresponds to the brightness. The image represented by 3801 results in the illumination profile shown at 3802 being seen by the camera 3506 in FIG. 35. The image is first projected from the left hand projector and the edge blending mask is then moved into the projected beam until the illumination profile seen by the camera matches the target illumination profile shown in FIG. 3803. This target profile is determined by the width of the blending region and has a brightness fall off curve corresponding to the fall off in brightness produced by the edge blending mask. The image alignment computer 3509 in FIG. 35 commands the left projector 3503 to adjust the mask as required. Because of the irregularities that are expected in the illumination profile with the edge blending mask, a smoothing algorithm is applied to the illumination profile seen by the camera in the processing performed by alignment computer 3509. The procedure is then repeated for the right hand projector. When the mask alignment is completed the pixel brightness correction procedures of FIG. 29 or 32 are then performed.

It should be understood that when the system incorporates a provision for adjustment of the position of the edge blending mask with respect to the optical axis as previously described, the process of comparing the measured brightness fall off produced by the edge blending mask to the target illumination profile must be performed at a number of points along the blending region, this would be in the vertical direction for the system of FIG. 29. The rotation of the edge blending mask with respect to the optical axis would then be adjusted to provide a constant width to the blending region over the full screen height.

It should be understood that the foregoing is for the purposes of illustration only and the principles of this invention can be applied to more than two projectors, and to projectors arranged in configurations where the composite image is produced from a matrix of images arranged horizontally, vertically or both. The present invention is intended to embrace all such alternative configurations, all of which can be implemented without departing from the spirit of the present invention.

What is claimed is:

1. A projection system having at least two projectors, each projector configured for producing a sub-image, wherein the sub-images are adapted to be projected on a screen to form a composite image and edge portions of the sub-images are configured to overlap to form an overlap region, each projector comprising:
    a light source for producing an input illuminance;
    an integrator bar positioned between the light source and at least one SLM device and operative to accept the input illuminance from the light source and output a sub image comprising multiple images of the input illuminance;
    an illumination relay between the integrator bar and the SLM device;
    an edge blending mask placed to produce a brightness ramp in the overlap region, the edge blending mask comprising an edge pattern that is (i) shaped to gradually increase obscuration of each of the multiple illuminance images in a constant manner in the overlap region and (ii) complementary in shape to the mask of the other projector to reduce variation in illuminance of field points across the overlap region;
    the at least one SLM device for receiving control signals and modulating light received from the light source based on the control signals to produce the sub-image; and
    a projection lens for projecting the sub-image.

2. The system of claim 1, wherein the edge blending mask positioned in the optical path of the sub-image for obscuring each of the multiple images with a complimentary slope to the corresponding multiple images obscured by the edge blending mask in the other projector.

3. The system of claim 1, wherein the edge blending masks are knife edge masks or serrated edge masks.

4. The system of claim 1, wherein each projector has multiple SLM devices, to render the color spectrum, and each projector further comprises a color separating and re-combining device associated with the SLM devices.

5. The system of claim 1, wherein the at least one SLM device is at least one of a deformable mirror device, a reflective liquid crystal devices or a transmissive liquid crystal device.

6. The system of claim 1, wherein each projector further comprises a diffuser, positioned between the integrator bar and the at least one SLM device, for altering the intensity distribution of the light at the output of the integrator bar, wherein the illumination relay is between the diffuser and the at least one SLM device.

7. The system of claim 6, wherein the edge blending mask is positioned between the diffuser and illumination relay, between the illumination relay and the at least one SLM device, or after the at least one SLM device.

8. The system of claim 1, wherein the integrator bar comprises a first section with a cross section at an input of the integrator bar and a second section having at least two sub-integrators.

9. The system of claim 8, wherein the sub-integrators are separated by an air gap.

10. The system of claim 8, wherein the sub-integrators are reflectively coated.

11. The system of claim 8, wherein the second section has the same composite cross section as the cross section of the first section.

12. The system of claim 8, wherein the sub-integrators are tapered toward the outputs of the sub-integrators.

13. The system of claim 8, wherein the integrator bar is tapered toward the output the integrator bar.

14. The system of claim 8, wherein the integrator bar further comprises a third section at an output of the integrator bar, the second section being positioned between the first section and the third section.

15. The system of claim 8, wherein the cross section at the input of the integrator bar has a cross section different from the cross section at an output of the integrator bar and wherein the cross sectional area at the input is equal to the cross sectional area at the output.

16. The system of claim 15, wherein the cross section of the input of the integrator bar is circular or oval and the cross section at the output of the integrator bar is rectangular.

17. The system of claim 1, wherein a pattern and location for the edge blending mask is chosen with regard to an overlap dependant phase shift and configuration of an illumination system of the projector.

18. The system of claim 1, wherein each projector further comprises:
    a first edge blending mask between the integrator bar and an input of the illumination relay; and
    a second edge blending mask positioned at an output of the illumination relay,
    wherein the first edge blending mask and the second edge blending mask are positioned so that the effect of the first mask is balanced by the second mask to symmetrically clip the intensity distribution of the light passing through the integrator bar.

19. The system of claim 1 further comprising an automatic alignment system capable of automatically aligning the sub-images on the screen.

20. The system of claim 19, wherein the automatic alignment system comprises:
a camera capable of receiving the composite image from the screen;
an alignment computer capable of analyzing the composite image and generating position control signals;
a controller capable of receiving the position control signals from the alignment computer;
a lens magnification adjustment mechanism associated with each projection lens capable of receiving position control signals from the controller and adjusting the magnification of the projection lens based on the position control signals; and
a lens position adjustment mechanism associated with each projection lens capable of receiving position control signals from the controller and adjusting the position of the projection lens based on the position control signals.

21. The system of claim 19, wherein the edge blending mask positioned in the optical path of the sub-image for gradually reducing the brightness of the projection of an edge portion of the sub-image, the system further comprising an edge blending mask position adjustment mechanism associated with each edge blending mask capable of receiving position control signals from the controller and moving the position of the edge blending mask based on the position control signals.

22. The system of claim 1, wherein each projector further comprises:
an input circuit for receiving image data signals representing the sub-image and separating the image data signals into separate red, greed and blue color component signals and a frame timing signal, the color component signals having pixel brightness data for each pixel of the sub-image;
a pixel brightness modification data memory for storing pixel brightness modification data;
a pixel brightness modification processor for receiving the color component signals, the frame timing signal, and the pixel brightness modification data and adjusting the pixel brightness data of the color component signals based on the pixel brightness modification data to produce modified color component signals; and
a display control and formatting circuit for receiving the modified color component signals and producing control signals based on the modified color component signals.

23. The system of claim 22, wherein the pixel brightness modification processor is three separate processors, one for each color channel.

24. The system of claim 22, wherein the pixel brightness modification processor is configured to only adjust the pixel brightness data for pixels of the color component signals that are in the overlap region.

25. The system of claim 22, wherein the pixel brightness modification data is a collection of values from 0 to 1 and the modified color component signals are produced by multiplying the color component signals by the pixel brightness modification data.

26. The system of claim 1, wherein the pattern of the mask in one projector is aligned to interdigitate with the pattern of the mask in the other projector.

27. A method for projecting sub-images on a screen to form a composite image wherein edge portions of the sub-images overlap to form an overlap region, using a projection system with at least two projectors, each projector producing a sub-image, comprising:
receiving image data signals representing a sub-image for each projector;
generating for each projector a sub image comprising multiple images of an input illuminance using an integrator bar;
modulating the sub images using SLM devices controlled by the control signals;
providing an edge blending mask of each projector with an edge pattern that is (i) shaped to gradually increase the obscuration of each of the multiple illuminance images in a constant manner in the overlap region and (ii) complementary in shape to the mask of the other projector to reduce variation in illuminance of field points across the overlap region;
masking an edge portion of each sub-image with the edge blending masks to produce brightness ramps in the overlap image; and
projecting the sub-images on a screen so that the sub-images form a composite image and the edge portions of the sub-image overlap to form an overlap region.

28. The method of claim 27, wherein projecting the sub-images on the screen results in the edge portions of the sub-images creating a more blended overlap region.

29. The method of claim 27, further comprising:
storing pixel brightness modification data for each projector in pixel brightness modification data memories;
separating the image data signals into color component signals having pixel brightness data;
adjusting the pixel brightness data using the pixel brightness modification data to produce modified color component signals; and
creating control signals from the modified color component signals.

30. The method of claim 27, further comprising:
positioning the edge of the edge blending mask in one projector in the optical path of the sub-image so that each of the multiple images are obscured with a complimentary slope to the corresponding multiple images obscured by the mask in the other projector.

31. The method of claim 29, wherein the projection system used has a first projector and a second projector and the pixel brightness modification data is determined by the method comprising:
aligning the sub-images on the screen;
adjusting edge blending masks to achieve a desired blended overlap region;
supplying a full white sub-image to each projector;
blocking the output of the first projector and measuring, at pixel locations of the screen corresponding to the number and location pattern of the pixel brightness modification memory locations in the second projector, the luminance of the sub-image produced by the second projector to create a brightness map for the second projector;
unblocking the output of the first projector, blocking the output of the second projector and measuring, at every pixel location of the screen corresponding to the number and location pattern of the pixel brightness modification memory locations in the first projector, the luminance of the sub-image produced by the first projector to create a brightness map for the first projector;

comparing the brightness maps of both projectors with a desired brightness profile determined according to the required uniformity of a composite display; and computing brightness modification data for the pixel brightness modification memory locations by determining the difference between the brightness maps and the desired brightness profile.

32. The method of claim 29, wherein the projection system used has a first projector and a second projector and the pixel brightness modification data is determined by the method comprising:

aligning the sub-images on the screen, balancing the brightness of each sub-image, and balancing the color of the sub-images so that the sub-images are matched in color;

adjusting edge blending masks to achieve a desired blended overlap region;

supplying a full red sub-image to each projector;

blocking the output of the first projector and measuring, at pixel locations of the screen corresponding to the number and location pattern of the pixel brightness modification memory locations in the second projector, the luminance of the sub-image produced by the second projector to create a red brightness map for the second projector;

unblocking the output of the first projector, blocking the output of the second projector and measuring, at pixel locations of the screen corresponding to the number and location pattern of the pixel brightness modification memory locations in the first projector, the luminance of the sub-image produced by the first projector to create a red brightness map for the first projector;

comparing the red brightness maps of both projectors with a desired brightness profile determined according to the required uniformity of a composite display;

computing red brightness modification data for the pixel brightness modification memory locations by determining the difference between the red brightness maps and the desired brightness profile;

supplying a full green sub-image to each projector;

blocking the output of the first projector and measuring, at pixel locations of the screen corresponding to the number and location pattern of the pixel brightness modification memory locations in the second projector, the luminance of the sub-image produced by the second projector to create a green brightness map for the second projector;

unblocking the output of the first projector, blocking the output of the second projector and measuring, at pixel locations of the screen corresponding to the number and location pattern of the pixel brightness modification memory locations in the first projector, the luminance of the sub-image produced by the first projector to create a green brightness map for the first projector;

comparing the green brightness maps of both projectors with the desired brightness profile;

computing green brightness modification data for the pixel brightness modification memory locations by determining the difference between the green brightness maps and the desired brightness profile;

supplying a full blue sub-image to each projector;

blocking the output of the first projector and measuring, at pixel locations of the screen corresponding to the number and location pattern of the pixel brightness modification memory locations in the second projector, the luminance of the sub-image produced by the second projector to create a blue brightness map for the second projector;

unblocking the output of the first projector, blocking the output of the second projector and measuring, at pixel locations of the screen corresponding to the number and location pattern of the pixel brightness modification memory locations in the first projector, the luminance of the sub-image produced by the first projector to create a blue brightness map for the first projector;

comparing the blue brightness maps of both projectors with the desired brightness profile; and computing blue brightness modification data for the pixel brightness modification memory locations by determining the difference between the blue brightness maps and the desired brightness profile.

33. The method of claim 32, wherein the alignment of the images and adjustment of edge blending masks is done by manual operation.

34. The method of claim 32, wherein the alignment of the images is performed by the projection system.

35. The method of claim 32, wherein the adjustment of the edge blending masks is performed by the projection system.

36. The method of claim 34, wherein the alignment of the images is performed by the method comprising:

projecting to the screen by the first projector a first form in the overlap region;

projecting to the screen by the second projector a second form in the overlap region in a predefined relationship to the first form;

imaging the first and second forms by a camera to determine the alignment of the first and second forms in order to produce an alignment output;

analyzing the alignment output with an alignment computer to determine the separation of the first form from the second form;

generating control signals based on the separation of the first form from the second form; and controlling the movement of the lens of at least the first projector by the control signals in order to align the first and second forms.

37. The method of claim 34, further comprising:

projecting to the screen by the first projector two vertical lines in the overlap region;

projecting to the screen by the second projector two horizontal lines in the overlap region in a predefined relationship to the vertical lines, wherein the vertical lines are spaced apart the same distance as the horizontal lines;

imaging the vertical lines and the horizontal lines to determine the centroids for each of the lines, the distance between the vertical lines, and the distance between the horizontal lines; and if the distance between the centroids of the vertical lines does not match the distance between the centroids of the second set of lines, controlling a lens magnification adjustment mechanism on the appropriate projector to adjust the magnification of the projector lens until the distance between the centroids is matched.

* * * * *